United States Patent
Takahashi et al.

(10) Patent No.: US 11,561,922 B2
(45) Date of Patent: Jan. 24, 2023

(54) COMMUNICATION APPARATUS, COMMUNICATION METHOD, PROGRAM, AND COMMUNICATION SYSTEM

(71) Applicant: Sony Semiconductor Solutions Corporation, Kanagawa (JP)

(72) Inventors: Hiroo Takahashi, Kanagawa (JP); Naohiro Koshisaka, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/635,050

(22) PCT Filed: Jul. 20, 2018

(86) PCT No.: PCT/JP2018/027242
§ 371 (c)(1),
(2) Date: Jan. 29, 2020

(87) PCT Pub. No.: WO2019/026643
PCT Pub. Date: Feb. 7, 2019

(65) Prior Publication Data
US 2020/0250128 A1 Aug. 6, 2020

(30) Foreign Application Priority Data
Aug. 4, 2017 (JP) .............................. JP2017-152062

(51) Int. Cl.
*G06F 13/00* (2006.01)
*G06F 13/42* (2006.01)
(Continued)

(52) U.S. Cl.
CPC .......... *G06F 13/4291* (2013.01); *G06F 9/542* (2013.01); *G06F 11/0772* (2013.01);
(Continued)

(58) Field of Classification Search
CPC .. G06F 9/542; G06F 11/1438; G06F 11/0772; G06F 13/362; G06F 13/4291; G06F 11/3027
(Continued)

(56) References Cited

U.S. PATENT DOCUMENTS 5,696,994 A * 12/1997 Pang ................... G06F 13/4077
710/64
8,416,793 B2 * 4/2013 Jones ........................ G06F 5/14
370/412
(Continued)

FOREIGN PATENT DOCUMENTS

EP  2945447 A1  11/2015
JP  08320790 A  12/1996
(Continued)

OTHER PUBLICATIONS

European Patent Office Communication Pursuant to Article 94(3) EPC dated Mar. 2, 2021 for corresponding European Application No. 18752295.8.
(Continued)

*Primary Examiner* — Chun Kuan Lee
(74) *Attorney, Agent, or Firm* — Michael Best & Friedrich LLP

(57) ABSTRACT

Communication is performed more reliably. A CCI (I3C DDR) processing section determines status of an index when requested to be accessed by an I3C master for a read operation. An error handling section then controls an I3C slave 13 to detect occurrence of an error based on the status of the index and to neglect all communication until DDR mode is stopped or restarted by the I3C master, the I3C slave 13 being further controlled to send a NACK response when
(Continued)

performing acknowledge processing on a signal sent from the I3C master. This technology can be applied to the I3C bus, for example.

24 Claims, 30 Drawing Sheets

(51) Int. Cl.
<table>
<tr><td>G06F 9/54</td><td>(2006.01)</td></tr>
<tr><td>G06F 11/07</td><td>(2006.01)</td></tr>
<tr><td>G06F 11/14</td><td>(2006.01)</td></tr>
<tr><td>G06F 11/30</td><td>(2006.01)</td></tr>
<tr><td>G06F 13/362</td><td>(2006.01)</td></tr>
</table>

(52) U.S. Cl.
CPC ...... *G06F 11/1438* (2013.01); *G06F 11/3027* (2013.01); *G06F 13/362* (2013.01)

(58) Field of Classification Search
USPC .......................................................... 710/110
See application file for complete search history.

(56) References Cited

U.S. PATENT DOCUMENTS

<table>
<tr><td>2008/0101393 A1*</td><td>5/2008</td><td>Noumi ................ H04L 12/4625<br>370/401</td></tr>
<tr><td>2008/0181206 A1</td><td>7/2008</td><td>Konishi et al.</td></tr>
<tr><td>2015/0100862 A1</td><td>4/2015</td><td>Sengoku</td></tr>
<tr><td>2015/0248373 A1</td><td>9/2015</td><td>Sengoku</td></tr>
<tr><td>2016/0004659 A1*</td><td>1/2016</td><td>Otoshi ................ G06F 13/4282<br>710/316</td></tr>
<tr><td>2016/0224489 A1</td><td>8/2016</td><td>Mishra et al.</td></tr>
<tr><td>2017/0255588 A1*</td><td>9/2017</td><td>Pitigoi-Aron ......... G06F 13/364</td></tr>
<tr><td>2018/0181531 A1</td><td>6/2018</td><td>Foust et al.</td></tr>
<tr><td>2018/0285301 A1*</td><td>10/2018</td><td>Thanigasalam ..... H04L 25/0272</td></tr>
<tr><td>2018/0365188 A1*</td><td>12/2018</td><td>Srivastava .......... G06F 13/4045</td></tr>
<tr><td>2020/0250128 A1</td><td>8/2020</td><td>Takahashi et al.</td></tr>
</table>

FOREIGN PATENT DOCUMENTS

<table>
<tr><td>JP</td><td>2008186130 A</td><td>8/2008</td></tr>
<tr><td>JP</td><td>2008197752 A</td><td>8/2008</td></tr>
<tr><td>JP</td><td>2016539533 A</td><td>12/2016</td></tr>
<tr><td>JP</td><td>6139569 B2</td><td>5/2017</td></tr>
<tr><td>WO</td><td>2017/061330 A1</td><td>4/2017</td></tr>
</table>

OTHER PUBLICATIONS

Nxp Semiconductors N.V.: "UM1 0204 I2C—Bus Specification Version 6", Apr. 4, 2014, XP055347692, URL:http://www.nxp.com/documents/user_manual/UM10204.pdf.

US Non-Final Office Action dated Mar. 31, 2022 for U.S. Appl. No. 16/634,795.

US Notice of Allowance dated Sep. 14, 2022 for U.S. Appl. No. 16/634,795.

* cited by examiner

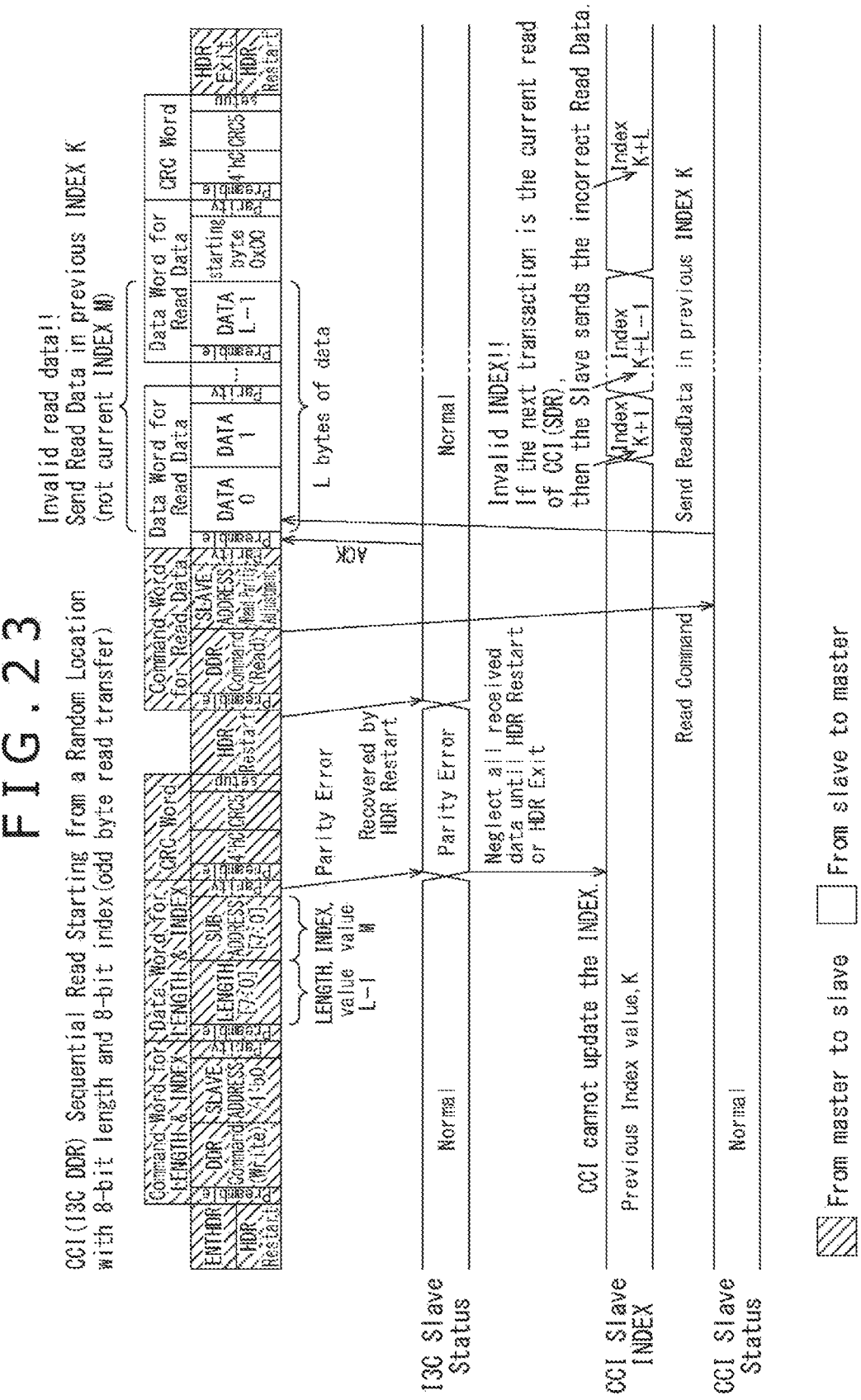

FIG. 24

CCI(DDR) Slave Error Types

| Error Type | Description | Error Detection Method | Error Recovery Method |
|---|---|---|---|
| SD0 | Read without INDEX Error | Detect an error if the Slave receives the DDR command Word[15]=1(Read) but it does not have the INDEX. | Enable HDR Exit or HDR Restart detector and neglect other patterns. |
| SD1 | Write over LENGTH Error | Detect an error if the value of Preamble following LENGTH +1 bytes of the Write Data is 2'b11. | Clear INDEX value. Enable HDR Exit or HDR Restart detector and neglect other patterns. |
| SD2 | Write over MWL Error | Detect an error if the value of Preamble following K bytes of the Write Data is 2'b11. ,where K=MWL−Number of bytes in Data Word for LENGTH −Number of bytes in Data Word for INDEX. Number of bytes in Data Word for LENGTH=1 byte(8 bit length) or 2 bytes(16 bit length) Number of bytes in Data Word for INDEX=1 byte(8 bit index) or 2 bytes(16 bit index) | Clear INDEX value. Enable HDR Exit or HDR Restart detector and neglect other patterns. |

F I G. 2 5

CCI (DDR) Master Error Types

| Error Type | Description | Error Detection Method | Error Recovery Method |
|---|---|---|---|
| MD0 | Read over LENGTH Error | Detect an error if the value of Preamble[1] following LENGTH +1 bytes of the Read Data is 1'b1. | Clear INDEX value. Send Master Abort and then HDR Exit or HDR Restart. |
| MD1 | Read over MRL Error | Detect an error if the value of Preamble[1] following MRL bytes of the Read Data is 1'b1. | Clear INDEX value. Send Master Abort and then HDR Exit or HDR Restart. |

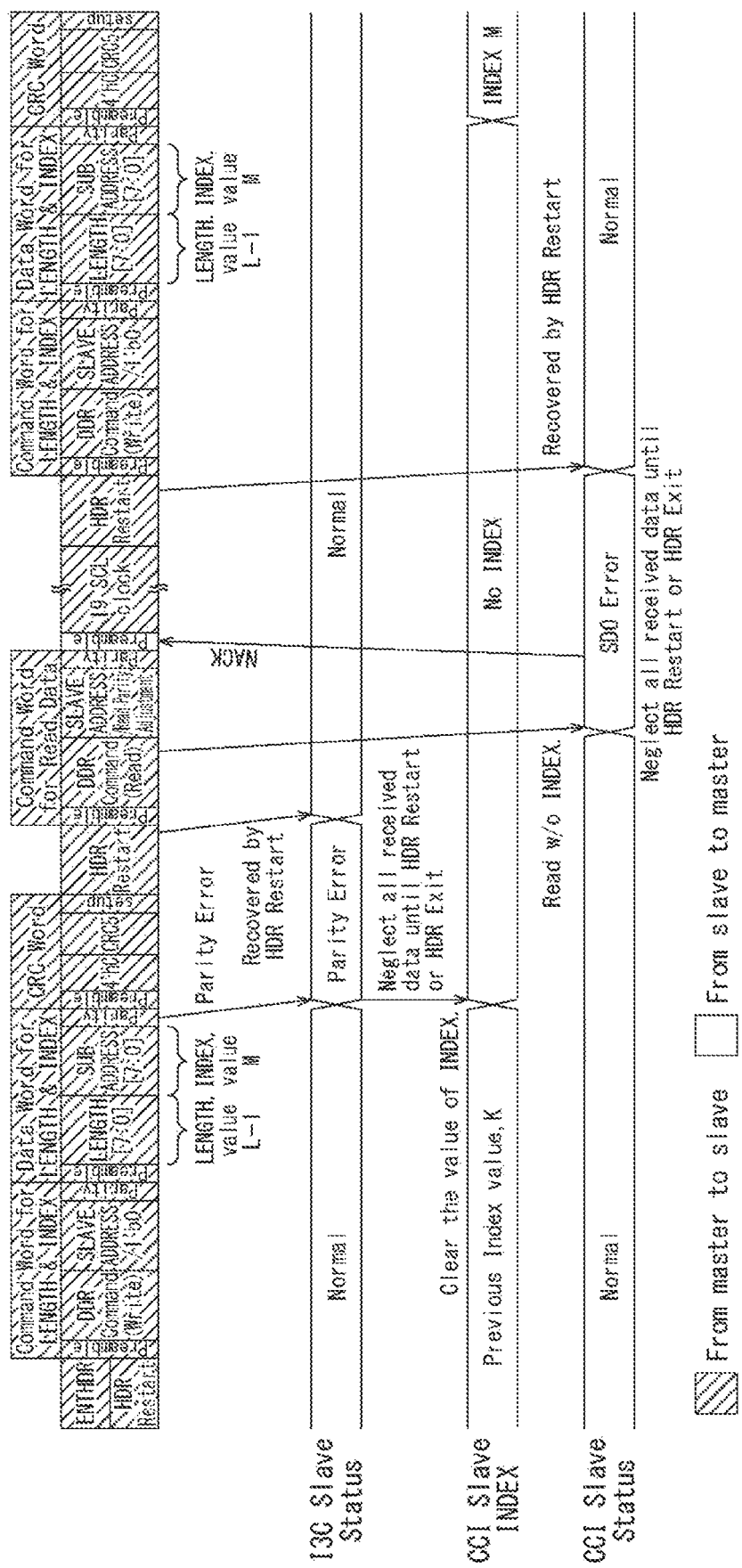

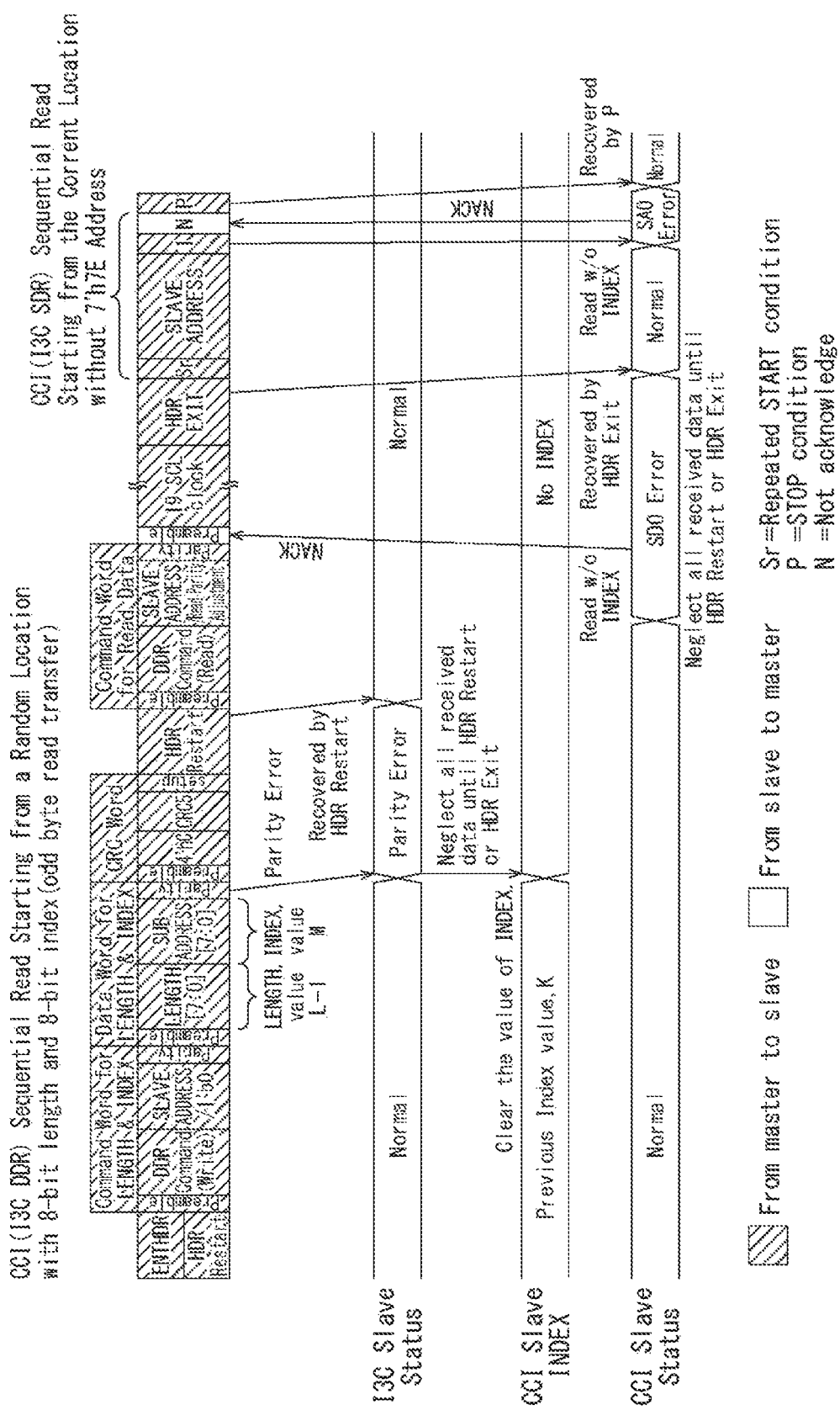

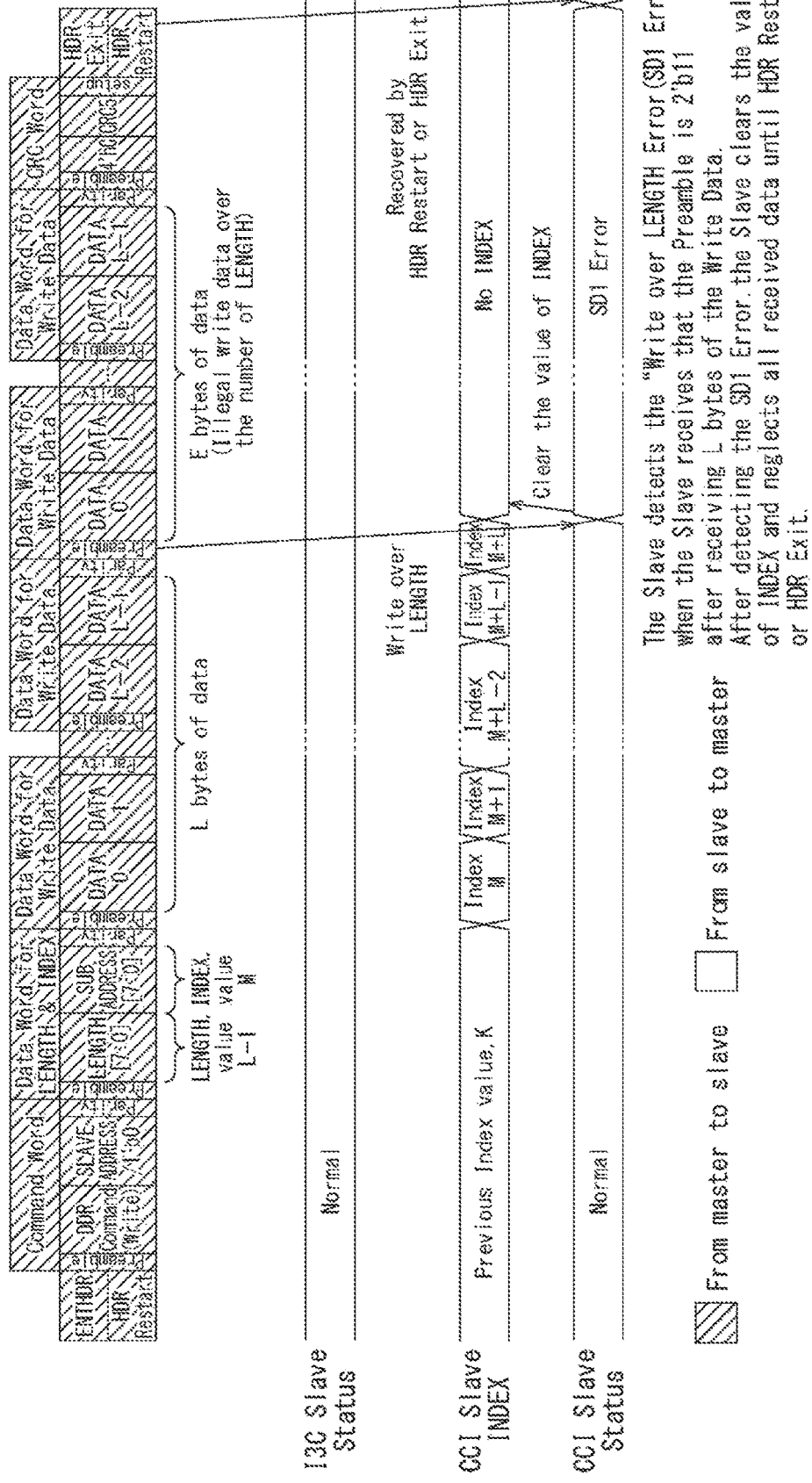

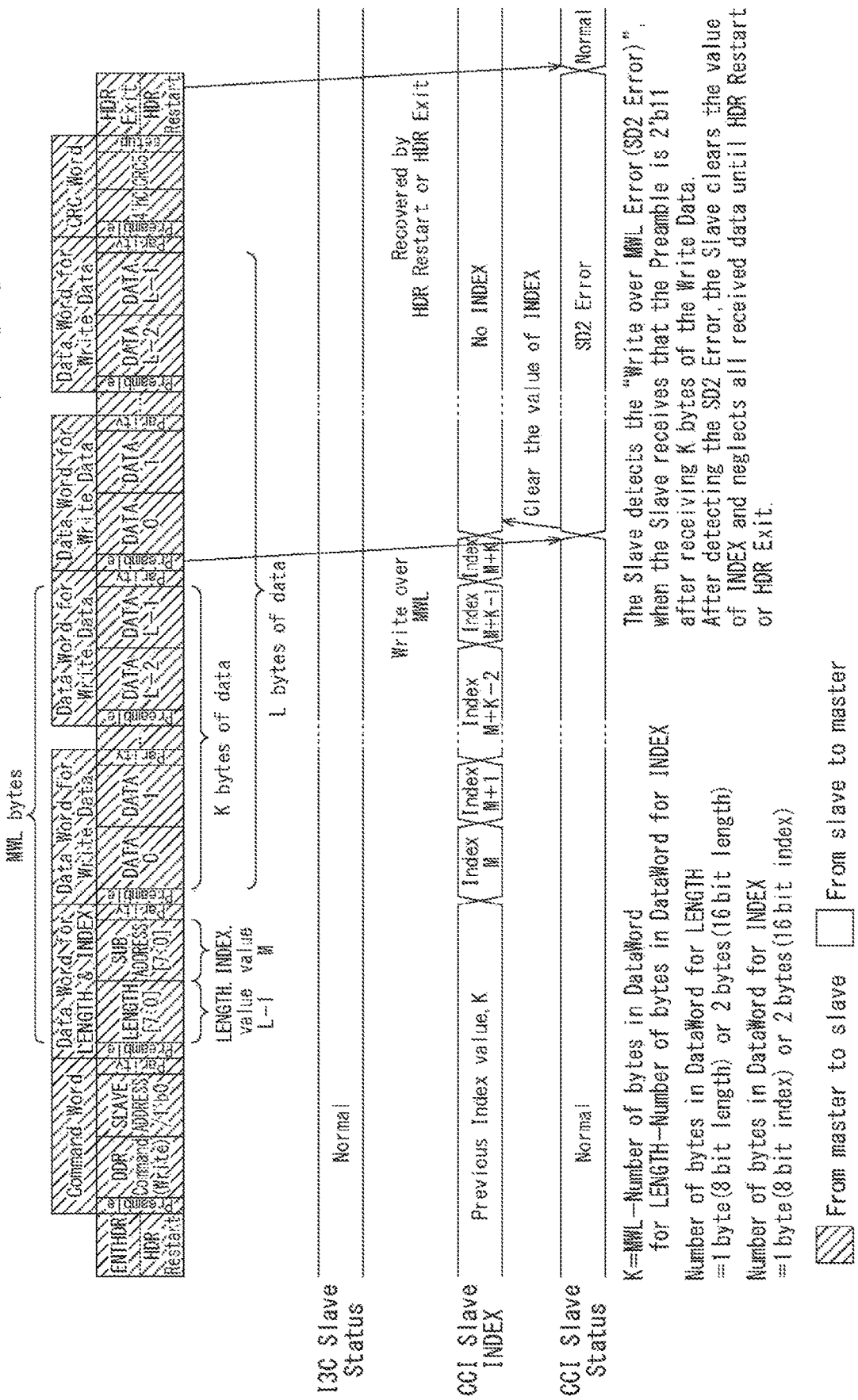

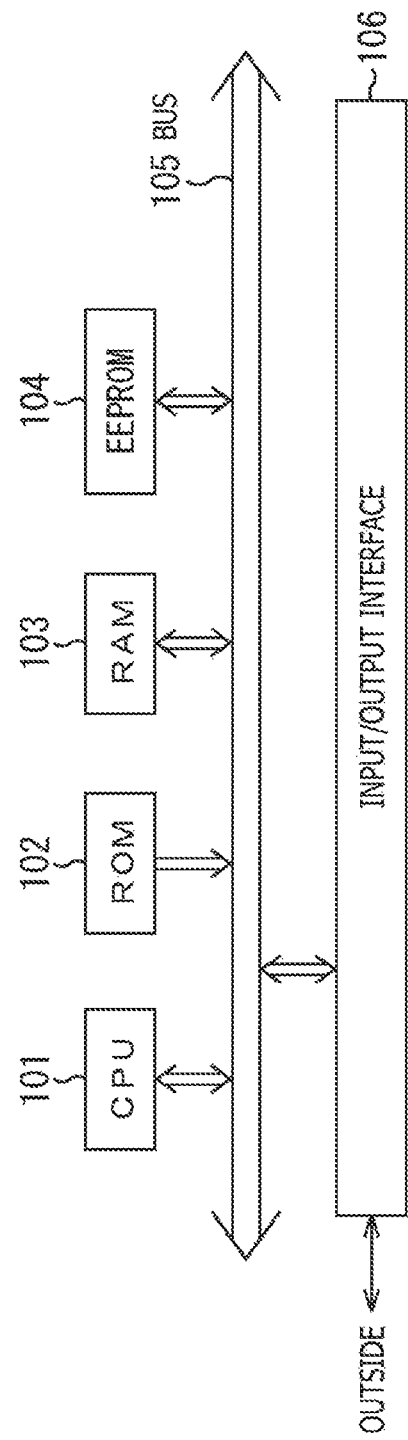

COMMUNICATION APPARATUS, COMMUNICATION METHOD, PROGRAM, AND COMMUNICATION SYSTEM

TECHNICAL FIELD

The present disclosure relates to a communication apparatus, a communication method, a program, and a communication system. More particularly, the disclosure relates to a communication apparatus, a communication method, a program, and a communication system for performing communication more reliably.

BACKGROUND ART

In the past, the CCI (Camera Control Interface) has been used extensively as the bus IF (Interface) for controlling registers in various devices. With the CCI, the I2C (Inter-Integrated Circuit) protocol has been adopted for the physical layer. Also in recent years, there has been a demand for higher speeds under the I2C, with an I3C (Improved Inter-Integrated Circuit) protocol being worked out and revised as a next-generation protocol.

For example, the I2C and I3C protocols are configured to let a master having governing authority over communication via the bus IF communicate with a slave connected with the bus IF and controlled by the master. The I3C protocol further provides a function to maintain compatibility with I2C devices, a function called Hot-Join to let a slave join the bus IF partway through during activity, and a function to have master authority assigned from one master to another among multiple masters.

Also, PTL 1 discloses a communication apparatus capable of performing more reliable communication by defining an error detection method under the I3C protocol in such a manner as to avoid the unavailability of communication due to erroneous detection of a start or a stop of communication.

CITATION LIST

Patent Literature

[PTL 1]
  PCT Patent Publication No. WO2017/061330

SUMMARY OF INVENTION

Technical Problem

Incidentally, whereas the I2C and the CCI hierarchically above the I2C have no definition of a function to detect errors, the I3C protocol defines an error detection method and an error recovery method. However, in a case where there occurs an index error or a FIFO (First In, First Out) overflow for example, as will be discussed later, there is fear that communication may not be performed normally. Thus there has been a demand for countermeasures to be taken against such errors so that communication will be performed more reliably.

The present disclosure has been made in view of the above circumstances and provides arrangements for performing communication more reliably.

Solution to Problem

According to a first aspect of the present disclosure, there is provided a communication apparatus that performs communication in a manner subordinate to and controlled by a governing communication apparatus controlling communication via a bus. The subordinate communication apparatus includes a low-level layer configured to communicate via the bus with the governing communication apparatus in a high-speed communication mode in which data is transferred at a transfer rate higher than a normal transfer rate, and a high-level layer configured to be hierarchically above the low-level layer and to read and write data in accordance with an index. The high-level layer includes a high-level layer communication processing section configured to determine whether or not the index is in an undefined state when requested to be accessed for a read operation by the governing communication apparatus, and a high-level layer error handling section configured to command the low-level layer to detect occurrence of an error on the basis of the determination that the index is in the undefined state and to neglect all communication until the high-speed communication mode is stopped or restarted by the governing communication apparatus, the low-level layer being further commanded to always send a NACK response when performing acknowledge processing on a signal sent from the governing communication apparatus.

Also according to the first aspect of the present disclosure, there is provided a communication method for use with a communication apparatus performing communication in a manner subordinate to and controlled by a governing communication apparatus controlling communication via a bus, the subordinate communication apparatus including a low-level layer configured to communicate via the bus with the governing communication apparatus in a high-speed communication mode in which data is transferred at a transfer rate higher than a normal transfer rate, and a high-level layer configured to be hierarchically above the low-level layer and to read and write data in accordance with an index. The communication method includes causing the subordinate communication apparatus to determine whether or not the index is in an undefined state when requested to be accessed for a read operation by the governing communication apparatus, and causing the subordinate communication apparatus to command the low-level layer to detect occurrence of an error on the basis of the determination that the index is in the undefined state and to neglect all communication until the high-speed communication mode is stopped or restarted by the governing communication apparatus, the low-level layer being further commanded to always send a NACK response when performing acknowledge processing on a signal sent from the governing communication apparatus.

Also according to the first aspect of the present disclosure, there is provided a program for causing a computer of a communication apparatus to perform a communication process, the communication apparatus performing communication in a manner subordinate to and controlled by a governing communication apparatus controlling communication via a bus, the subordinate communication apparatus including a low-level layer configured to communicate via the bus with the governing communication apparatus in a high-speed communication mode in which data is transferred at a transfer rate higher than a normal transfer rate, and a high-level layer configured to be hierarchically above the low-level layer and to read and write data in accordance with an index. The communication process includes causing the computer to determine whether or not the index is in an undefined state when requested to be accessed for a read operation by the governing communication apparatus, and causing the computer to command the low-level layer to detect occurrence of an error on the basis of the determination that the index is in the undefined state and to neglect all communication until the high-speed communication mode is stopped or restarted by the governing communication apparatus, the low-level layer being further commanded to always send a NACK response when performing acknowledge processing on a signal sent from the governing communication apparatus.

Thus according to the first aspect of the present disclosure, it is determined whether or not the index is in an undefined state when the governing communication apparatus issues a read access request. The low-level layer is commanded to detect occurrence of an error on the basis of the determination that the index is in the undefined state, to neglect all communication until the high-speed communication mode is restarted or stopped by the governing communication apparatus, and to always send a NACK response when performing acknowledge processing on a signal sent from the governing communication apparatus.

According to a second aspect of the present disclosure, there is provided a communication apparatus that controls communication via a bus in a governing manner. The governing communication apparatus includes a low-level layer configured to communicate via the bus with a subordinate communication apparatus performing communication under control of the governing communication apparatus in a high-speed communication mode in which data is transferred at a transfer rate higher than a normal transfer rate, and a high-level layer configured to be hierarchically above the low-level layer and to read and write data in accordance with an index. The high-level layer includes a high-level layer communication processing section configured to clear the index inside and thereby to bring the index into an undefined state in a case where the low-level layer has detected an error or where notification is received of the receipt of a NACK response sent from the subordinate communication apparatus.

According to the second aspect of the present disclosure, there is provided a communication method for use with a communication apparatus controlling communication via a bus in a governing manner, the governing communication apparatus including a low-level layer configured to communicate via the bus with a subordinate communication apparatus performing communication under control of the governing communication apparatus in a high-speed communication mode in which data is transferred at a transfer rate higher than a normal transfer rate, and a high-level layer configured to be hierarchically above the low-level layer and to read and write data in accordance with an index. The communication method includes causing the governing communication apparatus to clear the internal index and thereby to bring the index into an undefined state in a case where the low-level layer has detected an error or where notification is received by the high-level layer of the receipt of a NACK response sent from the subordinate communication apparatus.

According to the second aspect of the present disclosure, there is provided a program for causing a computer of a communication apparatus to perform a communication process, the communication apparatus controlling communication via a bus in a governing manner, the governing communication apparatus including a low-level layer configured to communicate via the bus with a subordinate communication apparatus performing communication under control of the governing communication apparatus in a high-speed communication mode in which data is transferred at a transfer rate higher than a normal transfer rate, and a high-level layer configured to be hierarchically above the low-level layer and to read and write data in accordance with an index. The communication process includes causing the computer to clear the internal index and thereby to bring the index into an undefined state in a case where the low-level layer has detected an error or where notification is received by the high-level layer of the receipt of a NACK response sent from the subordinate communication apparatus.

Thus according to the second aspect of the present disclosure, in the case where the low-level layer has detected an error or where notification is received of the receipt of the NACK response sent from the subordinate communication apparatus, the index inside is cleared and brought into the undefined state.

According to a third aspect of the present disclosure, there is provided a communication system including a governing communication apparatus controlling communication via a bus, and a subordinate communication apparatus performing communication in a manner connected with and controlled by the governing communication apparatus. The subordinate communication apparatus includes a low-level layer configured to communicate via the bus with the governing communication apparatus in a high-speed communication mode in which data is transferred at a transfer rate higher than a normal transfer rate, and a high-level layer configured to be hierarchically above the low-level layer and to read and write data in accordance with an index. The high-level layer includes a high-level layer communication processing section configured to determine whether or not the index is in an undefined state when requested to be accessed for a read operation by the governing communication apparatus, and a high-level layer error handling section configured to command the low-level layer to detect occurrence of an error on the basis of the determination that the index is in the undefined state and to neglect all communication until the high-speed communication mode is stopped or restarted by the governing communication apparatus, the low-level layer being further commanded to always send a NACK response when performing acknowledge processing on a signal sent from the governing communication apparatus. The governing communication apparatus includes a low-level layer configured to communicate via the bus with the subordinate communication apparatus in a high-speed communication mode in which data is transferred at a transfer rate higher than a normal transfer rate, and a high-level layer configured to be hierarchically above the low-level layer and to read and write data in accordance with an index. The high-level layer includes a high-level layer communication processing section configured to clear the index inside and thereby to bring the index into an undefined state in a case where the low-level layer has detected an error or where notification is received of the receipt of a NACK response sent from the subordinate communication apparatus.

Thus according to the third aspect of the present disclosure, with the subordinate communication apparatus, it is determined whether or not the index is in an undefined state when the governing communication apparatus issues a read access request. The low-level layer is commanded to detect occurrence of an error on the basis of the determination that the index is in the undefined state, to neglect all communication until the high-speed communication mode is restarted or stopped by the governing communication apparatus, and to always send a NACK response when performing acknowledge processing on a signal sent from the governing communication apparatus. With the governing communication apparatus, on the other hand, in a case where the low-level layer has detected an error or where notification is received of the receipt of a NACK response sent from the subordinate communication apparatus, the index inside is cleared and brought into the undefined state.

According to a fourth aspect of the present disclosure, there is provided a communication apparatus that performs communication in a manner subordinate to and controlled by a governing communication apparatus controlling communication via a bus. The subordinate communication apparatus includes a low-level layer configured to communicate via the bus with the governing communication apparatus in a high-speed communication mode in which data is transferred at a transfer rate higher than a normal transfer rate, and a high-level layer configured to be hierarchically above the low-level layer and to read and write data in accordance with an index. The high-level layer includes a high-level layer communication processing section configured to determine whether or not there is a continuation of write data exceeding a previously notified number of sent and received bytes as the number of bytes constituting data to be sent and received in communication, and a high-level layer error handling section configured to control the low-level layer to detect occurrence of an error on the basis of the determination that there is a continuation of the write data exceeding the number of sent and received bytes and to neglect all communication until at least the high-speed communication mode is stopped or restarted by the governing communication apparatus, the low-level layer being further controlled to send a NACK response when performing acknowledge processing on a signal sent from the governing communication apparatus.

Also according to the fourth aspect of the present disclosure, there is provided a communication method for use with a communication apparatus performing communication in a manner subordinate to and controlled by a governing communication apparatus controlling communication via a bus, the subordinate communication apparatus including a low-level layer configured to communicate via the bus with the governing communication apparatus in a high-speed communication mode in which data is transferred at a transfer rate higher than a normal transfer rate, and a high-level layer configured to be hierarchically above the low-level layer and to read and write data in accordance with an index. The communication method includes causing the subordinate communication apparatus to determine whether or not there is a continuation of write data exceeding a previously notified number of sent and received bytes as the number of bytes constituting data to be sent and received in communication, and causing the subordinate communication apparatus to control the low-level layer to detect occurrence of an error on the basis of the determination that there is a continuation of the write data exceeding the number of sent and received bytes and to neglect all communication until at least the high-speed communication mode is stopped or restarted by the governing communication apparatus, the low-level layer being further controlled to send a NACK response when performing acknowledge processing on a signal sent from the governing communication apparatus.

Also according to the fourth aspect of the present disclosure, there is provided a program for causing a computer of a communication apparatus to perform a communication process, the communication apparatus performing communication in a manner subordinate to and controlled by a governing communication apparatus controlling communication via a bus, the subordinate communication apparatus including a low-level layer configured to communicate via the bus with the governing communication apparatus in a high-speed communication mode in which data is transferred at a transfer rate higher than a normal transfer rate, and a high-level layer configured to be hierarchically above the low-level layer and to read and write data in accordance with an index. The communication process includes causing the computer to determine whether or not there is a continuation of write data exceeding a previously notified number of sent and received bytes as the number of bytes constituting data to be sent and received in communication, and causing the computer to control the low-level layer to detect occurrence of an error on the basis of the determination that there is a continuation of the write data exceeding the number of sent and received bytes and to neglect all communication until at least the high-speed communication mode is stopped or restarted by the governing communication apparatus, the low-level layer being further controlled to send a NACK response when performing acknowledge processing on a signal sent from the governing communication apparatus.

Thus according to the fourth aspect of the present disclosure, it is determined whether or not there is a continuation of write data exceeding a previously notified number of sent and received bytes as the number of bytes constituting the data to be sent and received in communication. The low-level layer is controlled to detect occurrence of an error on the basis of the determination that there is a continuation of the write data exceeding the number of sent and received bytes and to neglect all communication until at least the high-speed communication mode is stopped or restarted by the governing communication apparatus. The low-level layer is further controlled to send a NACK response when performing acknowledge processing on a signal sent from the governing communication apparatus.

According to a fifth aspect of the present disclosure, there is provided a communication apparatus that controls communication via a bus in a governing manner. The governing communication apparatus includes a low-level layer configured to communicate via the bus with a subordinate communication apparatus performing communication under control of the governing communication apparatus in a high-speed communication mode in which data is transferred at a transfer rate higher than a normal transfer rate, and a high-level layer configured to be hierarchically above the low-level layer and to read and write data in accordance with an index. The high-level layer includes the high-level layer communication processing section configured to determine whether or not there is a continuation of read data exceeding a previously notified number of sent and received bytes as the number of bytes constituting data to be sent and received in communication. The low-level layer includes an error handling section configured, at the time of detecting occurrence of an error on the basis of the determination that there is a continuation of the read data exceeding the number of sent and received bytes, to cause the high-level layer to clear the index, cancel communication, and at least stop or restart the high-speed communication mode before resetting the error.

Also according to the fifth aspect of the present disclosure, there is provided a communication method for use with a communication apparatus controlling communication via a bus in a governing manner, the governing communication apparatus including a low-level layer configured to communicate via the bus with a subordinate communication apparatus performing communication under control of the governing communication apparatus in a high-speed communication mode in which data is transferred at a transfer rate higher than a normal transfer rate, and a high-level layer configured to be hierarchically above the low-level layer and to read and write data in accordance with an index. The communication method includes causing the governing communication apparatus to determine whether or not there is a continuation of read data exceeding a previously notified number of sent and received bytes as the number of bytes constituting data that can be sent and received in communication, and causing the governing communication apparatus, at the time of detecting occurrence of an error on the basis of the determination that there is a continuation of the read data exceeding the number of sent and received bytes, to cause the high-level layer to clear the index, cancel communication, and at least stop or restart the high-speed communication mode before resetting the error.

Also according to the fifth aspect of the present disclosure, there is provided a program for causing a computer of a communication apparatus to perform a communication process, the communication apparatus controlling communication via a bus in a governing manner, the governing communication apparatus including a low-level layer configured to communicate via the bus with a subordinate communication apparatus performing communication under control of the governing communication apparatus in a high-speed communication mode in which data is transferred at a transfer rate higher than a normal transfer rate, and a high-level layer configured to be hierarchically above the low-level layer and to read and write data in accordance with an index. The communication process includes causing the computer to determine whether or not there is a continuation of read data exceeding a previously notified number of sent and received bytes as the number of bytes constituting data that can be sent and received in communication, and causing the computer, at the time of detecting occurrence of an error on the basis of the determination that there is a continuation of the read data exceeding the number of sent and received bytes, to cause the high-level layer to clear the index, cancel communication, and at least stop or restart the high-speed communication mode before resetting the error.

Thus according to the fifth aspect of the present disclosure, it is determined whether or not there is a continuation of read data exceeding a previously notified number of sent and received bytes as the number of bytes constituting the data that can be sent and received in communication. At the time an error is detected to have occurred on the basis of the determination that there is a continuation of the read data exceeding the number of sent and received bytes, the high-level layer is caused to clear the index, cancel communication, and at least stop or restart the high-speed communication mode before resetting the error.

According to a sixth aspect of the present disclosure, there is provided a communication system including a governing communication apparatus controlling communication via a bus, and a subordinate communication apparatus performing communication in a manner connected with and controlled by the governing communication apparatus. The subordinate communication apparatus includes a low-level layer configured to communicate via the bus with the governing communication apparatus in a high-speed communication mode in which data is transferred at a transfer rate higher than a normal transfer rate, and a high-level layer configured to be hierarchically above the low-level layer and to read and write data in accordance with an index. The high-level layer includes a high-level layer communication processing section configured to determine whether or not there is a continuation of write data exceeding a previously notified number of sent and received bytes as the number of bytes constituting data to be sent and received in communication, and a high-level layer error handling section configured to command the low-level layer to detect occurrence of an error on the basis of the determination that there is a continuation of the write data exceeding the number of sent and received bytes and to neglect all communication until at least the high-speed communication mode is stopped or restarted by the governing communication apparatus, the low-level layer being further controlled to send a NACK response when performing acknowledge processing on a signal sent from the governing communication apparatus. The governing communication apparatus includes a low-level layer configured to communicate via the bus with the subordinate communication apparatus performing communication under control of the governing communication apparatus in a high-speed communication mode in which data is transferred at a transfer rate higher than a normal transfer rate, and a high-level layer configured to be hierarchically above the low-level layer and to read and write data in accordance with an index. The high-level layer includes the high-level layer communication processing section configured to determine whether or not there is a continuation of read data exceeding a previously notified number of sent and received bytes as the number of bytes constituting data to be sent and received in communication. The low-level layer includes an error handling section configured, at the time of detecting occurrence of an error on the basis of the determination that there is a continuation of the read data exceeding the number of sent and received bytes, to cause the high-level layer to clear the index, cancel communication, and at least stop or restart the high-speed communication mode before resetting the error.

Thus according to the sixth aspect of the present disclosure, with the subordinate communication apparatus, it is determined whether or not there is a continuation of write data exceeding a previously notified number of sent and received bytes as the number of bytes constituting the data to be sent and received in communication. The low-level layer is controlled to detect occurrence of an error on the basis of the determination that there is a continuation of the write data exceeding the number of sent and received bytes and to neglect all communication until at least the high-speed communication mode is stopped or restarted by the governing communication apparatus. The low-level layer is further controlled to send a NACK response when performing acknowledge processing on a signal sent from the governing communication apparatus. With the governing communication apparatus, on the other hand, it is determined whether or not there is a continuation of read data exceeding a previously notified number of sent and received bytes as the number of bytes constituting the data to be sent and received in communication. At the time of detecting occurrence of an error on the basis of the determination that there is a continuation of the read data exceeding the number of sent and received bytes, the high-level layer is caused to clear the index, cancel communication, and at least stop or restart the high-speed communication mode before resetting the error.

According to a seventh aspect of the present disclosure, there is provided a communication apparatus that performs communication in a manner subordinate to and controlled by a governing communication apparatus controlling communication via a bus. The subordinate communication apparatus includes a low-level layer configured to communicate via the bus with the governing communication apparatus in a high-speed communication mode in which data is transferred at a transfer rate higher than a normal transfer rate, and a high-level layer configured to be hierarchically above the low-level layer and to read and write data in accordance with an index. The high-level layer includes a high-level layer communication processing section configured to determine whether or not there is received write data having a number of bytes exceeding a maximum number of transfer bytes that can be written in a single send and receive operation, and a high-level layer error handling section configured to control the low-level layer to detect occurrence of an error on the basis of the determination that there is received the write data having the number of bytes exceeding the maximum number of transfer bytes and to neglect all communication until at least the high-speed communication mode is stopped or restarted by the governing communication apparatus, the low-level layer being further controlled to send a NACK response when performing acknowledge processing on a signal sent from the governing communication apparatus.

According to the seventh aspect of the present disclosure, there is provided a communication method for use with a communication apparatus performing communication in a manner subordinate to and controlled by a governing communication apparatus controlling communication via a bus, the subordinate communication apparatus including a low-level layer configured to communicate via the bus with the governing communication apparatus in a high-speed communication mode in which data is transferred at a transfer rate higher than a normal transfer rate, and a high-level layer configured to be hierarchically above the low-level layer and to read and write data in accordance with an index. The communication method includes causing the subordinate communication apparatus to determine whether or not there is received write data having a number of bytes exceeding a maximum number of transfer bytes that can be written in a single send and receive operation, and causing the subordinate communication apparatus to control the low-level layer to detect occurrence of an error on the basis of the determination that there is received the write data having the number of bytes exceeding the maximum number of transfer bytes and to neglect all communication until at least the high-speed communication mode is stopped or restarted by the governing communication apparatus, the low-level layer being further controlled to send a NACK response when performing acknowledge processing on a signal sent from the governing communication apparatus.

According to the seventh aspect of the present disclosure, there is provided a program for causing a computer of a communication apparatus to perform a communication process, the communication apparatus performing communication in a manner subordinate to and controlled by a governing communication apparatus controlling communication via a bus, the subordinate communication apparatus including a low-level layer configured to communicate via the bus with the governing communication apparatus in a high-speed communication mode in which data is transferred at a transfer rate higher than a normal transfer rate, and a high-level layer configured to be hierarchically above the low-level layer and to read and write data in accordance with an index. The communication process includes causing the computer to determine whether or not there is received write data having a number of bytes exceeding a maximum number of transfer bytes that can be written in a single send and receive operation, and causing the computer to control the low-level layer to detect occurrence of an error on the basis of the determination that there is received the write data having the number of bytes exceeding the maximum number of transfer bytes and to neglect all communication until at least the high-speed communication mode is stopped or restarted by the governing communication apparatus, the low-level layer being further controlled to send a NACK response when performing acknowledge processing on a signal sent from the governing communication apparatus.

Thus according to the seventh aspect of the present disclosure, it is determined whether or not there is received write data exceeding a maximum number of transfer bytes constituting the data that can be written in a single send and receive operation. The low-level layer is controlled to detect occurrence of an error on the basis of the determination that there is received the write data exceeding the maximum number of transfer bytes and to neglect all communication until at least the high-speed communication mode is stopped or restarted by the governing communication apparatus. The low-level layer is further controlled to send a NACK response when performing acknowledge processing on a signal sent from the governing communication apparatus.

According to an eighth aspect of the present disclosure, there is provided a communication apparatus that controls communication via a bus in a governing manner. The governing communication apparatus includes a low-level layer configured to communicate via the bus with a subordinate communication apparatus performing communication under control of the governing communication apparatus in a high-speed communication mode in which data is transferred at a transfer rate higher than a normal transfer rate, and a high-level layer configured to be hierarchically above the low-level layer and to read and write data in accordance with an index. The high-level layer includes a high-level layer communication processing section configured to determine whether or not there is received read data having a number of bytes exceeding a maximum number of transfer bytes that can be read in a single send and receive operation. The low-level layer includes an error handling section configured, at the time of detecting occurrence of an error on the basis of the determination that there is received the read data having the number of bytes exceeding the maximum number of transfer bytes, to cancel communication and at least stop or restart the high-speed communication mode before resetting the error.

According to the eighth aspect of the present disclosure, there is provided a communication method for use with a communication apparatus controlling communication via a bus in a governing manner, the governing communication apparatus including a low-level layer configured to communicate via the bus with a subordinate communication apparatus performing communication under control of the governing communication apparatus in a high-speed communication mode in which data is transferred at a transfer rate higher than a normal transfer rate, and a high-level layer configured to be hierarchically above the low-level layer and to read and write data in accordance with an index. The communication method includes causing the governing communication apparatus to determine whether or not there is received read data having a number of bytes exceeding a maximum number of transfer bytes that can be read in a single send and receive operation, and causing the governing communication apparatus, at the time of detecting occurrence of an error on the basis of the determination that there is received the read data having the number of bytes exceeding the maximum number of transfer bytes, to cancel communication and at least stop or restart the high-speed communication mode before resetting the error.

According to the eighth aspect of the present disclosure, there is provided a program for causing a computer of a communication apparatus to perform a communication process, the communication apparatus controlling communication via a bus in a governing manner, the governing communication apparatus including a low-level layer configured to communicate via the bus with a subordinate communication apparatus performing communication under control of the governing communication apparatus in a high-speed communication mode in which data is transferred at a transfer rate higher than a normal transfer rate, and a high-level layer configured to be hierarchically above the low-level layer and to read and write data in accordance with an index. The communication process includes causing the computer to determine whether or not there is received read data having a number of bytes exceeding a maximum number of transfer bytes that can be read in a single send and receive operation, and causing the computer, at the time of detecting occurrence of an error on the basis of the determination that there is received the read data having the number of bytes exceeding the maximum number of transfer bytes, to cancel communication and at least stop or restart the high-speed communication mode before resetting the error.

Thus according to the eighth aspect of the present disclosure, it is determined whether or not there is received read data exceeding a maximum number of transfer bytes that can be read in a single send and receive operation. At the time an error is detected to have occurred on the basis of the determination that there is received the read data exceeding the maximum number of transfer bytes, communication is cancelled, and the high-speed communication mode is stopped or restarted before the error is reset.

According to a ninth aspect of the present disclosure, there is provided a communication system including a governing communication apparatus controlling communication via a bus, and a subordinate communication apparatus performing communication in a manner connected with and controlled by the governing communication apparatus. The subordinate communication apparatus includes a low-level layer configured to communicate via the bus with the governing communication apparatus in a high-speed communication mode in which data is transferred at a transfer rate higher than a normal transfer rate, and a high-level layer configured to be hierarchically above the low-level layer and to read and write data in accordance with an index. The high-level layer includes a high-level layer communication processing section configured to determine whether or not there is received write data having a number of bytes exceeding a maximum number of transfer bytes that can be written in a single send and receive operation, and a high-level layer error handling section configured to command the low-level layer to detect occurrence of an error on the basis of the determination that there is received the write data having the number of bytes exceeding the maximum number of transfer bytes and to neglect all communication until the high-speed communication mode is stopped or restarted by the governing communication apparatus, the low-level layer being further controlled to send a NACK response when performing acknowledge processing on a signal sent from the governing communication apparatus. The governing communication apparatus includes a low-level layer configured to communicate via the bus with the subordinate communication apparatus performing communication under control of the governing communication apparatus in a high-speed communication mode in which data is transferred at a transfer rate higher than a normal transfer rate, and a high-level layer configured to be hierarchically above the low-level layer and to read and write data in accordance with an index. The high-level layer includes a high-level layer communication processing sec-tion configured to determine whether or not there is received read data having a number of bytes exceeding a maximum number of transfer bytes that can be read in a single send and receive operation. The low-level layer includes an error handling section configured, at the time of detecting occurrence of an error on the basis of the determination that there is received the read data having the number of bytes exceeding the maximum number of transfer bytes, to cancel communication and at least stop or restart the high-speed communication mode before resetting the error.

Thus according to the ninth aspect of the present disclosure, with the subordinate communication apparatus, it is determined whether or not there is received write data exceeding a maximum number of transfer bytes that can be written in a single send and receive operation. The low-level layer is controlled to detect occurrence of an error on the basis of the determination that there is received the write data exceeding the maximum number of transfer bytes and to neglect all communication until the high-speed communication mode is stopped or restarted by the governing communication apparatus. The low-level layer is further controlled to send a NACK response when performing acknowledge processing on a signal sent from the governing communication apparatus. With the governing communication apparatus, on the other hand, it is determined whether or not there is received read data exceeding a maximum number of transfer bytes that can be read in a single send and receive operation. At the time an error is detected to have occurred on the basis of the determination that there is received the read data exceeding the maximum number of transfer bytes, communication is cancelled, and the high-speed communication mode is stopped or restarted before the error is reset.

Advantageous Effects of Invention

According to the first through the ninth aspects of the present disclosure, communication is performed more reliably.

The advantageous effects outlined above are not limitative of the present disclosure. Further advantages of the disclosure will become apparent from the ensuing description.

BRIEF DESCRIPTION OF DRAWINGS

FIG. 23 is a schematic diagram explaining index errors.

FIG. 24 is a tabular diagram describing the definitions of errors on the slave side.

FIG. 25 is a tabular diagram describing the definitions of errors on the master side.

FIG. 26 is a schematic diagram depicting typical SD0 error operations.

FIG. 27 is a schematic diagram depicting typical operations performed when an SS0 error is caused by a current read operation.

FIG. 28 is a schematic diagram depicting typical SD1 error operations.

FIG. 30 is a schematic diagram depicting typical SD2 error operations.

FIG. 31 is a block diagram depicting a typical configuration of an embodiment of a computer to which the present technology is applied.

DESCRIPTION OF EMBODIMENTS

Specific embodiments to which the present technology is applied are described below in detail with reference to the accompanying drawings.

<Typical Configuration of the Bus IF>

Figure 1:
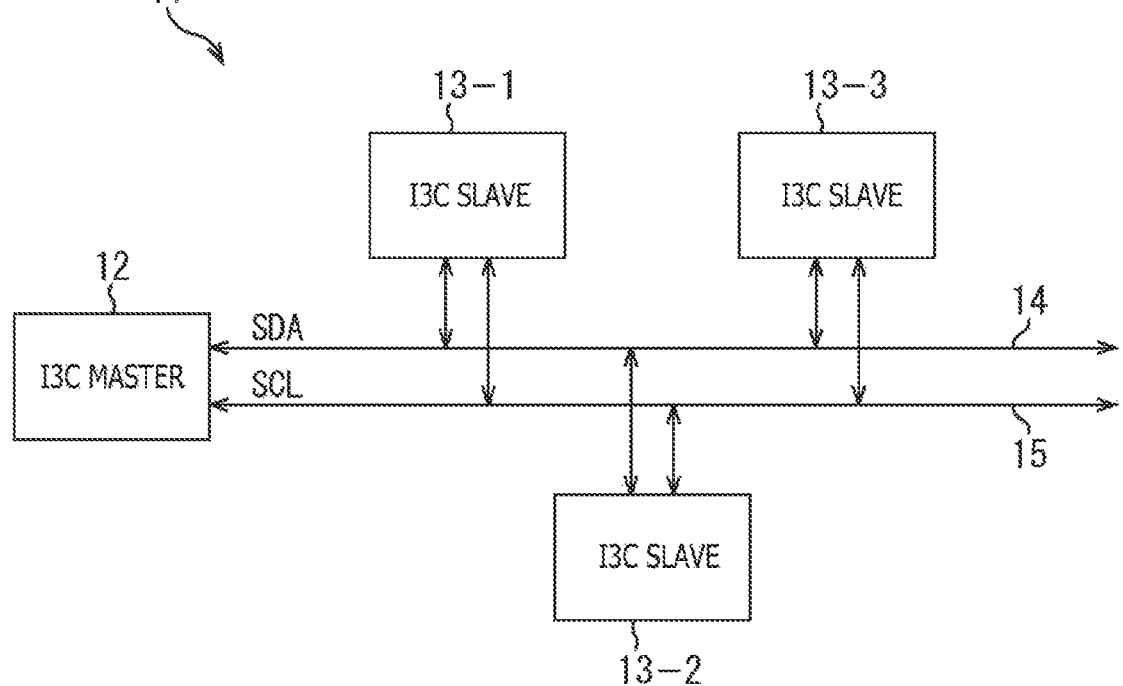
FIG. 1 is a block diagram depicting a typical configuration of an embodiment of an I3C bus to which the present technology is applied.

FIG. 1 is a block diagram depicting a typical configuration of an embodiment of an I3C bus to which the present technology is applied.

An I3C bus 11 depicted in FIG. 1 is configured to have an I3C master 12 and three I3C slaves 13-1 to 13-3 connected with one another via a data signal line 14 for sending serial data SDA and a clock signal line 15 for sending a serial clock signal SCL.

The I3C master 12 has governing authority over communication on the I3C bus 11. The I3C master 12 controls communication with the I3C slaves 13-1 to 13-3 via the data signal line 14 and the clock signal line 15.

Under control of the I3C master 12, the I3C slaves 13-1 to 13-3 perform communication via the I3C bus 11. In the ensuing description, where there is no need to distinguish each of the I3C slaves 13-1 to 13-3, they will be simply referred to as the I3C slave 13 where appropriate.

The I3C bus 11 configured as outlined above permits communication according to the I3C protocol. For example, two data transfer modes are stipulated for the I3C bus 11: SDR (Single Data Rate) mode in which data is transferred at a normal transfer rate, and HDR (High Data Rate) mode in which data is transferred at a transfer rate higher than that of SDR mode. Also, HDR mode includes three transfer modes defined by the protocol: DDR (Double Data Rate) mode, TSP (Ternary Symbol Pure-Bus) mode, and TSL (Ternary Symbol Legacy-inclusive-Bus) mode.

Also, the I3C allows for the use of CCC (Common Command Codes) to send commands to one or multiple I3C slaves 13 simultaneously and to set DAA (Dynamic Address Assignment) for dynamically assigning addresses to one or multiple I3C slaves 13.

<Typical Configuration of the I3C Communication System>

Figure 2:
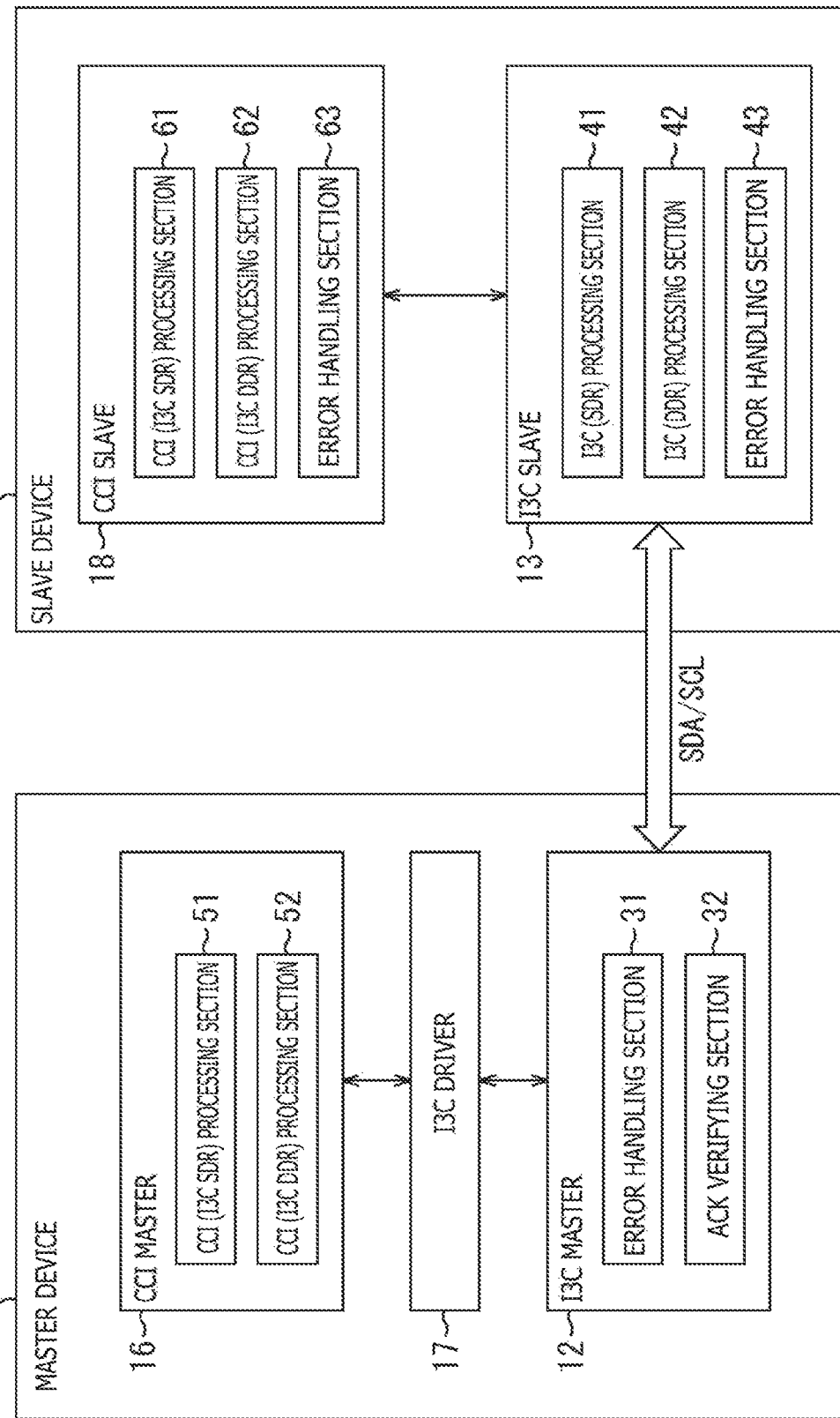
FIG. 2 is a block diagram depicting a typical configuration of an I3C communication system that uses the I3C bus.

FIG. 2 is a block diagram depicting a typical configuration of an I3C communication system 21 that uses the I3C bus 11.

In the configuration depicted in FIG. 2, the I3C master 12 is provided as the physical layer (low-level layer) of a master device 22. The master device 22 includes a CCI master 16 operating as a high-level layer with regard to the I3C master 12. Also, the I3C master 12 and the CCI master 16 are connected with each other via an I3C driver 17.

The I3C slave 13 is further provided as the physical layer (low-level layer) of a slave device 23. The slave device 23 includes a CCI slave 18 that is hierarchically above the I3C slave 13.

The I3C master 12 includes an error handling section 31 which, when occurrence of an error is detected, handles the error, and an ACK verifying section 32 that verifies an ACK response or a NACK response sent from the I3C slave 13 as a result of its signal acknowledge processing.

The I3C slave 13 includes an I3C (SDR) processing section 41 that performs communication processing in the physical layer when I3C communication is in SDR mode, an I3C (DDR) processing section 42 that performs communication processing in the physical layer when I3C communication is in DDR mode, and an error handling section 43 which, when occurrence of an error is detected, handles the error.

The CCI master 16 includes a CCI (I3C SDR) processing section 51 that performs communication processing as the high-level layer when I3C communication is in SDR mode, and a CCI (I3C DDR) processing section 52 that performs communication processing as the high-level layer when I3C communication is in DDR mode.

The CCI slave 18 includes a CCI (I3C SDR) processing section 61 that performs communication processing as the high-level layer when I3C communication is in SDR mode, a CCI (I3C DDR) processing section 62 that performs communication processing as the high-level layer when I3C communication is in DDR mode, and an error handling section 63 which, when occurrence of an error is detected, handles the error.

Figure 3:
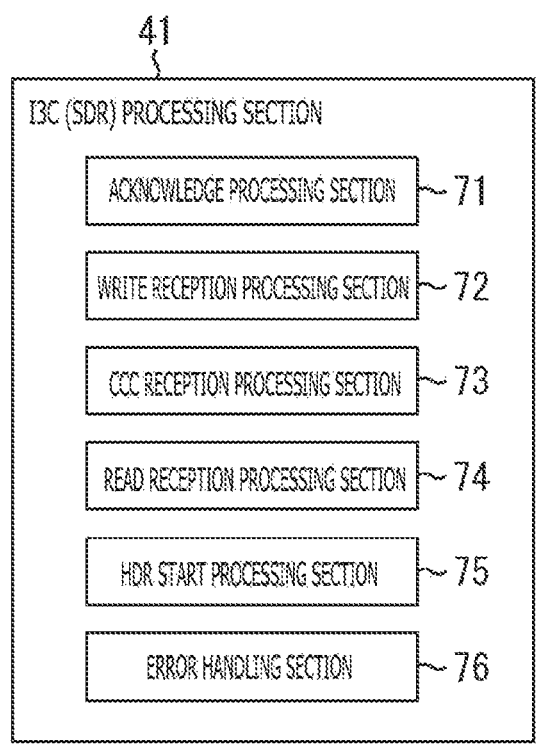
FIG. 3 is a block diagram depicting a typical configuration of an I3C (SDR) processing section in an I3C slave.

FIG. 3 is a block diagram depicting a typical configuration of the I3C (SDR) processing section 41 in the I3C slave 13.

As depicted in FIG. 3, the I3C (SDR) processing section 41 includes an acknowledge processing section 71, a write reception processing section 72, a CCC reception processing section 73, a read reception processing section 74, an HDR start processing section 75, and an error handling section 76.

The acknowledge processing section 71 performs acknowledge processing as will be explained later with reference to the flowchart of FIG. 11. For example, even when the acknowledge processing section 71 operating as the I3C layer under the I3C protocol determines that an ACK response is acceptable for the I3C layer, the acknowledge processing section 71 sends a NACK response instead of the ACK response if commanded by the CCI layer to send the NACK response.

The write reception processing section 72 performs write reception processing as will be explained later with reference to the flowchart of FIG. 12. For example, the write reception processing section 72 receives write data sent from the I3C master 12 and, at the time of forwarding the write data to the CCI slave 18, determines whether or not a parity error has occurred in the write data. In the case where it is determined that a parity error has occurred in the write data, the error handling section 76 notifies the CCI slave 18 of an S2 error indicating that a parity error has occurred in the write data.

The CCC reception processing section 73 performs CCC reception processing as will be explained later with reference to the flowchart of FIG. 13. For example, the CCC reception processing section 73 determines whether or not a parity error has occurred in the CCC sent from the I3C master 12. In the case where it is determined that a parity error has occurred in the CCC, the error handling section 76 notifies the CCI slave 18 of an S1 error indicating that a parity error has occurred in the CCC.

The read reception processing section 74 performs read reception processing as will be explained later with reference to the flowchart of FIG. 14. For example, at the time of sending via the I3C bus 11 the read data received from the CCI slave 18, the read reception processing section 74 monitors a signal on the I3C bus 11 and determines whether or not the signal matches the read data. In the case where it is determined that the signal on the I3C bus 11 fails to match the read data, the error handling section 76 notifies the CCI slave 18 of an S6 error indicating that the signal on the I3C bus 11 does not match the read data.

The HDR start processing section 75 performs HDR start processing as will be explained later with reference to the flowchart of FIG. 15. For example, in accordance with a CCC (ENTHDRx) sent from the I3C master 12 ordering the start of HDR mode, the HDR start processing section 75 determines which of DDR mode, TSP mode, and TSL mode is to be started, and notifies the CCI slave 18 of the mode resulting from the determination.

The error handling section 76 performs various error handling processes for handling errors that may occur during the processes performed respectively by the acknowledge processing section 71, write reception processing section 72, CCC reception processing section 73, and read reception processing section 74.

Figure 4:
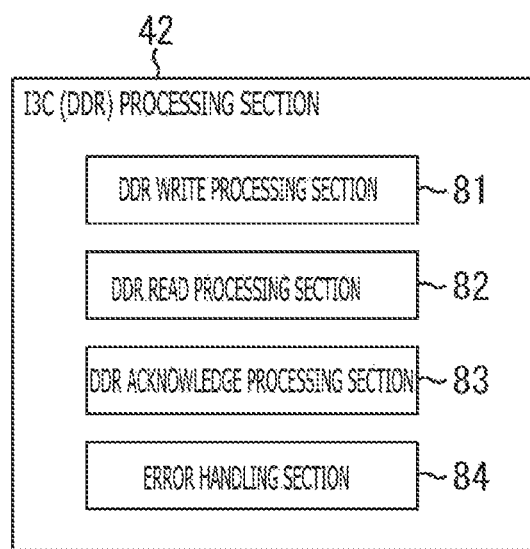
FIG. 4 is a block diagram depicting a typical configuration of an I3C (DDR) processing section in the I3C slave.

FIG. 4 is a block diagram depicting a typical configuration of the I3C (DDR) processing section 42 in the I3C slave 13.

As depicted in FIG. 4, the I3C (DDR) processing section 42 includes a DDR write processing section 81, a DDR read processing section 82, a DDR acknowledge processing section 83, and an error handling section 84.

The DDR write processing section 81 performs DDR write processing as will be explained later with reference to the flowchart of FIG. 17. For example, the DDR write processing section 81 determines whether or not an error has occurred in the write data sent from the I3C master 12 depending on data arrangements (framing), on a parity bit, or on a CRC word.

The DDR read processing section 82 performs DDR read processing as will be explained later with reference to the flowchart of FIG. 18. For example, the DDR read processing section 82 sends to the I3C master 12 the read data received from the CCI slave 18.

The DDR acknowledge processing section 83 performs DDR acknowledge processing as will be explained later with reference to the flowchart of FIG. 19. For example, even when the DDR acknowledge processing section 83 operating as the I3C layer under the I3C protocol determines that an ACK response is acceptable for the I3C layer, the DDR acknowledge processing section 83 sends a NACK response instead of the ACK response if commanded by the CCI layer to send the NACK response.

The error handling section 84 performs: framing error handling processing as will be explained later with reference to the flowchart of FIG. 20; parity error handling processing as will be explained later with reference to the flowchart of FIG. 21; and CRC error handling processing as will be explained later with reference to the flowchart of FIG. 22. For example, the error handling section 84 notifies the CCI slave 18 that any one of the respective errors has occurred.

The I3C communication system 21 is configured as described above. The I3C master 12 and the I3C slave 13 communicate with each other via the I3C bus 11. The I3C master 12 controls communication in a governing manner, with the I3C slave 13 performing communication in a manner subordinate to and controlled by the I3C master 12. Also in the master device 22, the CCI master 16 operates as the high-level layer and the I3C master 12 as the low-level layer in performing the communication processing. Likewise, in the slave device 23, the CCI slave 18 operates as the high-level layer and the I3C slave 13 as the low-level layer in carrying out the communication processing. Also, the CCI master 16 and the CCI slave 18 may perform a data reading process (read) and a data writing process (write) in accordance with their common index.

Incidentally, the CCI (I3C SDR) processing section 51 and the CCI (I3C DDR) processing section 52 included in the CCI master 16 are implemented using software, for example. The error handling section 31 and the ACK verifying section 32 included in the I3C master 12 are implemented, for example, using hardware such as semiconductor circuits. Likewise, the CCI (I3C SDR) processing section 61, CCI (I3C DDR) processing section 62, and error handling section 63 included in the CCI slave 18 are implemented using software. The I3C (SDR) processing section 41, I3C (DDR) processing section 42, and error handling section 43 included in the I3C slave 13 are implemented using hardware such as semiconductor circuits. Obviously, these methods of implementation are conceivable but not necessarily limitative. Other suitable methods of implementation may be adopted instead.

<Communication Processing on the I3C Bus>

Typical communication processes performed by the I3C communication system 21 are explained below with reference to FIGS. 5 to 22.

Figure 5:
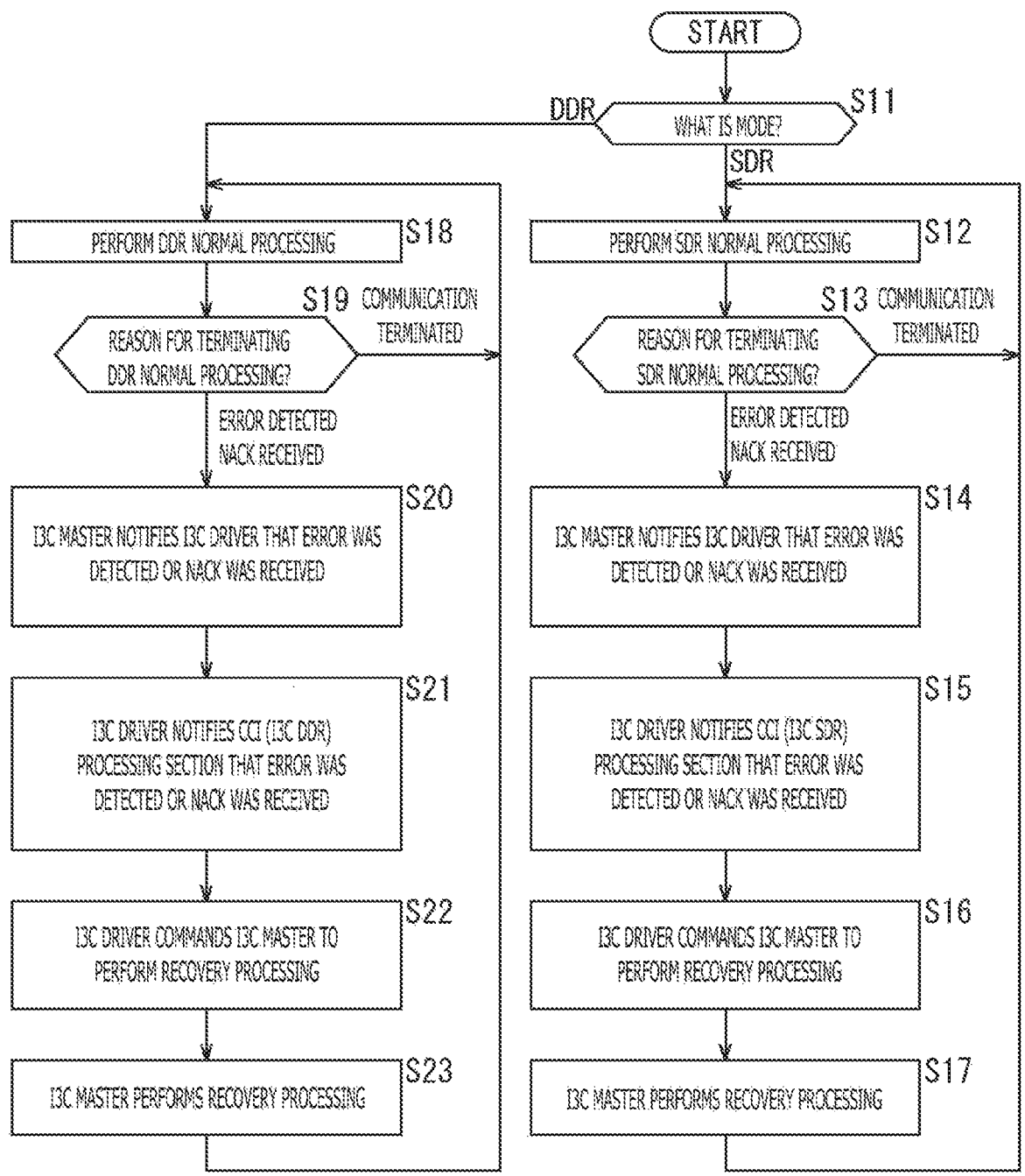
FIG. 5 is a flowchart explaining communication processing performed by an I3C layer on the side of a master.

FIG. 5 is a flowchart explaining the communication processing performed by the I3C layer on the side of the I3C master 12.

For example, the processing is started when the master device 22 is supplied with power and the I3C master 12 is activated. In step S11, under instructions from the CCI master 16, the I3C master 12 determines whether communication with the I3C slave 13 is to be performed in SDR mode or in DDR mode.

In the case where it is determined in step S11 that communication is to be performed in SDR mode, control is transferred to step S12. The I3C master 12 then performs normal communication with the I3C slave 13 in SDR mode. For example, the I3C master 12 performs SDR normal processing until the error handling section 31 detects an error, until the ACK verifying section 32 receives a NACK response, or until communication is stopped. When SDR normal processing is stopped, control is transferred to step S13.

In step S13, the I3C master 12 determines whether SDR normal processing was stopped in step S12 due to communication being stopped, due to an error being detected, or due to a NACK response being received.

In the case where it is determined in step S13 that SDR normal processing was stopped due to communication being stopped, control is returned to step S12. The I3C master 12 then continues communication by carrying out SDR normal processing.

On the other hand, in the case where it is determined in step S13 that SDR normal processing was stopped due to an error being detected or a NACK response being received, control is transferred to step S14. The I3C master 12 then notifies the I3C driver 17 that an error was detected or a NACK response was received.

In step S15, the I3C driver 17 notifies the CCI (I3C SDR) processing section 51 in the CCI master 16 that an error was detected or a NACK response was received. Then in step S16, the I3C driver 17 commands the I3C master 12 to perform recovery processing in accordance with a recovery method stipulated by the I3C protocol. Incidentally, the processing ranging from step S15 to step S16 may be implemented using software.

In step S17, the I3C master 12 performs recovery processing as commanded by the I3C driver 17 in step S16. Thereafter, control is returned to step S12. The similar steps are then repeated. For example, the error handling section 31 in the I3C master 12 sends a master abort followed by a stop or a restart, before resetting the error. This allows the I3C slave 13 to recover from the error.

On the other hand, in the case where it is determined in step S11 that communication is to be performed in DDR mode, control is transferred to step S18. The I3C master 12 then performs DDR normal processing in which normal communication with the I3C slave 13 is carried out in DDR mode. For example, the I3C master 12 performs DDR normal processing until the error handling section 31 detects an error, until the ACK verifying section 32 receives a NACK response, or until communication is stopped. Then with DDR normal processing stopped, control is transferred to step S19.

In step S19, the I3C master 12 determines whether DDR normal processing was stopped in step S18 due to communication being stopped, due to an error being detected, or due to a NACK response being received.

In the case where it is determined in step S19 that DDR normal processing was stopped due to communication being stopped, control is returned to step S18. The I3C master 12 then continues communication by carrying out DDR normal processing.

On the other hand, in the case where it is determined in step S19 that DDR normal processing was stopped due to an error being detected or a NACK response being received, control is transferred to step S20. The I3C master 12 then notifies the I3C driver 17 that an error was detected or a NACK response was received.

In step S21, the I3C driver 17 notifies the CCI (I3C DDR) processing section 52 in the CCI master 16 that an error was detected or a NACK response was received. Then in step S22, the I3C driver 17 commands the I3C master 12 to perform recovery processing in accordance with a recovery method stipulated by the I3C protocol. Incidentally, the processing ranging from step S21 to step S22 may be implemented using software.

In step S23, the I3C master 12 performs recovery processing as commanded by the I3C driver 17 in step S22. Thereafter, control is returned to step S18. The similar steps are then repeated. For example, after sending a master abort, the error handling section 31 sends HDR Exit or HDR Restart, thereby allowing the I3C slave 13 to recover from the error.

Figure 6:
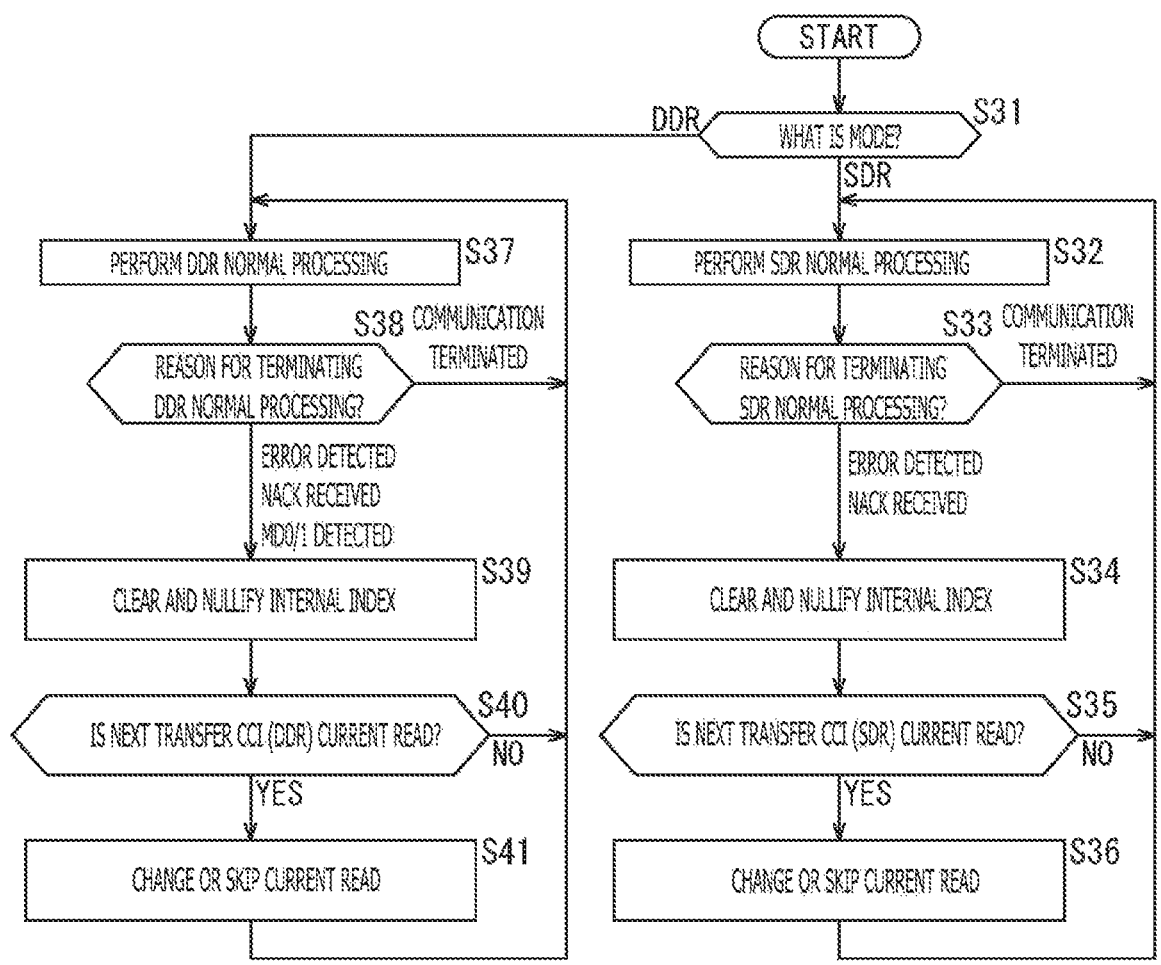
FIG. 6 is a flowchart explaining communication processing performed by a CCI layer on the side of the master.

FIG. 6 is a flowchart explaining the communication processing performed by the CCI master 16 in the master-side CCI layer. Incidentally, this communication processing may be implemented using software.

For example, the processing is started when the master device 22 is supplied with power and the CCI master 16 is activated and given instructions from an upper-layer control section, not shown, to perform communication. In step S31, the CCI master 16 determines whether communication is to be performed in SDR mode or in DDR mode. For example, the CCI master 16 determines that communication is to be performed in SDR mode at the time of starting communication. If processing is later performed to switch communication to DDR mode, the CCI master 16 determines that communication is to be carried out in DDR mode.

In the case where the CCI master 16 determines in step S31 that communication is to be performed in SDR mode, control is transferred to step S32. The CCI (I3C SDR) processing section 51 then performs SDR normal processing. For example, the CCI (I3C SDR) processing section 51 performs SDR normal processing until notification is received from the I3C driver 17 that an error was detected or a NACK response was received by the I3C master 12 in step S14 of FIG. 5 or until communication is stopped. Then when SDR normal processing is stopped, control is transferred to step S33.

In step S33, the CCI (I3C SDR) processing section 51 determines whether SDR normal processing was stopped due to communication being stopped or due to the receipt of the notification that an error was detected or a NACK response was received.

In the case where it is determined in step S33 that SDR normal processing was stopped due to communication being stopped, control is returned to step S32. The CCI (I3C SDR) processing section 51 then continues communication by carrying out SDR normal processing.

On the other hand, in the case where it is determined in step S33 that SDR normal processing was stopped due to the receipt of the notification that an error was detected or a NACK response was received, control is transferred to step S34.

In step S34, the CCI (I3C SDR) processing section 51 clears and nullifies an internal index.

In step S35, the CCI (I3C SDR) processing section 51 determines whether or not the next transfer is a CCI (SDR) current read operation to read data from the current address location.

In the case where it is determined in step S35 that the next transfer is not the CCI (SDR) current read operation, control is returned to step S32. SDR normal processing is then resumed from the next transfer.

On the other hand, in the case where it is determined in step S35 that the next transfer is the CCI (SDR) current read operation, control is transferred to step S36. In step S36, the CCI (I3C SDR) processing section 51 either inhibits the current read operation and switches to a random read operation, or skips the current read operation. After the processing in step S36, control is returned to step S32. The similar steps are then repeated.

Meanwhile, in the case where the CCI master 16 determines in step S31 that communication is to be performed in DDR mode, control is transferred to step S37. The CCI (I3C DDR) processing section 52 then performs DDR normal processing. For example, the CCI (I3C DDR) processing section 52 performs DDR normal processing until notification is received from the I3C driver 17 in step S21 of FIG. 5 that an error was detected or a NACK response was received, until an MD0 error or an MD1 error is detected, or until communication is stopped. Then when DDR normal processing is stopped, control is transferred to step S38.

In step S38, the CCI (I3C DDR) processing section 52 determines whether DDR normal processing was stopped due to communication being stopped, due to the reception of the notification that an error was detected or a NACK response was received, or due to the MD0 or MD1 error being detected.

In the case where it is determined in step S38 that DDR normal processing was stopped due to communication being stopped, control is returned to step S37. The CCI (I3C DDR) processing section 52 then continues communication by carrying out DDR normal processing.

On the other hand, in the case where it is determined in step S33 that DDR normal processing was stopped due to the receipt of the notification that an error was detected or a NACK response was received or due to the MD0 or MD1 error being detected, control is transferred to step S39.

In step S39, the CCI (I3C DDR) processing section 52 clears and nullifies the internal index.

In step S40, the CCI (I3C DDR) processing section 52 determines whether or not the next transfer is a CCI (DDR) current read operation to read data from the current address location.

In the case where it is determined in step S40 that the next transfer is not the CCI (DDR) current read operation, control is returned to step S37. DDR normal processing is then resumed from the next transfer.

On the other hand, in the case where it is determined in step S40 that the next transfer is the CCI (DDR) current read operation, control is transferred to step S41. In step S41, the CCI (I3C DDR) processing section 52 either inhibits the current read operation and switches to a random read operation, or skips the current read operation. After the processing in step S41, control is returned to step S37. The similar steps are then repeated.

Figure 7:
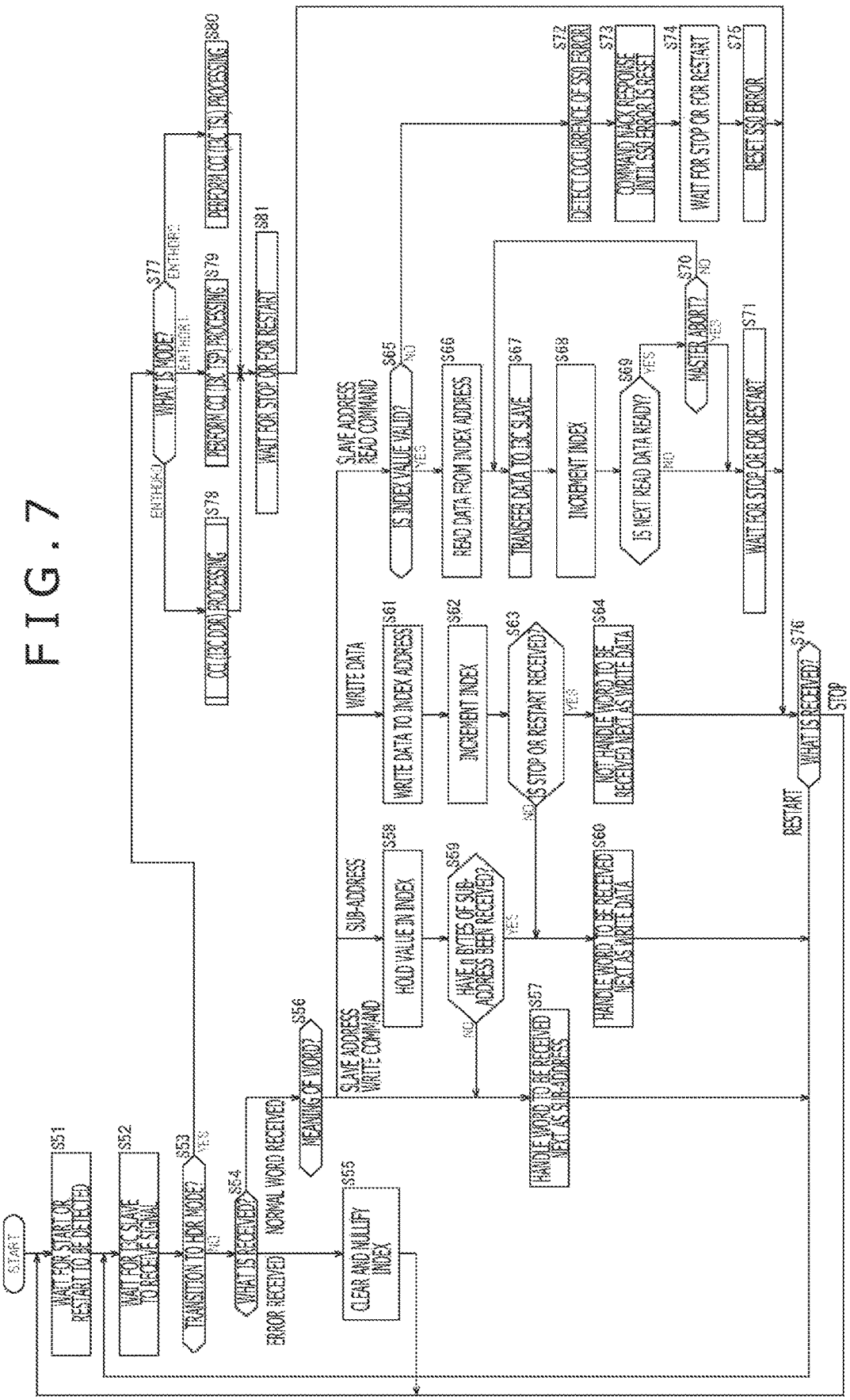
FIG. 7 is a flowchart explaining SDR communication processing performed by the CCI layer on the side of a slave.

FIG. 7 is a flowchart explaining the SDR communication processing performed by the CCI (I3C SDR) processing section 61 of the CCI slave 18 in the slave-side CCI layer.

For example, the processing is started when the slave device 23 is supplied with power and the CCI slave 18 is activated. In step S51, the CCI (I3C SDR) processing section 61 waits for processing until communication is started or restarted by the I3C master 12 so that the I3C slave 13 detects the start or the restart of communication. Thus when the start or the restart of communication is detected by the I3C slave 13, control is transferred to step S52.

In step S52, the CCI (I3C SDR) processing section 61 waits for the I3C slave 13 to receive a signal sent from the I3C master 12. When the I3C slave 13 receives the signal sent from the I3C master 12, with the CCI (I3C SDR) processing section 61 then receiving the signal from the I3C slave 13, control is transferred to step S53.

In step S53, the CCI (I3C SDR) processing section 61 determines whether or not transition is to be made to HDR mode on the basis of the signal received in step S52.

In the case where the CCI (I3C SDR) processing section 61 determines in step S53 that transition is not to be made to HDR mode, control is transferred to step S54.

In step S54, the error handling section 63 determines whether the word based on the signal received by the CCI (I3C SDR) processing section 61 in step S52 is erroneously or normally received.

In the case where the error handling section 63 determines in step S54 that the word is erroneously received, control is transferred to step S55. In step S55, the error handling section 63 clears and nullifies the index. Thereafter, control is returned to step S51 and the similar steps are repeated.

On the other hand, in the case where the error handling section 63 determines in step S54 that the word is normally received, control is transferred to step S56. In step S56, the CCI (I3C SDR) processing section 61 determines what the normally received word means.

In the case where the CCI (I3C SDR) processing section 61 determines in step S56 that the word means a slave address and a write command, control is transferred to step S57. In step S57, the CCI (I3C SDR) processing section 61 handles as a sub-address the word to be received next from the I3C slave 13. Control is then returned to step S52.

On the other hand, in the case where the CCI (I3C SDR) processing section 61 determines in step S56 that the word means a sub-address, control is transferred to step S58. In step S58, the CCI (I3C SDR) processing section 61 holds the value of the word in the index.

In step S59, the CCI (I3C SDR) processing section 61 determines whether or not n bytes of the sub-address have been received.

In the case where the CCI (I3C SDR) processing section 61 determines in step S59 that n bytes of the sub-address have not been received, control is transferred to step S57. The subsequent steps are then repeated.

On the other hand, in the case where the CCI (I3C SDR) processing section 61 determines in step S59 that n bytes of the sub-address have been received, control is transferred to step S60. In step S60, the CCI (I3C SDR) processing section 61 handles as write data the word to be received next from the I3C slave 13. Control is then returned to step S52.

Meanwhile, in the case where the CCI (I3C SDR) processing section 61 determines in step S56 that the word means write data, control is transferred to step S61. In step S61, the CCI (I3C SDR) processing section 61 writes the value of the data to the index address being held.

In step S62, the CCI (I3C SDR) processing section 61 increments the index (by 1). In step S63, the CCI (I3C SDR) processing section 61 determines whether or not a stop or a restart (repeated start) is received from the I3C slave 13.

In the case where the CCI (I3C SDR) processing section 61 determines in step S63 that a stop or a restart is not received, control is transferred to step S60. The subsequent steps are then repeated.

On the other hand, in the case where the CCI (I3C SDR) processing section 61 determines in step S63 that a stop or a restart is received, control is transferred to step S64. In step S64, the CCI (I3C SDR) processing section 61 does not handle as write data the word to be received next from the I3C slave 13. Thereafter, control is transferred to step S76.

Meanwhile, in the case where the CCI (I3C SDR) processing section 61 determines in step S56 that the word means a slave address and a read command, control is transferred to step S65.

In step S65, the CCI (I3C SDR) processing section 61 determines whether or not the index value being held is valid.

In the case where the CCI (I3C SDR) processing section 61 determines in step S65 that the index value being held is valid (i.e., the index is correctly defined), control is transferred to step S66. In step S66, the CCI (I3C SDR) processing section 61 reads data from the index address being held.

In step S67, the CCI (I3C SDR) processing section 61 transfers the data read in step S66 to the I3C slave 13. In step S68, the CCI (I3C SDR) processing section 61 increments the index (by 1).

In step S69, the CCI (I3C SDR) processing section 61 determines whether or not the next read data is ready. In the case where the CCI (I3C SDR) processing section 61 determines in step S69 that the next read data is ready, control is transferred to step S70. The CCI (I3C SDR) processing section 61 then determines whether or not the I3C slave 13 has notified that a master abort was received.

In the case where the CCI (I3C SDR) processing section 61 determines in step S70 that the I3C slave 13 has not notified that a master abort was received, control is returned to step S67. The data is then read continuously.

On the other hand, in the case where it is determined in step S69 that the next read data is not ready or where it is determined in step S70 that the I3C slave 13 has notified that a master abort was received, control is transferred to step S71. In step S71, the CCI (I3C SDR) processing section 61 waits for a stop or for a restart. Then upon receipt of the stop or the restart from the I3C slave 13, control is transferred to step S76.

Meanwhile, in the case where the CCI (I3C SDR) processing section 61 determines in step S65 that the index value being held is not valid (e.g., the index is undefined and invalid), control is transferred to step S72. In step S72, the error handling section 63 detects occurrence of an SS0 error on the basis of the determination made by the CCI (I3C SDR) processing section 61 that the index value being held is not valid.

In step S73, the error handling section 63 commands the I3C slave 13 to send a NACK response until the SS0 error is reset.

In step S74, the error handling section 63 waits for a stop or for a restart. Upon receipt of the stop or the restart from the I3C slave 13, control is transferred to step S75.

In step S75, the error handling section 63 resets the SS0 error following the receipt of the stop or the restart in step S74. Thereafter, control is transferred to step S76.

In step S76, the CCI (I3C SDR) processing section 61 determines which of the stop and the restart is received from the I3C slave 13.

In the case where the CCI (I3C SDR) processing section 61 determines in step S76 that the restart is received, control is returned to step S52. In the case where the CCI (I3C SDR) processing section 61 determines in step S76 that the stop is received, control is returned to step S51. The similar steps are then repeated.

On the other hand, in the case where the CCI (I3C SDR) processing section 61 determines in step S53 that transition is to be made to HDR mode, control is transferred to step S77.

In step S77, the CCI (I3C SDR) processing section 61 determines the type of mode in accordance with the signal determined to cause transition to HDR mode in step S53.

In the case where the signal determined to cause transition to HDR mode in step S53 is ENTHDR0, the CCI (I3C SDR) processing section 61 determines in step S77 that transition is to be made to DDR mode. Control is then transferred to step S78. In step S78, the CCI (I3C DDR) processing section 62 performs CCI (I3C DDR) processing (to be discussed later with reference to FIG. 8). Thereafter, control is transferred to step S81.

On the other hand, in the case where the signal determined to cause transition to HDR mode in step S53 is ENTHDR1, the CCI (I3C SDR) processing section 61 determines in step S77 that transition is to be made to TSP mode. Control is then transferred to step S79. In step S79, CCI (I3C TSP) processing is performed. Thereafter, control is transferred to step S81.

Meanwhile, in the case where the signal determined to cause transition to HDR mode in step S53 is ENTHDR2, the CCI (I3C SDR) processing section 61 determines in step S77 that transition is to be made to TSL mode. Control is then transferred to step S80. In step S80, CCI (I3C TSL) processing is performed. Thereafter, control is transferred to step S81.

In step S81, the CCI (I3C SDR) processing section 61 waits for a stop or a restart to be received from the I3C slave 13. Upon receipt of the stop or the restart, control is transferred to step S76. The subsequent steps are then repeated.

Figure 8:
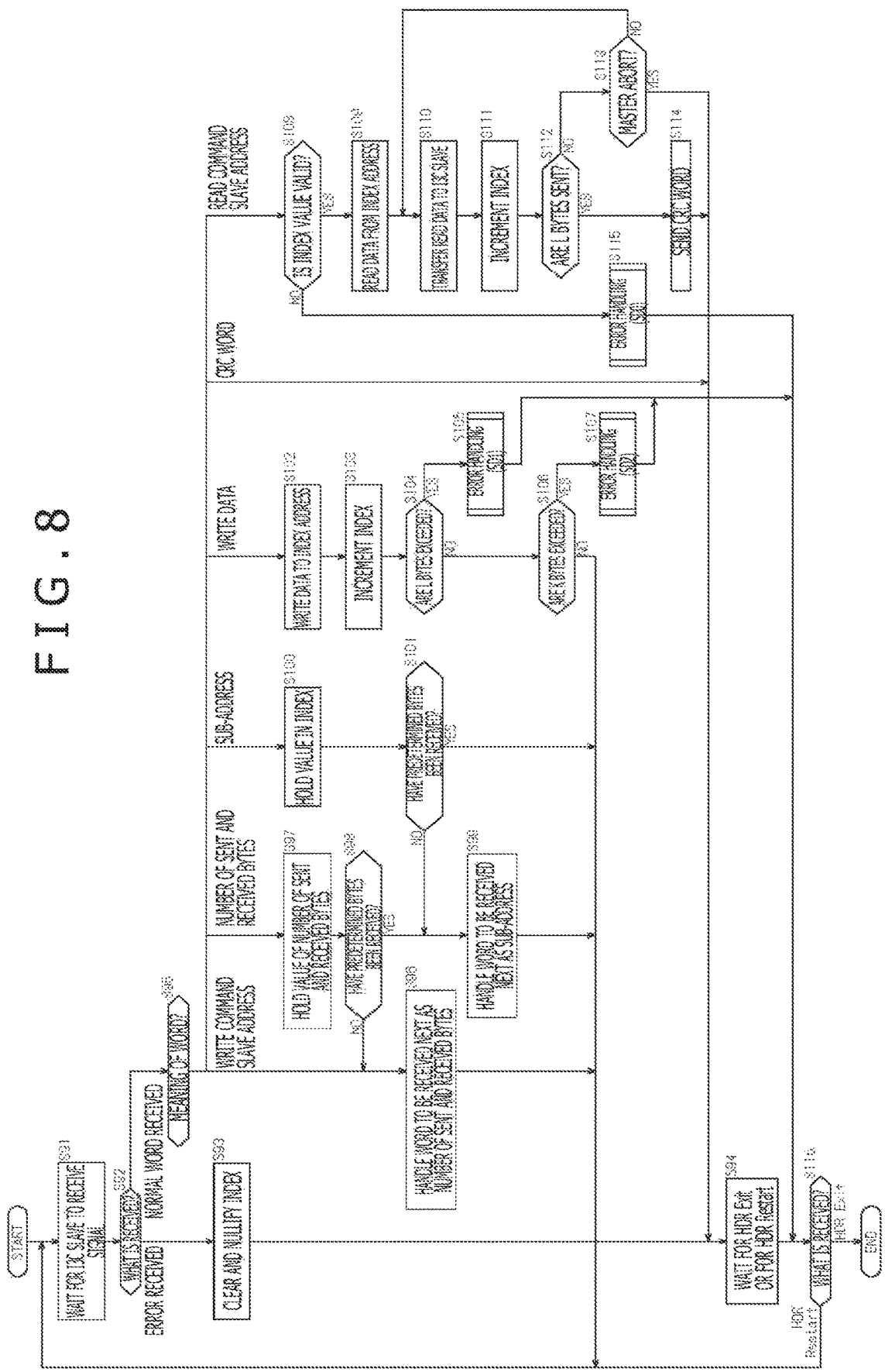
FIG. 8 is a flowchart explaining CCI (I3C DDR) processing performed by the CCI layer on the side of the slave.

FIG. 8 is a flowchart explaining the CCI (I3C DDR) processing (step S78 in FIG. 7) performed by the CCI (I3C DDR) processing section 62 of the CCI slave 18 in the slave-side the CCI layer.

In step S91, the CCI (I3C DDR) processing section 62 waits for the I3C slave 13 to receive a signal sent from the I3C master 12. When the I3C slave 13 receives the signal sent from the I3C master 12, with the CCI (I3C DDR) processing section 62 then receiving the signal from the I3C slave 13, control is transferred to step S92.

In step S92, the error handling section 63 determines whether the word based on the signal received by the CCI (I3C DDR) processing section 62 in step S91 is erroneously or normally received.

In the case where the error handling section 63 determines in step S92 that the word is erroneously received, control is transferred to step S93. The error handling section 63 then clears and nullifies the index. Thereafter, control is transferred to step S94. The CCI (I3C DDR) processing section 62 then waits for HDR Exit or HDR Restart. Then upon receipt of HDR Exit or HDR Restart from the I3C slave 13, control is transferred to step S116.

On the other hand, in the case where the error handling section 63 determines in step S92 that the word is normally received, control is transferred to step S95. In step S95, the CCI (I3C DDR) processing section 62 determines what the normally received word means.

In the case where the CCI (I3C DDR) processing section 62 determines in step S95 that the word means a write command a slave address, control is transferred to step S96. In step S96, the CCI (I3C DDR) processing section 62 handles the word to be received next from the I3C slave 13 as the number of sent and received bytes (LENGTH). Control is then returned to step S91.

On the other hand, in the case where the CCI (I3C DDR) processing section 62 determines in step S95 that the word means the number of sent and received bytes, control is transferred to step S97. In step S97, the CCI (I3C DDR) processing section 62 holds the value of the number of sent and received bytes (L bytes).

In step S98, the CCI (I3C DDR) processing section 62 determines whether or not a predetermined number of bytes have been received with regard to the number of sent and received bytes. In the case where the CCI (I3C DDR) processing section 62 determines in step S98 that the predetermined number of bytes have not been received, control is transferred to step S96. The subsequent steps are then repeated.

On the other hand, in the case where the CCI (I3C DDR) processing section 62 determines in step S98 that the predetermined number of bytes have been received, control is transferred to step S99. In step S99, the CCI (I3C DDR) processing section 62 handles as a sub-address the word to be received next from the I3C slave 13. Control is then returned to step S91.

Meanwhile, in the case where the CCI (I3C DDR) processing section 62 determines in step S95 that the word means a sub-address, control is transferred to step S100. In step S100, the CCI (I3C DDR) processing section 62 holds the value of the sub-address in the index.

In step S101, the CCI (I3C DDR) processing section 62 determines whether or not a predetermined number of bytes have been received with regard to the sub-address. In the case where the CCI (I3C DDR) processing section 62 determines in step S101 that the predetermined number of bytes have not been received, control is transferred to step S99. The subsequent steps are then repeated. If the CCI (I3C DDR) processing section 62 determines that the predetermined number of bytes have been received, control is returned to step S91.

On the other hand, in the case where the CCI (I3C DDR) processing section 62 determines in step S95 that the word means write data, control is transferred to step S102. In step S102, the CCI (I3C DDR) processing section 62 writes the data to the index address being held.

In step S103, the CCI (I3C DDR) processing section 62 increments the index (by 1). In step S104, the CCI (I3C DDR) processing section 62 determines whether or not the write data received so far has exceeded the number of sent and received bytes (L bytes).

In the case where the CCI (I3C DDR) processing section 62 determines in step S104 that the write data has exceeded the number of sent and received bytes (L bytes), control is transferred to step S105. In step S105, the error handling section 63 detects occurrence of an SD1 error and performs error handling processing (to be discussed later with reference to FIG. 9). Thereafter, control is transferred to step S116.

On the other hand, in the case where the CCI (I3C DDR) processing section 62 determines in step S104 that the write data has not exceeded the number of sent and received bytes (L bytes), control is transferred to step S106. In step S106, the CCI (I3C DDR) processing section 62 determines whether or not the write data received so far has exceeded a predetermined number of bytes (K bytes).

In the case where the CCI (I3C DDR) processing section 62 determines in step S106 that the write data has exceeded the predetermined number of bytes (K bytes), control is transferred to step S107. In step S107, the error handling section 63 detects occurrence of an SD2 error and performs the error handling processing (to be discussed later with reference to FIG. 9). Thereafter, control is transferred to step S116. On the other hand, in the case where the CCI (I3C DDR) processing section 62 determines in step S106 that the write data has not exceeded the predetermined number of bytes (K bytes), control is returned to step S91.

Meanwhile, in the case where the CCI (I3C DDR) processing section 62 determines in step S95 that the word means a CRC word, control is transferred to step S94. The subsequent steps are then repeated.

On the other hand, in the case where the CCI (I3C DDR) processing section 62 determines in step S95 that the word means a read command and a slave address, control is transferred to step S108. In step S108, the CCI (I3C DDR) processing section 62 determines whether or not the index value being held is valid.

Meanwhile, in the case where the CCI (I3C DDR) processing section 62 determines in step S108 that the index value being held is valid (e.g., the index is correctly defined), control is transferred to step S109. In step S109, the CCI (I3C DDR) processing section 62 reads data from the index address being held.

In step S110, the CCI (I3C DDR) processing section 62 transfers the data read in step S109 to the I3C slave 13. In step S111, the CCI (I3C DDR) processing section 62 increments the index (by 1).

In step S112, the CCI (I3C DDR) processing section 62 determines whether or not the read data sent so far has exceeded the number of sent and received bytes (L bytes). In the case where the CCI (I3C DDR) processing section 62 determines in step S112 that the read data has not exceeded the number of sent and received bytes (L bytes), control is transferred to step S113.

In step S113, the CCI (I3C DDR) processing section 62 determines whether or not the I3C slave 13 has given notification of the receipt of a master abort. In the case where the CCI (I3C DDR) processing section 62 determines in step S113 that the I3C slave 13 has not given notification of the receipt of a master abort, control is returned to step S110. The data is then continuously read. On the other hand, in the case where the CCI (I3C DDR) processing section 62 determines in step S113 that the I3C slave 13 has given notification of the receipt of a master abort, control is transferred to step S94. The subsequent steps are then repeated.

On the other hand, in the case where it is determined in step S112 that the read data has exceeded the number of sent and received bytes (L bytes), control is transferred to step S114. In step S114, the CCI (I3C DDR) processing section 62 sends a CRC word. Thereafter, control is transferred to step S94. The subsequent steps are then repeated.

Meanwhile, in the case where the CCI (I3C DDR) processing section 62 determines in step S108 that the index value being held is not valid (e.g., the index is undefined and invalid), control is transferred to step S115. In step S115, on the basis of the determination made by the CCI (I3C SDR) processing section 61 that the index value being held is not valid, the error handling section 63 detects occurrence of an SD0 error and performs the error handling processing (to be discussed later with reference to FIG. 9). Thereafter, control is transferred to step S116.

In step S116, the CCI (I3C DDR) processing section 62 determines which of HDR Restart and HDR Exit is received from the I3C slave 13.

In the case where the CCI (I3C DDR) processing section 62 determines in step S116 that HDR Restart is received, control is returned to step S91. The similar steps are then repeated. On the other hand, in the case where the CCI (I3C DDR) processing section 62 determines in step S116 that HDR Exit is received, the processing is brought to an end.

Figure 9:
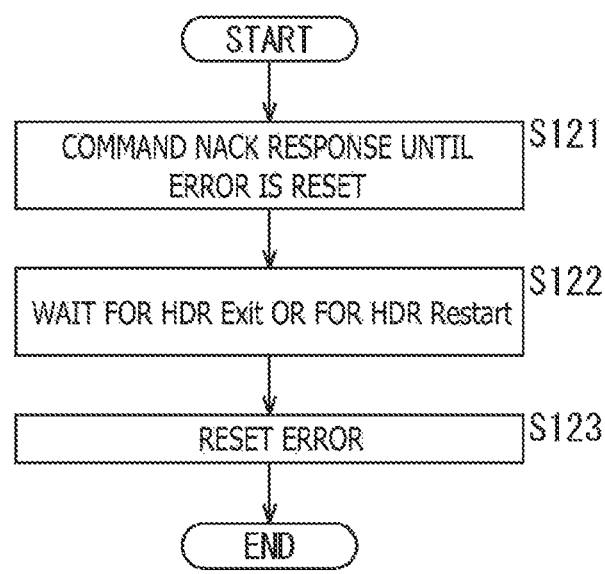
FIG. 9 is a flowchart explaining error handling processing.

FIG. 9 is a flowchart explaining the error handling processing performed by the error handling section 63 of the CCI slave 18 in step S105, in step S107, or in step S115 of FIG. 8.

In step S121, the error handling section 63 commands the I3C slave 13 to send a NACK response until the error (SD0 error, SD1 error, or SD2 error) is reset.

In step S122, the error handling section 63 waits for HDR Exit or HDR Restart. Then upon receipt of HDR Exit or HDR Restart from the I3C slave 13, control is transferred to step S123.

In step S123, the error handling section 63 resets the error (SD0 error, SD1 error, or SD2 error) following the receipt of HDR Exit or HDR Restart in step S122. Thereafter, the processing is brought to an end.

Figure 10:
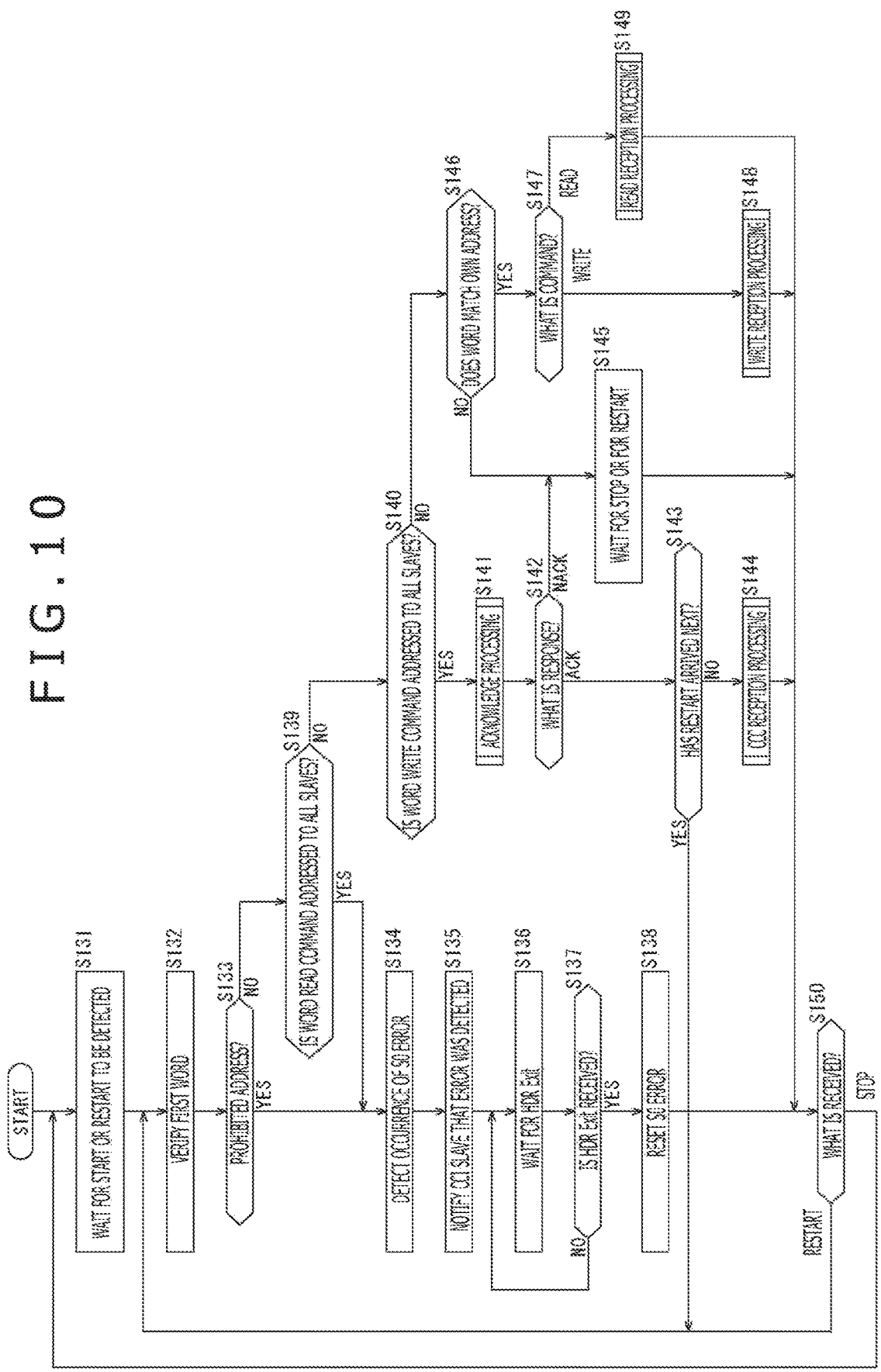
FIG. 10 is a flowchart explaining SDR communication processing performed by the I3C layer on the side of the slave.

FIG. 10 is a flowchart explaining the SDR communication processing performed by the I3C (SDR) processing section 41 in the slave-side I3C layer.

For example, the processing is started when the slave device 23 is supplied with power and the I3C slave 13 is activated. In step S131, the I3C (SDR) processing section 41 waits for processing until the I3C master 12 starts or restarts communication so that the start or the restart of communication is detected. Then when the I3C (SDR) processing section 41 detects the start or the restart of communication, control is transferred to step S132.

In step S132, the I3C (SDR) processing section 41 verifies a first word sent immediately following the start or the restart of communication. In step S133, the I3C (SDR) processing section 41 determines whether or not the first word is a prohibited address.

In the case where the I3C (SDR) processing section 41 determines in step S133 that the first word is a prohibited address, control is transferred to step S134. In step S134, on the basis of the determination made by the I3C (SDR) processing section 41 that the first word is a prohibited address, the error handling section 43 detects occurrence of an S0 error.

In step S135, the error handling section 43 notifies the CCI slave 18 that the S0 error has occurred.

In step S136, the I3C (SDR) processing section 41 waits for HDR Exit. In step S137, the I3C (SDR) processing section 41 determines whether or not HDR Exit is received. In the case where the I3C (SDR) processing section 41 determines that HDR Exit is not received, control is returned to step S136. In step S136, the I3C (SDR) processing section 41 waits continuously for HDR Exit.

On the other hand, in the case where the I3C (SDR) processing section 41 determines in step S137 that HDR Exit is received, control is transferred to step S138. In step S138, the error handling section 43 resets the S0 error following the receipt of HDR Exit by the I3C (SDR) processing section 41 in step S137. Thereafter, control is transferred to step S150.

Meanwhile, in the case where the I3C (SDR) processing section 41 determines in step S133 that the first word is not a prohibited address, control is transferred to step S139. In step S139, the I3C (SDR) processing section 41 determines whether or not the first word is a read command (7'h7E+R) addressed to all I3C slaves 13 connected with the I3C bus 11.

In the case where the I3C (SDR) processing section 41 determines in step S139 that the first word is the read command (7'h7E+R), control is transferred to step S134 in which occurrence of the S0 error is detected. The subsequent steps are then repeated.

On the other hand, in the case where the I3C (SDR) processing section 41 determines in step S139 that the first word is not the read command (7'h7E+R), control is transferred to step S140. In step S140, the I3C (SDR) processing section 41 determines whether or not the first word is a write command (7'h7E+W) addressed to all I3C slaves 13 connected with the I3C bus 11.

In the case where the I3C (SDR) processing section 41 determines in step S140 that the first word is the write command (7'h7E+W), control is transferred to step S141. The acknowledge processing section 71 then performs acknowledge processing (to be discussed later with reference to FIG. 11).

In step S142, the I3C (SDR) processing section 41 determines which of the ACK and NACK responses was sent during the acknowledge processing of step S141.

In the case where the I3C (SDR) processing section 41 determines in step S142 that the ACK response was sent, control is transferred to step S143. In step S143, the I3C (SDR) processing section 41 determines whether or not a restart has arrived next. In the case where the I3C (SDR) processing section 41 determines that the restart has arrived next, control is returned to step S132.

On the other hand, in the case where the I3C (SDR) processing section 41 determines in step S143 that the restart has not arrived next, control is transferred to step S144. That is, the first word in this case is a CCC, so that the CCC reception processing section 73 performs CCC reception processing (to be discussed later with reference to FIG. 13). Thereafter, control is transferred to step S150.

Meanwhile, in the case where the I3C (SDR) processing section 41 determines in step S142 that the NACK response was sent, control is transferred to step S145. The I3C (SDR) processing section 41 then waits for a stop or for a restart. Upon receipt of the stop or the restart, control is transferred to step S150.

On the other hand, in the case where the I3C (SDR) processing section 41 determines in step S140 that the first word is not the write command (7'h7E+W), control is transferred to step S146. That is, the first word in this case is the address of one of multiple I3C slaves 13 connected with the I3C bus 11. In step S146, the I3C (SDR) processing section 41 determines whether or not the first word matches the own address.

In the case where the I3C (SDR) processing section 41 determines in step S146 that the first word does not match the own address, control is transferred to step S145. That is, the first word in this case is the address of another I3C slave 13. Thus in step S145, the I3C (SDR) processing section 41 waits for a stop or for a restart.

On the other hand, in the case where the I3C (SDR) processing section 41 determines in step S146 that the first word matches the own address, control is transferred to step S147. In step S147, the I3C (SDR) processing section 41 determines whether the command sent together with the own address is a write command or a read command.

In the case where the I3C (SDR) processing section 41 determines in step S147 that the command is the write command, control is transferred to step S148. The write reception processing section 72 then performs write reception processing (to be discussed later with reference to FIG. 12). Thereafter, control is transferred to step S150.

On the other hand, in the case where the I3C (SDR) processing section 41 determines in step S147 that the command is the read command, control is transferred to step S149. The read reception processing section 74 then performs read reception processing (to be discussed later with reference to FIG. 14). Thereafter, control is transferred to step S150.

In step S150, the I3C (SDR) processing section 41 determines which of the stop and the restart is received.

In the case where the I3C (SDR) processing section 41 determines in step S150 that the restart is received, control is returned to step S132. In the case where the I3C (SDR)

processing section 41 determines that the stop is received, control is returned to step S131. The similar steps are then repeated.

Figure 11:
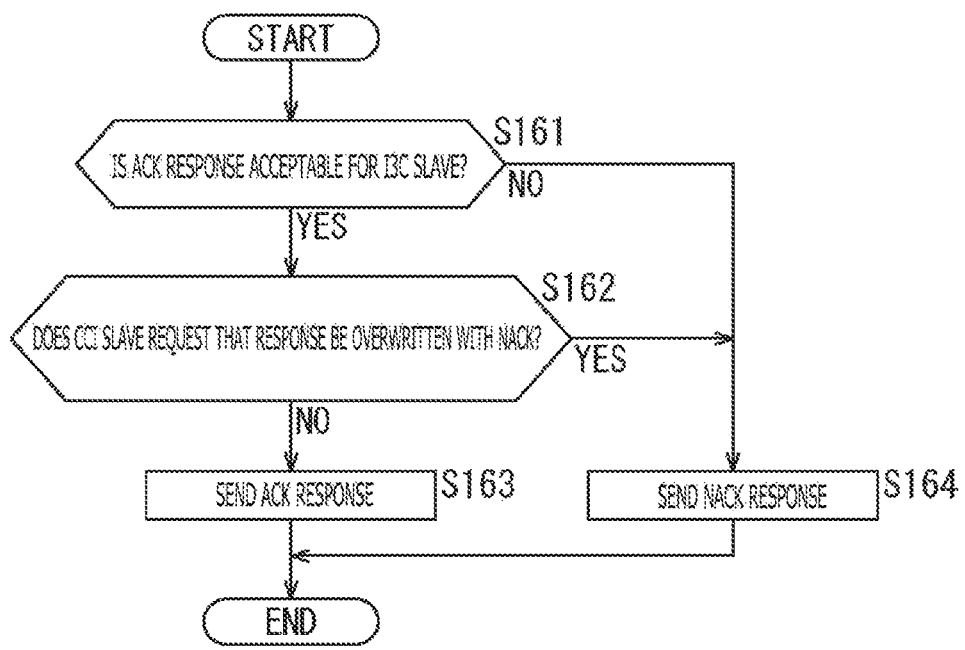
FIG. 11 is a flowchart explaining acknowledge processing.

FIG. 11 is a flowchart explaining the acknowledge processing performed by the acknowledge processing section 71 in step S141 of FIG. 10.

In step S161, the acknowledge processing section 71 determines whether or not an ACK response is acceptable for the I3C slave 13 with regard to the above-described write command (7'h7E+W). For example, in the case where the command or the data is normally received, the acknowledge processing section 71 determines that the ACK response is to be sent. In the case where the command or the data is erroneously received, the acknowledge processing section 71 determines that the ACK response is not to be sent (i.e., the NACK response is to be sent).

In the case where the acknowledge processing section 71 determines in step S161 that the ACK response is acceptable for the I3C slave 13, control is transferred to step S162.

In step S162, given the determination made by the acknowledge processing section 71 in step S161 that the ACK response is acceptable, the error handling section 76 determines whether or not the CCI slave 18 is requesting that the response be overwritten with a NACK. For example, the CCI slave 18 requests that the response be overwritten with the NACK until the SS0 error is reset regardless of the I3C protocol as discussed above.

In the case where the error handling section 76 determines in step S162 that the CCI slave 18 is not requesting that the response be overwritten with the NACK, control is transferred to step S163. The acknowledge processing section 71 then sends the ACK response. Thereafter, the processing is brought to an end.

On the other hand, in the case where the acknowledge processing section 71 determines in step S161 that the ACK response is not acceptable for the I3C slave 13 (i.e., the NACK response is to be sent), control is transferred to step S164. Likewise, in the case where the error handling section 76 determines in step S162 that the CCI slave 18 is requesting that the response be overwritten with the NACK, control is transferred to step S164. In step S164, the acknowledge processing section 71 sends the NACK response. Thereafter, the processing is brought to an end.

Figure 12:
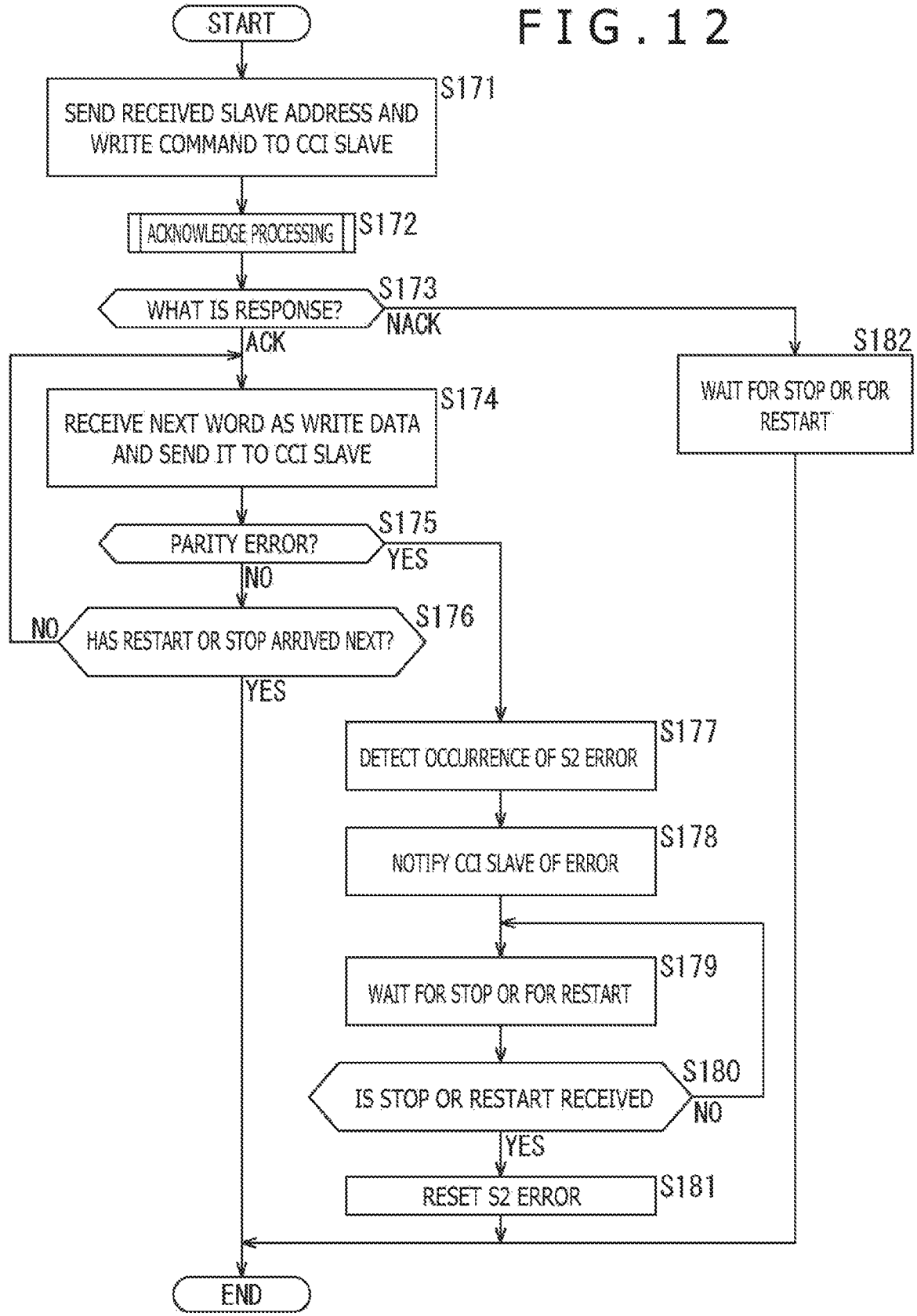
FIG. 12 is a flowchart explaining write reception processing.

FIG. 12 is a flowchart explaining the write reception processing performed by the write reception processing section 72 in step S148 of FIG. 10.

In step S171, the write reception processing section 72 sends the received slave address and write command to the CCI slave 18.

In step S172, the acknowledge processing section 71 performs the acknowledge processing (discussed above with reference to FIG. 11). In step S173, the write reception processing section 72 determines which of the ACK and NACK responses was sent during the acknowledge processing.

In the case where the write reception processing section 72 determines in step S173 that the ACK response was sent, control is transferred to step S174. In step S174, the write reception processing section 72 receives the next word as write data and sends the received write data to the CCI slave 18.

In step S175, the write reception processing section 72 determines whether or not there is a parity error in the write data received in step S173.

In the case where it is determined in step S175 that there is no parity error, control is transferred to step S176. The write reception processing section 72 then determines whether or not a restart or a stop has arrived next. In the case where the write reception processing section 72 determines in step S176 that the restart or the stop has not arrived next, control is returned to step S174. The similar steps are then repeated.

On the other hand, in the case where it is determined in step S176 that the restart or the stop has arrived next, the processing is brought to an end.

Meanwhile, in the case where the write reception processing section 72 determines in step S175 that there is a parity error, control is transferred to step S177. In step S177, on the basis of the determination made by the write reception processing section 72 that there is a parity error, the error handling section 76 detects occurrence of an S2 error.

In step S178, the error handling section 76 notifies the CCI slave 18 that an S2 error has occurred.

In step S179, the write reception processing section 72 waits for a stop or for a restart. In step S180, the write reception processing section 72 determines whether or not the stop or the restart is received.

In the case where the write reception processing section 72 determines in step S180 that the stop or the restart is not received, control is returned to step S179. The write reception processing section 72 then waits continuously for a stop or for a restart.

On the other hand, in the case where the write reception processing section 72 determines in step S180 that the stop or the restart is received, control is transferred to step S181. In step S181, upon receipt of the stop or the restart by the write reception processing section 72 in step S180, the error handling section 43 resets the S2 error. Thereafter, the processing is brought to an end.

Meanwhile, in the case where the write reception processing section 72 determines in step S173 that the NACK response was sent, control is transferred to step S182. In step S182, the write reception processing section 72 waits for a stop or for a restart. Upon receipt of the stop or the restart, the processing is brought to an end.

Figure 13:
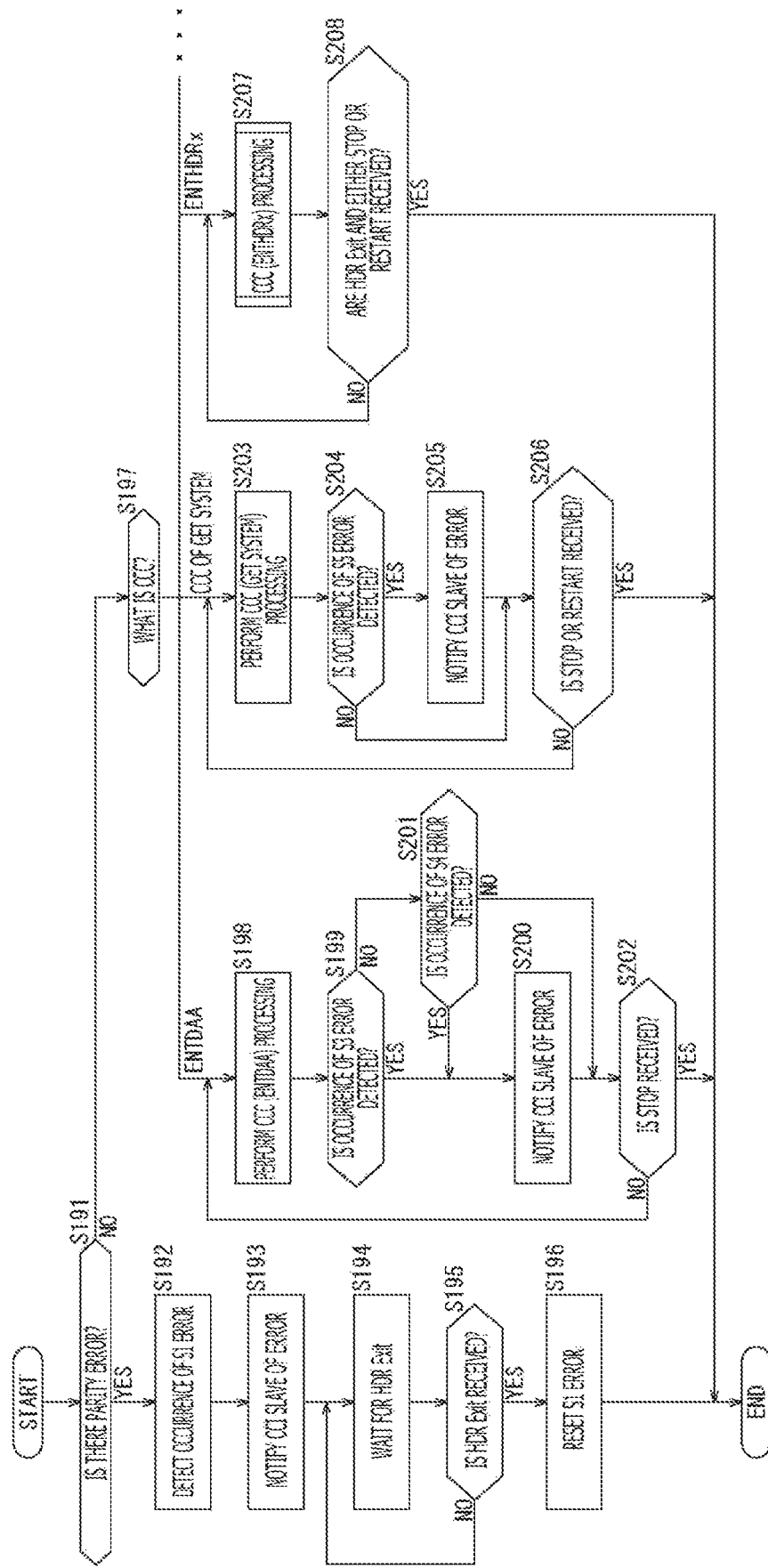
FIG. 13 is a flowchart explaining CCC reception processing.

FIG. 13 is a flowchart explaining the CCC reception processing performed by the CCC reception processing section 73 in step S144 of FIG. 10.

In step S191, the CCC reception processing section 73 determines whether or not there is a parity error in the CCC.

In the case where the CCC reception processing section 73 determines in step S191 that there is a parity error, control is transferred to step S192. In step S192, on the basis of the determination made by the CCC reception processing section 73 that there is a parity error, the error handling section 76 detects occurrence of an S1 error.

In step S193, the error handling section 76 notifies the CCI slave 18 that an S1 error has occurred.

In step S194, the CCC reception processing section 73 waits for HDR Exit. In step S195, the CCC reception processing section 73 determines whether or not HDR Exit is received. In the case where the CCC reception processing section 73 determines in step S195 that HDR Exit is not received, control is returned to step S194. The CCC reception processing section 73 then waits continuously for HDR Exit.

On the other hand, in the case where the CCC reception processing section 73 determines in step S195 that HDR Exit is received, control is transferred to step S196. In step S196, upon receipt of HDR Exit by the CCC reception processing section 73 in step S195, the error handling section 76 rests the S1 error. Thereafter, the processing is brought to an end.

Meanwhile, in the case where the CCC reception processing section 73 determines in step S191 that there is no parity error, control is transferred to step S197. In step S197, the CCC reception processing section 73 determines what is ordered by the CCC.

In the case where the CCC reception processing section 73 determines in step S197 that what is ordered by the CCC is a CCC (ENTDAA) ordering dynamic address assignment, control is transferred to step S198.

In step S198, CCC (ENTDAA) processing involving dynamic address assignment is performed.

In step S199, the error handling section 76 determines whether or not occurrence of an S3 error was detected during the CCC (ENTDAA) processing in step S198.

In the case where the error handling section 76 determines in step S199 that occurrence of the S3 error was detected, control is transferred to step S200. In step S200, the error handling section 76 notifies the CCI slave 18 that occurrence of the S3 error was detected.

On the other hand, in the case where the error handling section 76 determines in step S199 that occurrence of the S3 error was not detected, control is transferred to step S201. In step S201, the error handling section 76 determines whether or not occurrence of an S4 error was detected during the CCC (ENTDAA) processing in step S198.

In the case where the error handling section 76 determines in step S201 that occurrence of the S4 error was detected, control is transferred to step S200. In this case, the error handling section 76 notifies the CCI slave 18 in step S200 that the S4 error was detected.

Following the processing in step S200, control is transferred to step S202. Likewise, in the case where the error handling section 76 determines in step S201 that occurrence of the S4 error was not detected, i.e., that the occurrence of both the S3 error and the S4 error was not detected, control is transferred to step S202.

In step S202, the CCC reception processing section 73 determines whether or not a stop is received. In the case where the CCC reception processing section 73 determines in step S202 that the stop is not received, control is returned to step S198. The similar steps are then repeated. In the case where it is determined that the stop is received, the processing is brought to an end.

On the other hand, in the case where the CCC reception processing section 73 determines in step S197 that what is ordered by the CCC is a CCC (GET system) ordering a request for various items of information to be sent and acquired, control is transferred to step S203.

In step S203, CCC (GET system) processing involving the request for various items of information to be sent and acquired is carried out.

In step S204, the error handling section 76 determines whether or not occurrence of an S5 error was detected during the CCC (GET system) processing in step S203.

In the case where the error handling section 76 determines in step S204 that occurrence of the S5 error was detected, control is transferred to step S205. In step S205, the error handling section 76 notifies the CCI slave 18 that the S5 error was detected.

Following the processing in step S205 or in the case where it is determined in step S204 that the S5 error was not detected, control is transferred to step S206. In step S206, the CCC reception processing section 73 determines whether or not a stop or a restart is received.

In the case where the CCC reception processing section 73 determines in step S206 that the stop or the restart is not received, control is returned to step S203. The similar steps are then repeated. In the case where it is determined that the stop or the restart is received, the processing is brought to an end.

On the other hand, in the case where the CCC reception processing section 73 determines in step S197 that what is ordered by the CCC is a CCC (ENTHDRx) ordering the start of HDR mode, control is transferred to step S207.

In step S207, the HDR start processing section 75 performs CCC (ENTHDRx) processing to start HDR mode.

In step S208, it is determined whether or not HDR Exit is received followed by either a stop or a restart during the CCC (ENTHDRx) processing in step S207. The CCC (ENTHDRx) processing is carried out continuously until it is determined that HDR Exit is received followed by either the stop or the restart. When it is determined that HDR Exit is received followed by either the stop or the restart, the processing is brought to an end.

Incidentally, although FIG. 13 indicates the CCC (ENTDAA) processing, CCC (GET system) processing, and CCC (ENTHDRx) processing as examples, many other CCCs are used in practice.

Figure 14:
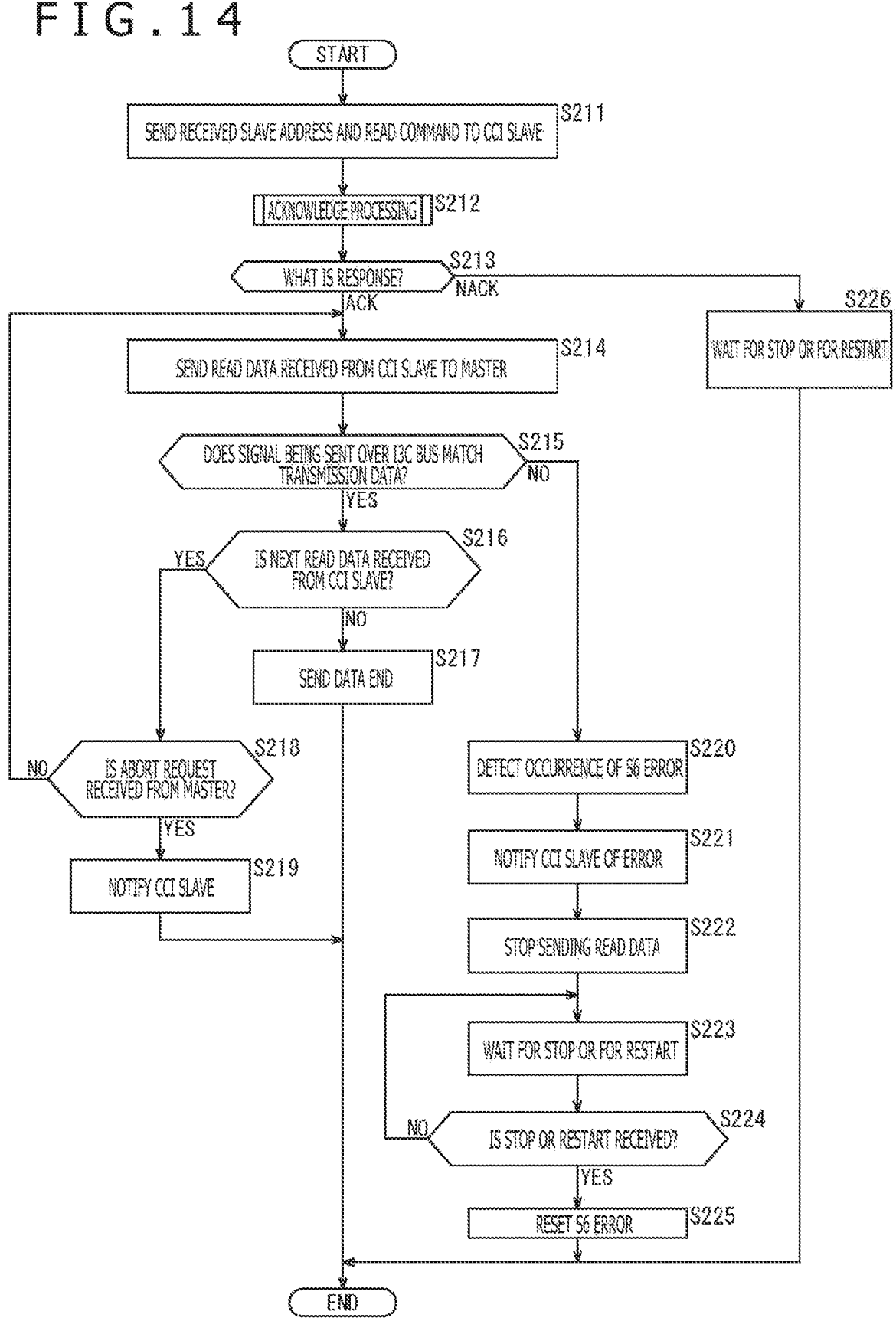
FIG. 14 is a flowchart explaining read reception processing.

FIG. 14 is a flowchart explaining the read reception processing performed by the read reception processing section 74 in step S149 of FIG. 10.

In step S211, the read reception processing section 74 sends the received slave address and read command to the CCI slave 18.

In step S212, the acknowledge processing (discussed above with reference to FIG. 11) is performed by the acknowledge processing section 71. In step S213, the read reception processing section 74 determines which of the ACK and NACK responses was sent during the acknowledge processing.

In the case where the read reception processing section 74 determines in step S213 that the ACK response was sent, control is transferred to step S214. In step S214, the read reception processing section 74 sends the read data received from the CCI slave 18 to the I3C master 12.

In step S215, the read reception processing section 74 determines whether or not the signal being sent over the I3C bus 11 matches transmission data.

In the case where the read reception processing section 74 determines in step S215 that the signal being sent over the I3C bus 11 matches the transmission data, control is transferred to step S216. In step S216, the read reception processing section 74 determines whether or not the next read data is received from the CCI slave 18.

In the case where the read reception processing section 74 determines in step S216 that the next read data is not received from the CCI slave 18, control is transferred to step S217. In step S217, the read reception processing section 74 sends a data end (End-of-Data) to the I3C master 12. The read reception processing section 74 then waits for a stop or a restart. Thereafter, upon receipt of the stop or the restart, the processing is brought to an end.

On the other hand, in the case where the read reception processing section 74 determines in step S216 that the next read data is received from the CCI slave 18, control is transferred to step S218. In step S218, the read reception processing section 74 determines whether or not an abort request is received from the I3C master 12.

In the case where the read reception processing section 74 determines in step S218 that the abort request is not received from the I3C master 12, control is returned to step S214. The similar steps are then repeated.

On the other hand, in the case where the read reception processing section 74 determines in step S218 that the abort request is received from the I3C master 12, control is transferred to step S219. In step S219, the read reception processing section 74 notifies the CCI slave 18 that the abort request is received. The read reception processing section 74 then waits for a stop or a restart. Thereafter, upon receipt of the stop or the restart, the processing is brought to an end.

Meanwhile, in the case where the read reception processing section 74 determines in step S215 that the signal being sent over the I3C bus 11 does not match the transmission data, control is transferred to step S220. In step S220, on the basis of the determination made by the read reception processing section 74 in step S215 that the signal being sent over the I3C bus 11 does not match the transmission data, the error handling section 76 detects occurrence of an S6 error.

In step S221, the error handling section 76 notifies the CCI slave 18 that the S6 error has occurred. In step S222, the read reception processing section 74 stops sending the read data.

In step S223, the read reception processing section 74 waits for a stop or for a restart. In step S224, the read reception processing section 74 determines whether or not the stop or the restart is received. In the case where the read reception processing section 74 determines in step S224 that the stop or the restart is not received, control is returned to step S223. The read reception processing section 74 then waits continuously for a stop or for a restart.

On the other hand, in the case where the read reception processing section 74 determines in step S224 that the stop or the restart is received, control is transferred to step S225. In step S225, upon receipt of the stop or the restart by the read reception processing section 74 in step S224, the error handling section 43 resets the S6 error. Thereafter, the processing is brought to an end.

Meanwhile, in the case where the read reception processing section 74 determines in step S213 that the NACK response was sent, control is transferred to step S226. In step S226, the read reception processing section 74 waits for a stop or for a restart. Then upon receipt of the stop or the restart by the read reception processing section 74, the processing is brought to an end.

Figure 15:
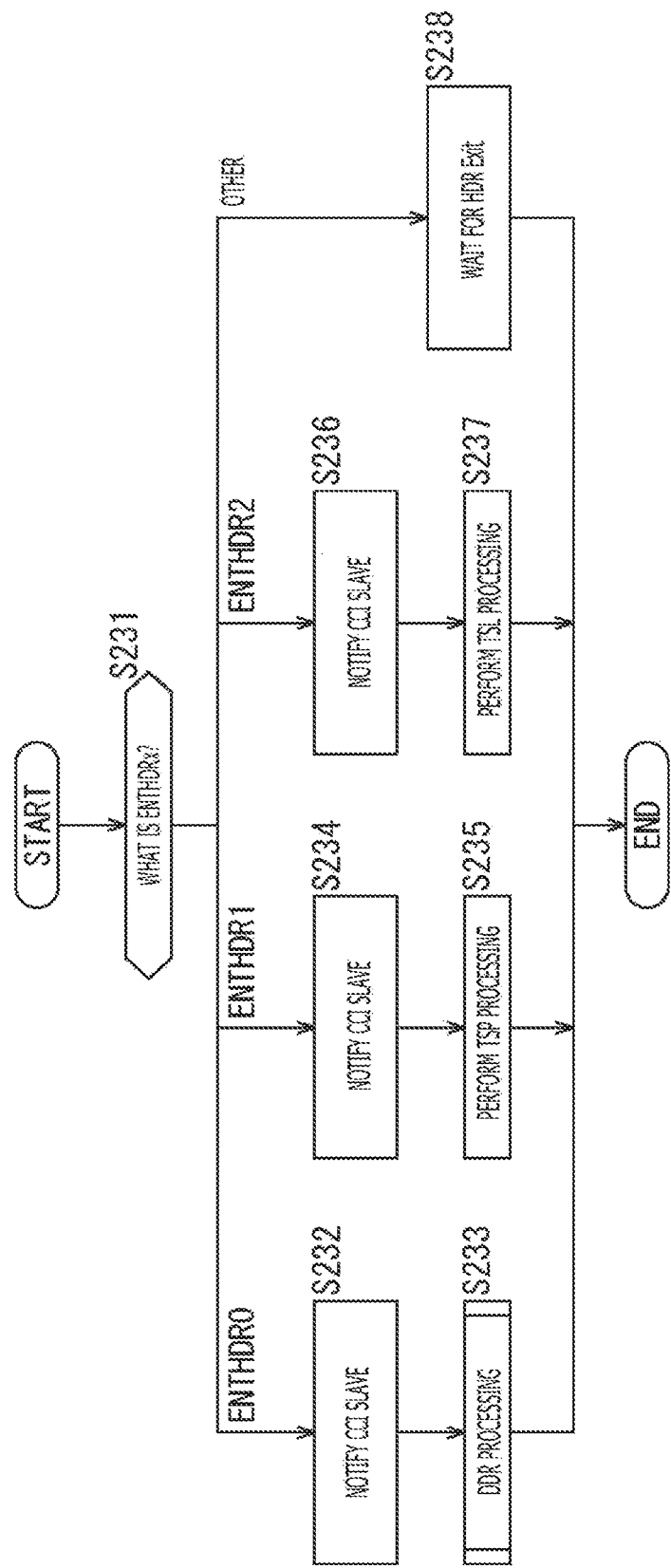
FIG. 15 is a flowchart explaining HDR start processing.

FIG. 15 is a flowchart explaining the HDR start processing performed by the HDR start processing section 75 in step S207 of FIG. 13.

In step S231, the HDR start processing section 75 determines the type of HDR mode in accordance with the received CCC (ENTHDRx).

In the case where the HDR start processing section 75 determines in step S231 that the received CCC is ENTHDR0, the HDR start processing section 75 determines that DDR mode is to be started. Control is then transferred to step S232. In step S232, the HDR start processing section 75 notifies the CCI slave 18 that DDR mode is to be started. In step S233, the I3C (DDR) processing section 42 performs DDR processing (to be discussed with reference to FIG. 16). Thereafter, the processing is brought to an end.

On the other hand, in the case where the HDR start processing section 75 determines in step S231 that the received CCC is ENTHDR1, the HDR start processing section 75 determines that TSP mode is to be started. Control is then transferred to step S234. In step S234, the HDR start processing section 75 notifies the CCI slave 18 that TSP mode is to be started. In step S235, TSP processing is performed. Thereafter, the processing is brought to an end.

Meanwhile, in the case where the HDR start processing section 75 determines in step S231 that the received CCC is ENTHDR2, the HDR start processing section 75 determines that TSL mode is to be started. Control is then transferred to step S236. In step S236, the HDR start processing section 75 notifies the CCI slave 18 that TSL mode is to be started. In step S237, TSL processing is performed. Thereafter, the processing is brought to an end.

On the other hand, in the case where the HDR start processing section 75 determines in step S231 that the received CCC is something other than ENTHDR0, ENTHDR1, or ENTHDR2, control is transferred to step S238. In step S238, the HDR start processing section 75 waits for HDR Exit. Thereafter, upon receipt of HDR Exit, the processing is brought to an end.

Figure 16:
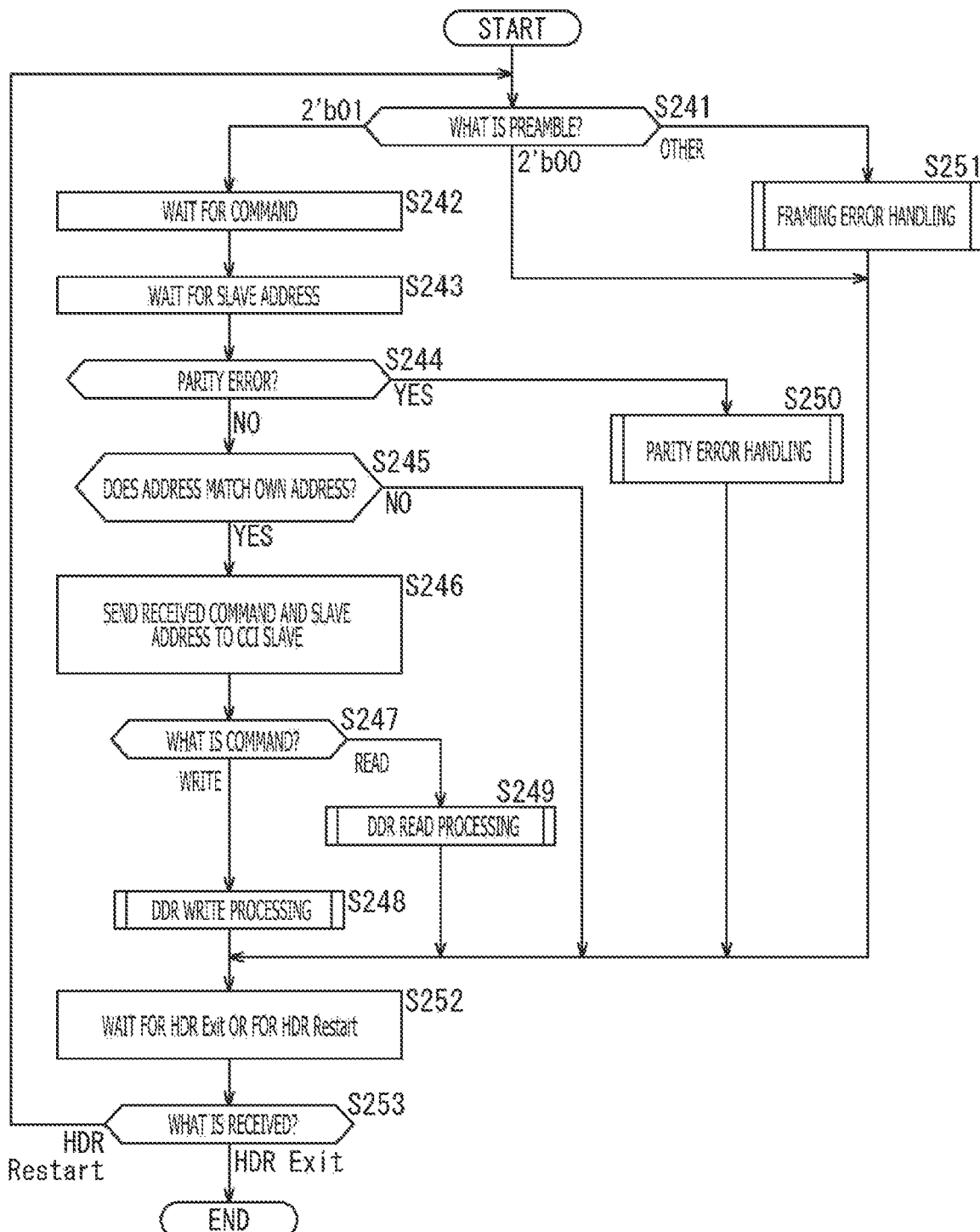
FIG. 16 is a flowchart explaining I3C (DDR) processing performed by the I3C layer on the side of the slave.

FIG. 16 is a flowchart explaining the I3C (DDR) processing performed in step S233 of FIG. 15 by the I3C (DDR) processing section 42 in the slave-side I3C layer.

In step S241, the I3C (DDR) processing section 42 verifies and determines the type of the preamble sent immediately after CCC (ENTHDRx).

In the case where the I3C (DDR) processing section 42 determines in step S241 that the preamble is 2'b01, control is transferred to step S242.

In step S242, the I3C (DDR) processing section 42 waits for a command. Upon receipt of the command, control is transferred to step S243. In step S243, the I3C (DDR) processing section 42 waits for a slave address. Upon receipt of the slave address, control is transferred to step S244.

In step S244, the I3C (DDR) processing section 42 determines whether or not a parity error has occurred in the command received in step S242 and in the slave address received in step S243. In the case where the I3C (DDR) processing section 42 determines in step S244 that no parity error has occurred, control is transferred to step S245.

In step S245, the I3C (DDR) processing section 42 determines whether or not the address received in step S243 matches the own address. In the case where the I3C (DDR) processing section 42 determines that the received address matches the own address, control is transferred to step S246. In step S246, the I3C (DDR) processing section 42 sends to the CCI slave 18 the command received in step S242 and the slave address received in step S243.

In step S247, the I3C (DDR) processing section 42 determines whether the command received in step S242 is a write command or a read command.

In the case where the I3C (DDR) processing section 42 determines in step S247 that the received command is the write command, control is transferred to step S248 in which DDR write processing is performed by the DDR write processing section 81. Thereafter, control is transferred to step S252.

On the other hand, in the case where the I3C (DDR) processing section 42 determines in step S247 that the received command is the read command, control is transferred to step S249 in which DDR read processing is performed by the DDR read processing section 82. Thereafter, control is transferred to step S252.

Meanwhile, in the case where the I3C (DDR) processing section 42 determines in step S244 that a parity error has occurred, control is transferred to step S250 in which parity error handling processing (to be discussed later with reference to FIG. 21) is performed by the error handling section 84. Thereafter, control is transferred to step S252.

On the other hand, in the case where the I3C (DDR) processing section 42 determines in step S241 that the preamble is 2'b00, control is transferred to step S252.

Meanwhile, in the case where the I3C (DDR) processing section 42 determines in step S241 that the preamble is something other than 2'b01 or 2'b00, control is transferred to step S251 in which framing error handling processing (to be discussed later with reference to FIG. 20) is performed by the error handling section 84. Thereafter, control is transferred to step S252.

In step S252, the I3C (DDR) processing section 42 waits for HDR Exit or HDR Restart. Then upon receipt of HDR Exit or HDR Restart by the I3C (DDR) processing section 42, control is transferred to step S253.

In step S253, the I3C (DDR) processing section 42 determines which of HDR Exit and HDR Restart was received in step S252. In the case where the I3C (DDR) processing section 42 determines in step S253 that HDR Restart was received, control is returned to step S241. The similar steps are then repeated. In the case where it is determined that HDR Exit was received, the processing is brought to an end.

Figure 17:
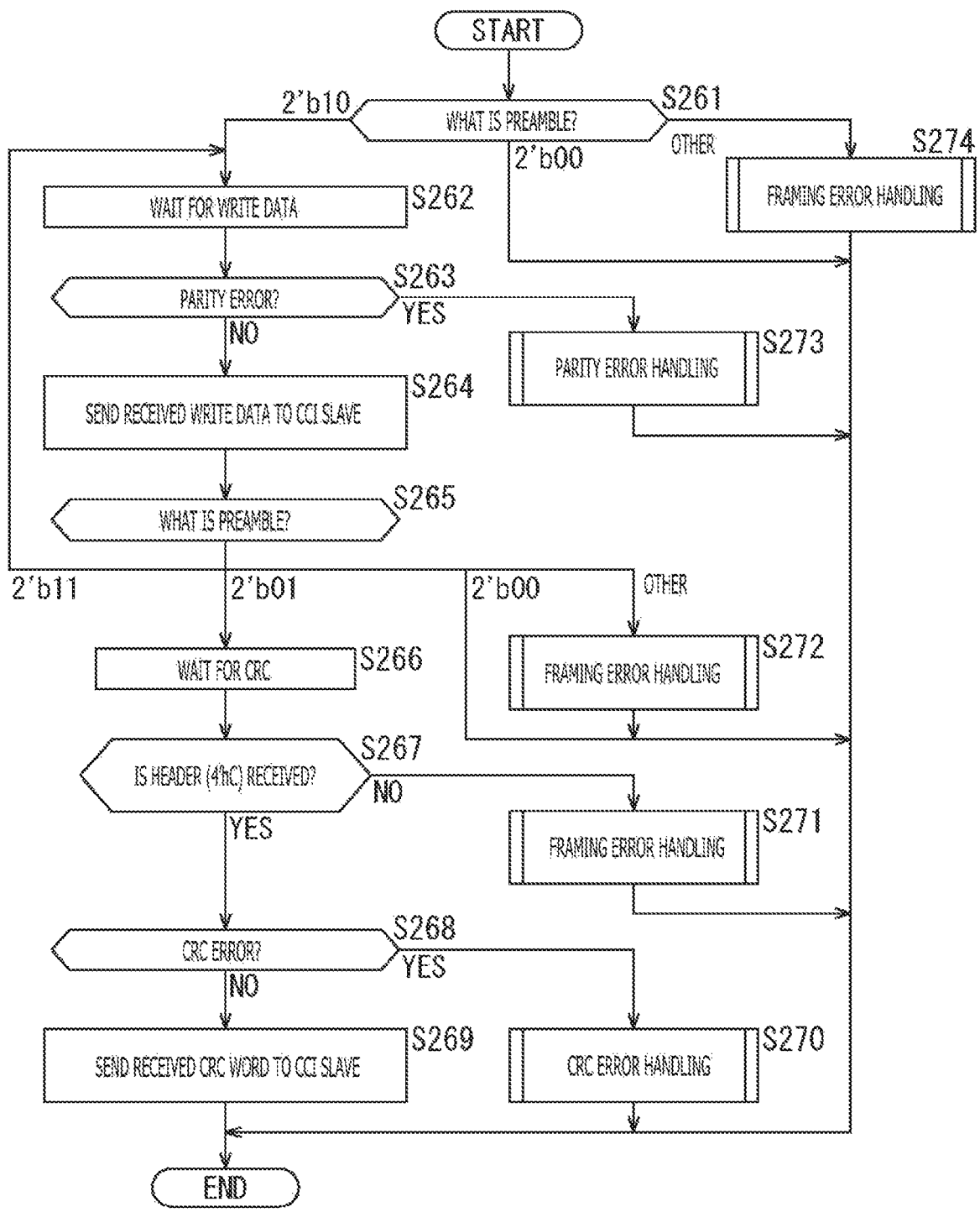
FIG. 17 is a flowchart explaining DDR write processing.

FIG. 17 is a flowchart explaining the DDR write processing performed by the DDR write processing section 81 in step S248 of FIG. 16.

In step S261, the DDR write processing section 81 verifies and determines the type of the preamble.

In the case where the DDR write processing section 81 determines in step S261 that the preamble is 2'b10, control is transferred to step S262.

In step S262, the DDR write processing section 81 waits for write data. Upon receipt of the write data, control is transferred to step S263.

In step S263, the DDR write processing section 81 determines whether or not a parity error has occurred in the write data received in step S262. In the case where the DDR write processing section 81 determines in step S263 that no parity error has occurred, control is transferred to step S264.

In step S264, the DDR write processing section 81 sends the write data received in step S262 to the CCI slave 18.

In step S265, the DDR write processing section 81 verifies and determines the type of the preamble.

In the case where the DDR write processing section 81 determines in step S265 that the preamble is 2'b11, control is returned to step S262. The write data is then received continuously.

On the other hand, in the case where the DDR write processing section 81 determines in step S265 that the preamble is 2'b01, control is transferred to step S266. In step S266, the DDR write processing section 81 waits for a CRC. Upon receipt of the CRC, control is transferred to step S267.

In step S267, the DDR write processing section 81 determines whether or not a header (4'hC) is received. In the case where the DDR write processing section 81 determines in step S267 that the header (4'hC) is received, control is transferred to step S268.

In step S268, the DDR write processing section 81 determines whether or not a CRC error has occurred in the CRC received in step S266. In the case where the DDR write processing section 81 determines in step S268 that no CRC error has occurred, control is transferred to step S269.

In step S269, the DDR write processing section 81 sends the CRC word received in step S266 to the CCI slave 18. Thereafter, the processing is brought to an end.

On the other hand, in the case where the DDR write processing section 81 determines in step S268 that the CRC error has occurred, control is transferred to step S270. In step S270, the error handling section 84 performs CRC error handling processing (to be discussed later with reference to FIG. 22). Thereafter, the processing is brought to an end.

Meanwhile, in the case where the DDR write processing section 81 determines in step S267 that the header (4'hC) is not received, control is transferred to step S271. In step S271, the error handling section 84 performs framing error handling processing (to be discussed later with reference to FIG. 20). Thereafter, the processing is brought to an end.

On the other hand, in the case where the DDR write processing section 81 determines in step S265 that the preamble is 2'b00, the processing is brought to an end.

Meanwhile, in the case where the DDR write processing section 81 determines in step S265 that the preamble is something other than 2'b11, 2'b01 or 2'b00, control is transferred to step S272. In step S272, the error handling section 84 performs the framing error handling processing (to be discussed later with reference to FIG. 20). Thereafter, the processing is brought to an end.

On the other hand, in the case where the DDR write processing section 81 determines in step S263 that the parity error has occurred, control is transferred to step S273. In step S273, the error handling section 84 performs parity error handling processing (to be discussed later with reference to FIG. 21). Thereafter, the processing is brought to an end.

In the case where the DDR write processing section 81 determines in step S261 that the preamble is 2'b00, the processing is brought to an end.

In the case where the DDR write processing section 81 determines in step S261 that the preamble is something other than 2'b10 or 2'b00, control is transferred to step S274. In step S274, the error handling section 84 performs the framing error handling processing (to be discussed later with reference to FIG. 20). Thereafter, the processing is brought to an end.

Figure 18:
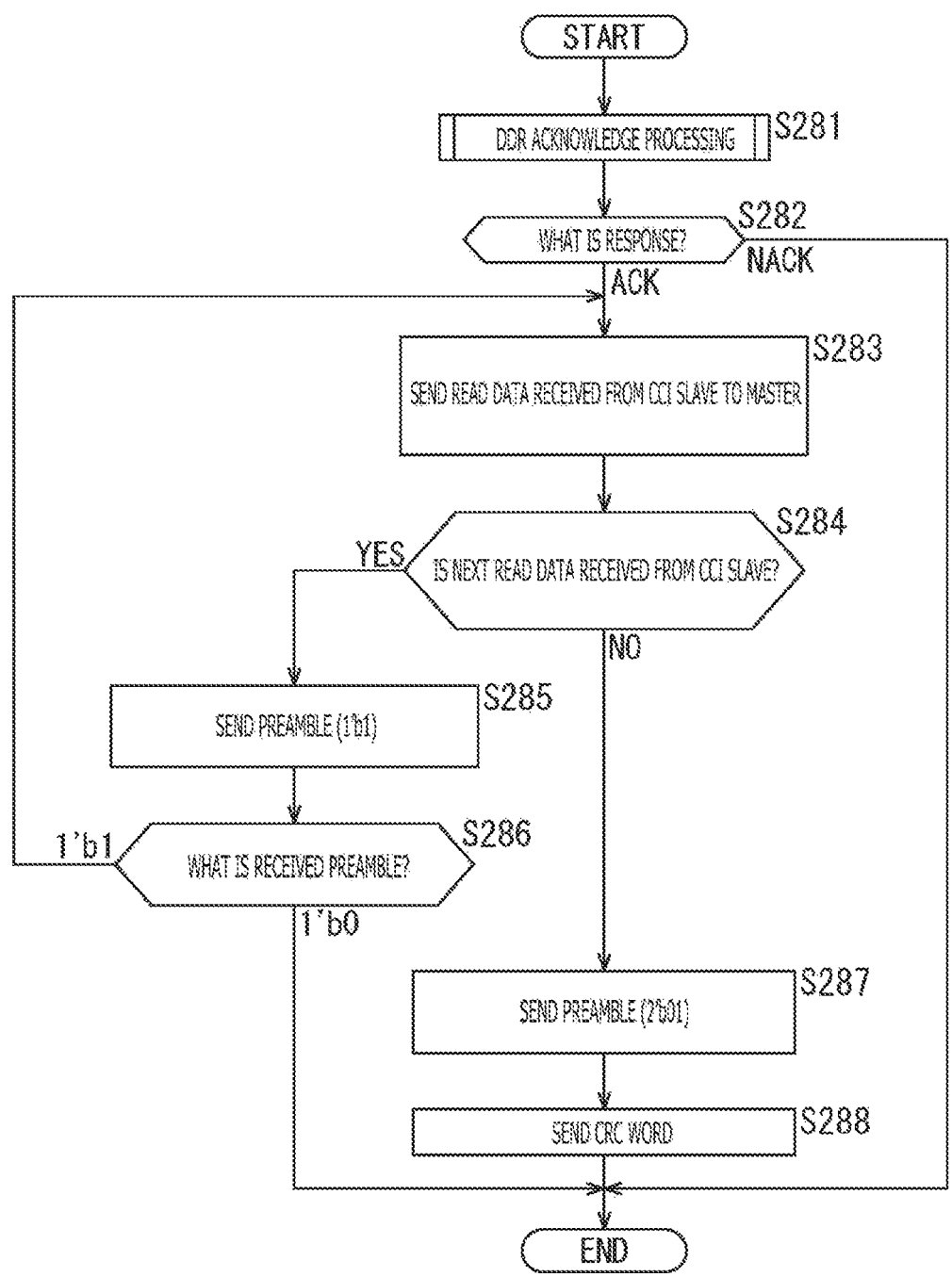
FIG. 18 is a flowchart explaining DDR read processing.

FIG. 18 is a flowchart explaining the DDR read processing performed by the DDR read processing section 82 in step S249 of FIG. 16.

In step S281, the DDR acknowledge processing is performed by the DDR acknowledge processing section 83. In step S282, the DDR read processing section 82 determines which of the ACK and NACK responses was sent during the acknowledge processing.

In the case where the DDR read processing section 82 determines in step S282 that the ACK processing was performed, control is transferred to step S283. In step S283, the DDR read processing section 82 sends the read data received from the CCI slave 18 to the I3C master 12.

In step S284, the DDR read processing section 82 determines whether or not the next read data is received from the CCI slave 18.

In the case where the DDR read processing section 82 determines in step S284 that the next read data is received from the CCI slave 18, control is transferred to step S285 in which a preamble (preamble [1]=1'b1) is sent.

In step S286, the DDR read processing section 82 determines whether the received preamble (preamble [0]) is 1'b1 or 1'b0.

In the case where the DDR read processing section 82 determines in step S286 that the received preamble is 1'b1, control is returned to step S283. The similar steps are then repeated. If it is determined that the received preamble is 1'b0, the processing is brought to an end.

On the other hand, in the case where the DDR read processing section 82 determines in step S284 that the next read data is not received from the CCI slave 18, control is transferred to step S287. In step S287, the DDR read processing section 82 sends a preamble (2'b01). In step S288, the DDR read processing section 82 sends a CRC word. Thereafter, the processing is brought to an end.

Meanwhile, in the case where the DDR read processing section 82 determines in step S282 that the NACK processing was performed, the processing is brought to an end.

Figure 19:
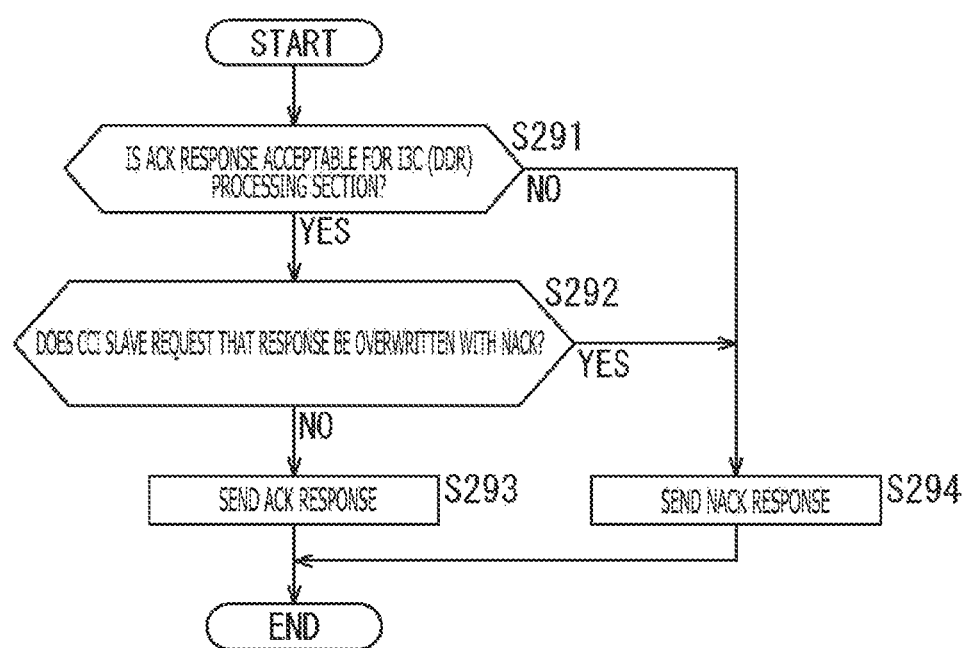
FIG. 19 is a flowchart explaining DDR acknowledge processing.

FIG. 19 is a flowchart explaining the DDR acknowledge processing performed by the DDR acknowledge processing section 83 in step S281 of FIG. 18.

In step S291, the DDR acknowledge processing section 83 determines whether or not an ACK response is acceptable for the I3C slave 13 with regard to the above-mentioned read command. For example, in the case where the command and data have been normally received, the DDR acknowledge processing section 83 determines that the ACK response is to be sent; in the case where an error has occurred in the command or in the data, the DDR acknowledge processing section 83 determines that the ACK response is not to be sent (i.e., NACK response is to be sent).

In the case where the DDR acknowledge processing section 83 determines in step S291 that the ACK response is acceptable for the I3C slave 13, control is transferred to step S292.

In step S292, given the determination made by the DDR acknowledge processing section 83 in step S291 that the ACK response is acceptable, the error handling section 84 determines whether or not the CCI slave 18 is requesting that the response be overwritten with a NACK. For example, the CCI slave 18 requests that the response be overwritten with the NACK until the SS0 error is reset regardless of the I3C protocol as discussed above.

In the case where the error handling section 84 determines in step S292 that the CCI slave 18 is not requesting that the response be overwritten with the NACK, control is transferred to step S293. The DDR acknowledge processing section 83 then sends the ACK response.

On the other hand, in the case where the DDR acknowledge processing section 83 determines in step S291 that the ACK response is not acceptable for the I3C slave 13 (i.e., NACK response is to be sent), control is transferred to step S294. Likewise, in the case where the error handling section 84 determines in step S292 that the CCI slave 18 is requesting that the response be overwritten with the NACK, control is transferred to step S294. In step S294, the acknowledge processing section 71 sends the NACK response. Thereafter, the processing is brought to an end.

Figure 20:
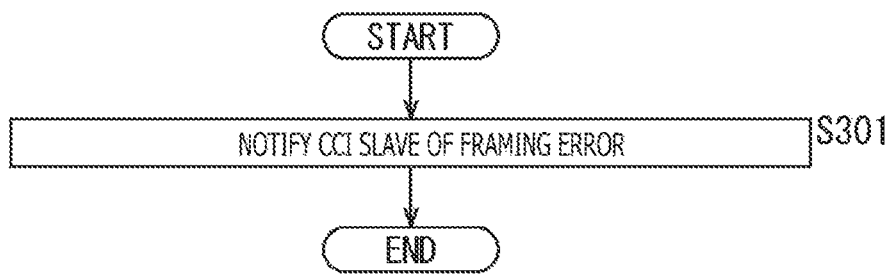
FIG. 20 is a flowchart explaining framing error handling processing.

FIG. 20 is a flowchart explaining the framing error handling processing performed by the error handling section 84 in step S251 of FIG. 16 and in steps S271, S272 and S274 of FIG. 17.

In step S301, the error handling section 84 notifies the CCI slave 18 of the framing error. The processing is then brought to an end.

Figure 21:
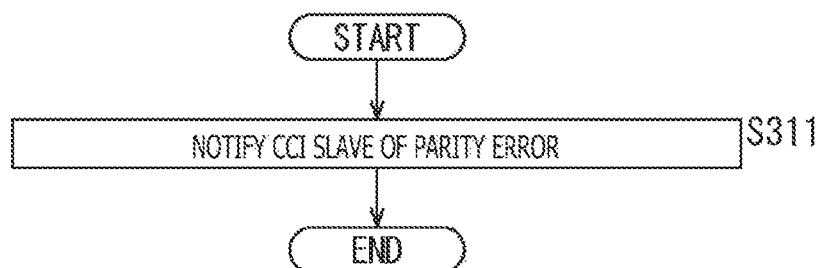
FIG. 21 is a flowchart explaining parity error handling processing.

FIG. 21 is a flowchart explaining the parity error handling processing performed by the error handling section 84 in step S250 of FIG. 16 and in step S273 of FIG. 17.

In step S311, the error handling section 84 notifies the CCI slave 18 of the parity error. The processing is then brought to an end.

Figure 22:
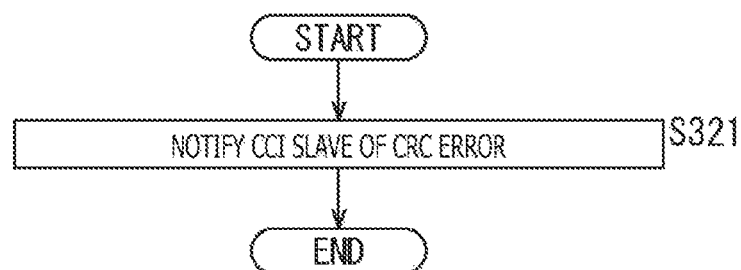
FIG. 22 is a flowchart explaining CRC error handling processing.

FIG. 22 is a flowchart explaining the CRC error handling processing performed by the error handling section 84 in step S270 of FIG. 17.

In step S321, the error handling section 84 notifies the CCI slave 18 of the CRC error. The processing is then brought to an end.

In the I3C communication system 21 using the I3C bus 11, as described above, the slave device 23 may detect an error in the layer of the I3C slave 13. At this time, the layer of the CCI slave 18 neglects all received data from the I3C slave 13 until the I3C slave 13 recovers from the word in which the error is detected and until a slave address and a write command are received in both SDR mode and DDR mode. That is because the write transfer is always accompanied by a sub-address.

As a first variation of the above-described embodiment, the slave device 23, for example, may neglect all received data from the I3C slave 13 until the I3C slave 13 recovers from the word in which the error is detected when the I3C slave 13 detects the error and until both the CCI (I3C SDR) processing section 61 and the CCI (I3C DDR) processing section 62 of the CCI slave 18 receive the slave address and write command. That is because the slave address and the write command are always followed by a sub-address.

During that time, the I3C slave 13 attempts to send an ACK response or a NACK response in accordance with the I3C protocol. However, the ACK response immediately following the slave address and the read command of the CCI (I3C SDR) is exceptionally overwritten with the NACK response by the CCI slave 18. The overwriting is performed here to avert a malfunction that occurs upon unintended detection of the M2 error (No response to Broadcast Address) stipulated under the I3C protocol if a NACK response is sent elsewhere such as immediately subsequent to 7E+W in the case where the I3C master 12 and the I3C slave 13 are configured on a one-to-one basis. As needed, specific limited commands may be provided in such a manner that the ACK response is not overwritten with the NACK response.

Also, as a second variation of the above embodiment, in the I3C communication system 21 using the I3C bus 11, the layer of the CCI slave 18 in the slave device 23 may, upon detection of an error in the layer of the I3C slave 13, neglect all received data from the I3C slave 13 until the I3C slave 13 recovers from the word in which the error is detected and until the next start or the next restart, a slave address, a write command, and the index are received in both SDR mode and DDR mode. During this time, the I3C slave 13 attempts to send an ACK response or a NACK response in accordance with the I3C protocol. However, the ACK response immediately following the slave address and the read command of the CCI (I3C SDR) is exceptionally overwritten with the NACK response by the CCI slave 18. This allows the index to be reliably received.

Incidentally, when an SD0 error, an SD1 error, or an SD2 error is detected to have occurred, the I3C slave 13 may output a slave abort to cancel communication from the part of the I3C slave 13.

<Handling of Errors>

The handling of index errors, errors in sending and receiving data equal to or greater than the number of sent and received bytes, and FIFO overflows is explained below in more detail with reference to FIGS. 23 to 30.

The index errors are first explained with reference to FIG. 23.

As an example, FIG. 23 depicts a parity error that occurs during a sequential read operation from a random location (Sequential Read Starting from a Random Location with 8-bit length and 8-bit index (odd byte read transfer)) according to the CCI (I3C DDR) specification. Here, in the case where the parity error according to the I3C protocol is detected during reception of a sub-address (Sub Address [7:0]), the I3C slave 13 neglects any received signal until HDR Exit or HDR Restart is detected in accordance with the I3C protocol. For this reason, as depicted in FIG. 23, the CCI slave 18 cannot receive any signal and cannot update, for example, the number of sent and received bytes (LENGTH) until HDR Restart is detected subsequent to the sub-address.

On the other hand, the I3C slave 13 recovers from the error at the next HDR Restart, receives a read command, and notifies the CCI slave 18 of the received read command. However, the CCI slave 18, having failed to update the index, cannot correctly identify the sub-address to which the read command is addressed. As a result, there is fear that the read data with regard to a previously established register address may be sent to the I3C master 12.

Furthermore, because the update of the index is calculated on the basis of the previously established sub-address, the current read operation, if continued next, will cause the wrong read data to be sent unchecked to the I3C master 12. That is, a single error generates a chain of errors. It is then quite difficult for the I3C master 12 to notice that the data thus sent is the wrong value.

The errors in sending and receiving data equal to or greater than the number of sent and received bytes are explained below.

The CCI (I3C DDR) has the number of sent and received bytes (LENGTH) added anew to the frame structure, in addition to the sub-address also used by the CCI (I3C SDR). This is because where the number of sent and received bytes is unknown, the I3C slave 13 cannot stop the read transfer according to the I3C DDR specification.

Here, in the case where the number of sent and received bytes (LENGTH) does not match the number of actually sent and received bytes due to some error, it is possible, for example, that the number of actually sent and received bytes may be larger or smaller than the number of sent and received bytes (LENGTH). It is then not appropriate to handle one of these possibilities as an error, i.e., one that involves sending and receiving a number of bytes smaller than the number of sent and received bytes (LENGTH). That is because this type of send and receive operation exists among normal transfers in view of the CCI (I3C DDR) frame structure and because the I3C master 12 may intentionally cancel communication due to such factors as priorities.

By contrast, there is a possibility of causing a serious error in the case where a number of bytes larger than the number of sent and received bytes (LENGTH) are sent and received. This possibility needs to be handled as an error that requires stopping communication in a secure manner. For example, there may be a case where a software device descriptor for controlling the I3C master 12 receives data exceeding a data buffer that is allocated beforehand in a memory for accommodating data of the number of sent and received bytes (LENGTH). In that case, there is fear that attempts to access addresses outside of the memory may occur and cause the system to shut down.

FIFO overflows are further explained below.

The I3C protocol allows each I3C slave 13 to define a maximum number of transfer bytes that can be read in single send and receive operation (Max Read Length: MRL) and a maximum number of transfer bytes that can be written in a single send and receive operation (Max Write Length: MWL), the defined numbers being acquired by the I3C master 12. However, in the case where the I3C master 12 unintentionally sends write data exceeding the maximum number of transfer bytes (Max Write Length: MWL), there is fear that the I3C slave 13 may have its FIFO overflowed and may not write the data correctly to the register.

In view of this, the methods of detecting and recovering from index errors, errors in sending and receiving data equal to or greater than the number of sent and received bytes, and FIFO overflows are defined for the I3C communication system 21 as described in FIGS. 24 and 25.

First, the handling of index errors is explained.

For example, the slave device 23 makes use of the SD0 error newly defined in the layer of the CCI slave 18, as indicated in FIG. 24. That is, when detecting the occurrence of the framing error, parity error, or CRC5 error stipulated by the I3C DDR specification, the I3C slave 13 notifies the CCI (I3C DDR) processing section 62 in the CCI slave 18 that the corresponding one of the respective errors has occurred. In turn, the CCI slave 18 clears the index information stored so far.

Then in the case in which, with the index cleared, the I3C slave 13 receives a read command, the CCI slave 18 detects occurrence of the SD0 error (step S115 in FIG. 8). When the SD0 error is detected to have occurred in this manner, the CCI slave 18 neglects all communication until a stop or a restart is received, as depicted in FIG. 24.

In the case where the I3C slave 13 sends an ACK response or a NACK response at this point, the CCI slave 18 commands the I3C slave 13 to send the NACK response (step S121 in FIG. 9) until the SD0 error is reset regardless of the I3C protocol.

Also, FIG. 26 depicts typical SD0 error operations. As illustrated, the CCI slave 18 detects the SD0 error at the time of receiving a read command subsequent to HDR Restart. This makes it possible to avoid sending to the I3C master 12 the read data addressed to the wrong sub-address.

Further, in the case where the I3C master 12 in the master device 22 detects occurrence of the framing error, parity error, or CRC5 error or where a NACK response is received, the I3C master 12 notifies the CCI (I3C DDR) processing section 52 that the error is detected or the NACK response is received (steps S20 and S21 in FIG. 5). In turn, the CCI (I3C DDR) processing section 52 clears the index information stored so far.

Thereafter, the I3C master 12 recovers from the error in accordance with the procedure stipulated by the I3C protocol (step S23 in FIG. 5). The CCI (I3C DDR) processing section 52 then prohibits the use of the CCI (SDR) current read operation ("Sequential Read Starting from the Current Location" or "Single Read Starting from the Current Location"). That is, the reason for the non-use is that with the index cleared at the time the error occurred on the side of the I3C master 12, there is an inconsistency in index content between the I3C master 12 and the I3C slave 13, so that the intended register read value is not available. Furthermore, the use of the current read operation is inhibited because, with the index cleared at the time the error occurred, the SS0 error always occurs if the current read operation is used for the next transfer.

FIG. 27 depicts typical operations performed when an SS0 error is caused by a current read operation.

As depicted in FIG. 27, when the I3C slave 13 detects a parity error, the index of the CCI slave 18 is cleared. Later, when the I3C slave 13 receives HDR Restart, the parity error is reset. The CCI slave 18 then detects an SD0 error and sends a NACK response. Upon receipt of HDR Exit, the SD0 error is reset. Here, the SS0 error always occurs in the case where the current read operation is used for the next transfer. For this reason, the use of the current read operation is inhibited as discussed above.

Explained next is the handling of errors in sending and receiving data equal to or greater than the number of sent and received bytes.

For example, the slave device 23 makes use of the SD1 error newly defined in the layer of the CCI slave 18, as indicated in FIG. 24 mentioned above. That is, in the case where there is a continuation of write data immediately following the receipt of a first byte of write data immediately subsequent to the number of sent and received bytes (LENGTH), the I3C slave 13 detects the SD1 error (Write over LENGTH Error). Specifically, the SD1 error is detected to have occurred in the case where a preamble received immediately following the receipt of a first byte of write data immediately subsequent to the number of sent and received bytes (LENGTH) is 2'b11 (Data follows) indicating that there is a continuation of the received data.

Then after detecting the occurrence of the SD1 error, the CCI slave 18 clears the index and neglects all communication until HDR Exit or HDR Restart is received. This makes it possible to avoid writing to the register the received data exceeding one byte immediately subsequent to the number of sent and received bytes (LENGTH). At this point, in the case where the I3C slave 13 sends an ACK response or a NACK response, the CCI slave 18 commands the I3C slave 13 to send the NACK response until the SD1 error is reset regardless of the I3C protocol (step S121 in FIG. 9).

Also, FIG. 28 depicts typical SD1 error operations. As illustrated, in the case where there is a continuation of write data exceeding the number of sent and received bytes (LENGTH), occurrence of an SD1 error is detected. After the index is cleared, the SD1 error is reset upon receipt of HDR Exit or HDR Restart.

Further, the master device 22 makes use of the newly defined MD0 error, as indicated in FIG. 25 mentioned above. That is, in the case where there is a continuation of read data immediately following the receipt of a first byte of read data immediately subsequent to the number of sent and received bytes (LENGTH), the CCI (I3C DDR) processing section 52 detects the MD0 error (Read over LENGTH Error). Specifically, the MD0 error is detected to have occurred in the case where a preamble received immediately following the receipt of a first byte of read data immediately subsequent to the number of sent and received bytes (LENGTH) is 1'b1 indicating that there is a continuation of the received data.

Then after detecting occurrence of the MD0 error, the CCI (I3C DDR) processing section 52 in the I3C master 12 clears the index. Furthermore, after sending a master abort, the CCI (I3C DDR) processing section 52 sends HDR Exit or HDR Restart. With HDR Exit or HDR Restart sent in this manner, the MD0 error is reset, and the I3C master 12 is allowed to return to normal operation. Alternatively, the I3C master 12 may, without sending a master abort, neglect all read data until HDR Exit or HDR Restart is sent.

Figure 29:
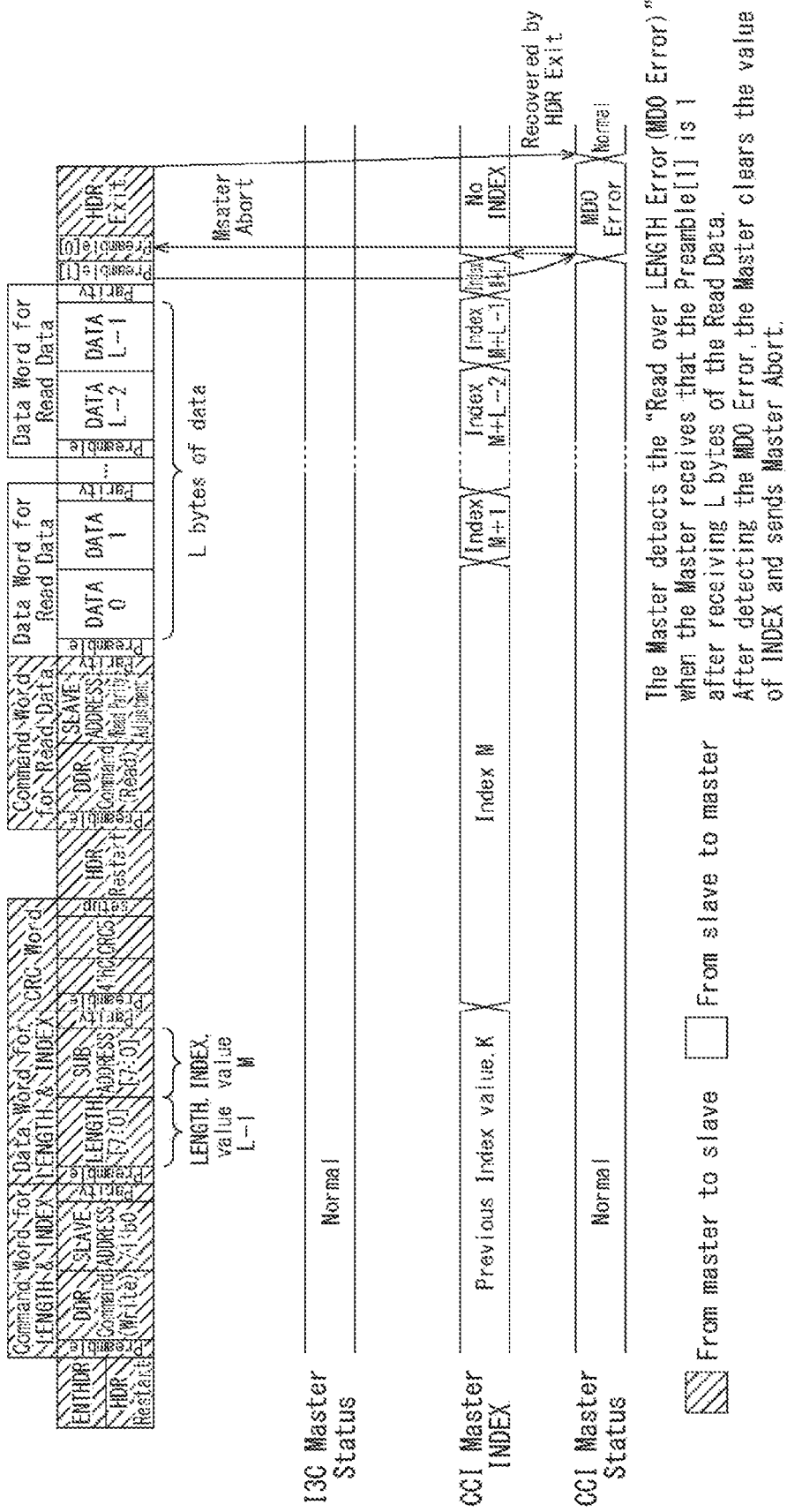
FIG. 29 is a schematic diagram depicting typical operations performed when an MD0 error occurs.

FIG. 29 depicts typical operations performed when an MD0 error occurs. As illustrated, in the case where there is a continuation of read data exceeding the number of sent and received bytes (LENGTH), the MD0 error is detected. After HDR Exit is sent, the MD0 error is reset.

The handling of FIFO overflows is explained next.

Before starting communication, the I3C master 12 can acquire the maximum number of transfer bytes (MRL or MWL) using a command (GETMRL or GETMWL) ordering the sending of the maximum number of transfer bytes. Alternatively, the user may set to the I3C master 12 the maximum number of transfer bytes (MRL or MWL) read from a data sheet of each I3C slave 13. This enables the I3C master 12 to suppress the request to transfer data exceeding the maximum number of transfer bytes (MRL or MWL).

However, despite the handling performed as described above, some error may lead to an FIFO overflow that needs to be further handled.

For example, in the case where the I3C master 12 requests the I3C slave 13 to write a number of bytes exceeding the maximum number of transfer bytes (MWL), the I3C slave 13 discards the overflow data on the slave side because the I3C slave 13 is not equipped to stop the write transfer according to the I3C ver. 1.0 DDR specification.

Thus the I3C slave 13 makes use of the newly defined SD2 error, as indicated in FIG. 24 mentioned above. That is, in the case where there is a continuation of write data immediately following the receipt of a K-th byte of write data, the I3C slave 13 detects the SD2 error (Write over MWL). Specifically, the SD2 error is detected to have occurred in the case where a preamble received immediately following the receipt of the K-th byte of write data is 2'b11 (Data follows) indicating that there is a continuation of the received data. For reference, the calculation formula for obtaining the value of the K-th byte is indicated at the bottom left of FIG. 30.

Then after detecting the SD2 error, the CCI slave 18 clears the index and neglects all communication until HDR Exit or HDR Restart is received. This makes it possible to avoid writing to the register the received data exceeding the K bytes. In the case where the I3C slave 13 sends an ACK response or a NACK response at this point, the CCI slave 18 commands the I3C slave 13 to send the NACK response until the SD2 error is reset regardless of the I3C protocol (step S121 in FIG. 9).

Also, FIG. 30 depicts typical SD2 error operations. As illustrated, in the case where there is a continuation of write data exceeding the K bytes, the SD2 error is detected to have occurred. After the index is cleared, the SD2 error is reset upon receipt of HDR Exit or HDR Restart.

Meanwhile, in the case where the I3C master 12 requests the I3C slave 13 to read a number of bytes exceeding the maximum number of transfer bytes (MRL), there is no need to recognize an error because this request is allowed to occur in normal transfers (Concatenated Sequential Read Starting from a Random Location) defined for the CCI (I3C DDR). For example, in the case where the I3C slave 13 is given such a request, the I3C slave 13 returns to the I3C master 12 read data until a maximum number of read data bytes defined by the maximum number of transfer bytes (MRL) is reached, before sending a CRC5. Then the I3C slave 13 stops the transfer for the moment.

Thus a putative case to be handled by the I3C master 12, for example, is one in which the I3C slave 13 unintentionally sends data exceeding the setting of the maximum number of transfer bytes (MRL) during the above-mentioned normal transfers. In this case, an error needs to be detected because there is fear that attempts to access addresses outside of the memory may occur on the side of the I3C master 12.

For that reason, the newly defined MD1 error is utilized as depicted in FIG. 25 mentioned above. The CCI (I3C DDR) processing section 52 detects occurrence of the MD1 error (Read over MRL) in the case where there is a continuation of read data following the receipt of read data reaching the maximum number of transfer bytes (MRL). Specifically, the MD1 error is detected to have occurred in the case where a preamble received immediately following the receipt of the read data reaching the maximum number of transfer bytes (MRL) is 1'b1 indicating that there is a continuation of the received data.

Then the CCI (I3C DDR) processing section 52 in the I3C master 12 detects the MD1 error, before clearing the index. Furthermore, after sending a master abort, the CCI (I3C DDR) processing section 52 sends HDR Exit or HDR Restart. After HDR Exit or HDR Restart is sent in this manner, the MD1 error is reset. The I3C master 12 is thus allowed to return to normal operation.

<Typical Configuration of the Computer>

The processes explained above with reference to the accompanying flowcharts need not be carried out chronologically as depicted in the flowcharts. That is, the processes may include those that are conducted parallelly or individually (e.g., parallel processes or object-oriented processes). Also, the programs involved may be processed by a single CPU or by multiple CPUs on a distributed basis.

Further, the series of the processing described above (communication method) may be executed either by hardware or by software. Where a software-based series of processing is to be carried out, the programs constituting the software may be either incorporated beforehand in the dedicated hardware of the computer to be used or installed from a program recording medium that stores the programs into a general-purpose personal computer or like equipment capable of executing diverse functions based on the installed programs.

FIG. 31 is a block diagram depicting a typical hardware configuration of a computer that executes the series of the above-described processing using programs.

In the computer, a CPU (Central Processing Unit) 101, a ROM (Read Only Memory) 102, a RAM (Random Access Memory) 103, and an EEPROM (Electronically Erasable and Programmable Read-Only Memory) 104 are interconnected via a bus 105. The bus 105 is further connected with an input/output interface 106. The input/output interface 106 is connected with the outside.

In the computer configured as described above, the CPU 101 performs the above-mentioned series of processing by loading appropriate programs from the ROM 102 or from the EEPROM 104 into the RAM 103 via the bus 105 and by executing the loaded programs. Also, the programs executed by the computer (CPU 101) may be installed into the EEPROM 104 or updated from the outside via the input/output interface 106 besides being written beforehand to the ROM 102.

<Typical Combinations of Configured Components>

The present technology when implemented may be configured preferably as follows:

(1)

A communication apparatus that performs communication in a manner subordinate to and controlled by a governing communication apparatus controlling communication via a bus, the subordinate communication apparatus including:

a low-level layer configured to communicate via the bus with the governing communication apparatus in a high-speed communication mode in which data is transferred at a transfer rate higher than a normal transfer rate; and a high-level layer configured to be hierarchically above the low-level layer and to read and write data in accordance with an index;

in which the high-level layer includes:

a high-level layer communication processing section configured to determine status of the index when requested to be accessed for a read operation by the governing communication apparatus; and a high-level layer error handling section configured to control the low-level layer to detect occurrence of an error on the basis of the status of the index and to neglect all communication until at least the high-speed communication mode is stopped or restarted by the governing communication apparatus, the low-level layer being further controlled to send a NACK response when performing acknowledge processing on a signal sent from the governing communication apparatus.

(2)

The communication apparatus as stated in paragraph (1) above, in which the high-level layer communication processing section is further configured to clear the index and thereby to bring the index into an undefined state in response to the error detected by the high-level layer error handling section.

(3)

A communication method for use with a communication apparatus performing communication in a manner subordinate to and controlled by a governing communication apparatus controlling communication via a bus, the subordinate communication apparatus including a low-level layer configured to communicate via the bus with the governing communication apparatus in a high-speed communication mode in which data is transferred at a transfer rate higher than a normal transfer rate, and a high-level layer configured to be hierarchically above the low-level layer and to read and write data in accordance with an index, the communication method including:

causing the subordinate communication apparatus to determine status of the index when requested to be accessed for a read operation by the governing communication apparatus; and causing the subordinate communication apparatus to control the low-level layer to detect occurrence of an error on the basis of the status of the index and to neglect all communication until at least the high-speed communication mode is stopped or restarted by the governing communication apparatus, the low-level layer being further controlled to send a NACK response when performing acknowledge processing on a signal sent from the governing communication apparatus.

(4)

A program for causing a computer of a communication apparatus to perform a communication process, the communication apparatus performing communication in a manner subordinate to and controlled by a governing communication apparatus controlling communication via a bus, the subordinate communication apparatus including a low-level layer configured to communicate via the bus with the governing communication apparatus in a high-speed communication mode in which data is transferred at a transfer rate higher than a normal transfer rate, and a high-level layer configured to be hierarchically above the low-level layer and to read and write data in accordance with an index, the communication process including:

causing the computer to determine status of the index when requested to be accessed for a read operation by the governing communication apparatus; and causing the computer to control the low-level layer to detect occurrence of an error on the basis of the status of the index and to neglect all communication until at least the high-speed communication mode is stopped or restarted by the governing communication apparatus, the low-level layer being further controlled to send a NACK response when performing acknowledge processing on a signal sent from the governing communication apparatus.

(5)

A communication apparatus that controls communication via a bus in a governing manner, the governing communication apparatus including:

a low-level layer configured to communicate via the bus with a subordinate communication apparatus performing communication under control of the governing communication apparatus in a high-speed communication mode in which data is transferred at a transfer rate higher than a normal transfer rate; and a high-level layer configured to be hierarchically above the low-level layer and to read and write data in accordance with an index;

in which the high-level layer includes a high-level layer communication processing section configured to clear the internal index and thereby to bring the index into an undefined state in a case where the low-level layer has detected an error or where notification is received of the receipt of a NACK response sent from the subordinate communication apparatus.

(6)

The communication apparatus as stated in paragraph (5) above, in which, after the low-level layer has detected an error or after notification is received of the receipt of the NACK response sent from the subordinate communication apparatus, the high-level layer communication processing section prohibits the use of a current read operation at the start of the next transfer following recovery of communication by the low-level layer.

(7)

A communication method for use with a communication apparatus controlling communication via a bus in a governing manner, the governing communication apparatus including a low-level layer configured to communicate via the bus with a subordinate communication apparatus performing communication under control of the governing communication apparatus in a high-speed communication mode in which data is transferred at a transfer rate higher than a normal transfer rate, and a high-level layer configured to be hierarchically above the low-level layer and to read and write data in accordance with an index, the communication method including:

causing the governing communication apparatus to clear the internal index and thereby to bring the index into an undefined state in a case where the low-level layer has detected an error or where notification is received of the receipt of a NACK response sent from the subordinate communication apparatus.

(8)

A program for causing a computer of a communication apparatus to perform a communication process, the communication apparatus controlling communication via a bus in a governing manner, the governing communication apparatus including a low-level layer configured to communicate via the bus with a subordinate communication apparatus performing communication under control of the governing communication apparatus in a high-speed communication mode in which data is transferred at a transfer rate higher than a normal transfer rate, and a high-level layer configured to be hierarchically above the low-level layer and to read and write data in accordance with an index, the communication process including:

causing the computer to clear the internal index and thereby to bring the index into an undefined state in a case where the low-level layer has detected an error or where notification is received of the receipt of a NACK response sent from the subordinate communication apparatus.

(9)

A communication system including:

a governing communication apparatus controlling communication via a bus; and a subordinate communication apparatus performing communication in a manner connected with and controlled by the governing communication apparatus;

in which the subordinate communication apparatus includes:

a low-level layer configured to communicate via the bus with the governing communication apparatus in a high-speed communication mode in which data is transferred at a transfer rate higher than a normal transfer rate; and a high-level layer configured to be hierarchically above the low-level layer and to read and write data in accordance with an index;

the high-level layer includes:

a high-level layer communication processing section configured to determine status of the index when requested to be accessed for a read operation by the governing communication apparatus; and a high-level layer error handling section configured to control the low-level layer to detect occurrence of an error on the basis of the status of the index and to neglect all communication until at least the high-speed communication mode is stopped or restarted by the governing communication apparatus, the low-level layer being further controlled to send a NACK response when performing acknowledge processing on a signal sent from the governing communication apparatus;

the governing communication apparatus includes:

a low-level layer configured to communicate via the bus with the subordinate communication apparatus in a high-speed communication mode in which data is transferred at a transfer rate higher than a normal transfer rate; and a high-level layer configured to be hierarchically above the low-level layer and to read and write data in accordance with an index; and the high-level layer includes a high-level layer communication processing section configured to clear the internal index and thereby to bring the index into an undefined state in a case where the low-level layer has detected an error or where notification is received of the receipt of a NACK response sent from the subordinate communication apparatus.

(10)

A communication apparatus that performs communication in a manner subordinate to and controlled by a governing communication apparatus controlling communication via a bus, the subordinate communication apparatus including:

a low-level layer configured to communicate via the bus with the governing communication apparatus in a high-speed communication mode in which data is transferred at a transfer rate higher than a normal transfer rate; and a high-level layer configured to be hierarchically above the low-level layer and to read and write data in accordance with an index;

in which the high-level layer includes:

a high-level layer communication processing section configured to determine whether or not there is a continuation of write data exceeding a previously notified number of sent and received bytes as the number of bytes constituting data to be sent and received in communication; and a high-level layer error handling section configured to control the low-level layer to detect occurrence of an error on the basis of the determination that there is a continuation of the write data exceeding the number of sent and received bytes and to neglect all communication until at least the high-speed communication mode is stopped or restarted by the governing communication apparatus, the low-level layer being further controlled to send a NACK response when performing acknowledge processing on a signal sent from the governing communication apparatus.

(11)

The communication apparatus as stated in paragraph (10) above, in which the high-level layer communication processing section determines that there is a continuation of the write data exceeding the number of sent and received bytes in a case where a preamble received immediately following the number of sent and received bytes indicates a continuation of data reception.

(12)

A communication method for use with a communication apparatus performing communication in a manner subordinate to and controlled by a governing communication apparatus controlling communication via a bus, the subordinate communication apparatus including a low-level layer configured to communicate via the bus with the governing communication apparatus in a high-speed communication mode in which data is transferred at a transfer rate higher than a normal transfer rate, and a high-level layer configured to be hierarchically above the low-level layer and to read and write data in accordance with an index, the communication method including:

causing the subordinate communication apparatus to determine whether or not there is a continuation of write data exceeding a previously notified number of sent and received bytes as the number of bytes constituting data to be sent and received in communication; and causing the subordinate communication apparatus to control the low-level layer to detect occurrence of an error on the basis of the determination that there is a continuation of the write data exceeding the number of sent and received bytes and to neglect all communication until at least the high-speed communication mode is stopped or restarted by the governing communication apparatus, the low-level layer being further controlled to send a NACK response when performing acknowledge processing on a signal sent from the governing communication apparatus.

(13)

A program for causing a computer of a communication apparatus to perform a communication process, the communication apparatus performing communication in a manner subordinate to and controlled by a governing communication apparatus controlling communication via a bus, the subordinate communication apparatus including a low-level layer configured to communicate via the bus with the governing communication apparatus in a high-speed communication mode in which data is transferred at a transfer rate higher than a normal transfer rate, and a high-level layer configured to be hierarchically above the low-level layer and to read and write data in accordance with an index, the communication process including:

causing the computer to determine whether or not there is a continuation of write data exceeding a previously notified number of sent and received bytes as the number of bytes constituting data to be sent and received in communication; and causing the computer to control the low-level layer to detect occurrence of an error on the basis of the determination that there is a continuation of the write data exceeding the number of sent and received bytes and to neglect all communication until at least the high-speed communication mode is stopped or restarted by the governing communication apparatus, the low-level layer being further controlled to send a NACK response when performing acknowledge processing on a signal sent from the governing communication apparatus.

(14)

A communication apparatus that controls communication via a bus in a governing manner, the governing communication apparatus including:

a low-level layer configured to communicate via the bus with a subordinate communication apparatus performing communication under control of the governing communication apparatus in a high-speed communication mode in which data is transferred at a transfer rate higher than a normal transfer rate; and a high-level layer configured to be hierarchically above the low-level layer and to read and write data in accordance with an index;

in which the high-level layer includes the high-level layer communication processing section configured to determine whether or not there is a continuation of read data exceeding a previously notified number of sent and received bytes as the number of bytes constituting data to be sent and received in communication; and the low-level layer includes an error handling section configured, at the time of detecting occurrence of an error on the basis of the determination that there is a continuation of the read data exceeding the number of sent and received bytes, to cause the high-level layer to clear the index, cancel communication, and at least stop or restart the high-speed communication mode before resetting the error.

(15)

The communication apparatus as stated in paragraph (14) above, in which, in a case where a preamble received immediately following the receipt of a first byte of read data immediately subsequent to the number of sent and received bytes indicates a continuation of data reception, the high-level layer communication processing section determines that there is a continuation of the read data exceeding the number of sent and received bytes.

(16)

A communication method for use with a communication apparatus controlling communication via a bus in a governing manner, the governing communication apparatus including a low-level layer configured to communicate via the bus with a subordinate communication apparatus performing communication under control of the governing communication apparatus in a high-speed communication mode in which data is transferred at a transfer rate higher than a normal transfer rate, and a high-level layer configured to be hierarchically above the low-level layer and to read and write data in accordance with an index, the communication method including:

causing the governing communication apparatus to determine whether or not there is a continuation of read data exceeding a previously notified number of sent and received bytes as the number of bytes constituting data that can be read in a single send and receive operation; and causing the governing communication apparatus, at the time of detecting occurrence of an error on the basis of the determination that there is a continuation of the read data exceeding the number of sent and received bytes, to cause the high-level layer to clear the index, cancel communication, and at least stop or restart the high-speed communication mode before resetting the error.

(17)

A program for causing a computer of a communication apparatus to perform a communication process, the communication apparatus controlling communication via a bus in a governing manner, the governing communication apparatus including a low-level layer configured to communicate via the bus with a subordinate communication apparatus performing communication under control of the governing communication apparatus in a high-speed communication mode in which data is transferred at a transfer rate higher than a normal transfer rate, and a high-level layer configured to be hierarchically above the low-level layer and to read and write data in accordance with an index, the communication process including:

causing the computer to determine whether or not there is a continuation of read data exceeding a previously notified number of sent and received bytes as the number of bytes constituting data that can be read in a single send and receive operation; and causing the computer, at the time of detecting occurrence of an error on the basis of the determination that there is a continuation of the read data exceeding the number of sent and received bytes, to cause the high-level layer to clear the index, cancel communication, and at least stop or restart the high-speed communication mode before resetting the error.

(18)

A communication system including:

a governing communication apparatus controlling communication via a bus; and a subordinate communication apparatus performing communication in a manner connected with and controlled by the governing communication apparatus;

in which the subordinate communication apparatus includes:

a low-level layer configured to communicate via the bus with the governing communication apparatus in a high-speed communication mode in which data is transferred at a transfer rate higher than a normal transfer rate; and a high-level layer configured to be hierarchically above the low-level layer and to read and write data in accordance with an index;

the high-level layer includes:

a high-level layer communication processing section configured to determine whether or not there is a continuation of write data exceeding a previously notified number of sent and received bytes as the number of bytes constituting data to be sent and received in communication; and a high-level layer error handling section configured to control the low-level layer to detect occurrence of an error on the basis of the determination that there is a continuation of the write data exceeding the number of sent and received bytes and to neglect all communication until at least the high-speed communication mode is stopped or restarted by the governing communication apparatus, the low-level layer being further controlled to send a NACK response when performing acknowledge processing on a signal sent from the governing communication apparatus;

the governing communication apparatus includes:

a low-level layer configured to communicate via the bus with the subordinate communication apparatus performing communication under control of the governing communication apparatus in a high-speed communication mode in which data is transferred at a transfer rate higher than a normal transfer rate; and a high-level layer configured to be hierarchically above the low-level layer and to read and write data in accordance with an index;

the high-level layer includes the high-level layer communication processing section configured to determine whether or not there is a continuation of read data exceeding a previously notified number of sent and received bytes as the number of bytes constituting data to be sent and received in communication; and the low-level layer includes an error handling section configured, at the time of detecting occurrence of an error on the basis of the determination that there is a continuation of the read data exceeding the number of sent and received bytes, to cause the high-level layer to clear the index, cancel communication, and at least stop or restart the high-speed communication mode before resetting the error.

(19)

A communication apparatus that performs communication in a manner subordinate to and controlled by a governing communication apparatus controlling communication via a bus, the subordinate communication apparatus including:

a low-level layer configured to communicate via the bus with the governing communication apparatus in a high-speed communication mode in which data is transferred at a transfer rate higher than a normal transfer rate; and a high-level layer configured to be hierarchically above the low-level layer and to read and write data in accordance with an index;

in which the high-level layer includes:

a high-level layer communication processing section configured to determine whether or not there is received write data having a number of bytes exceeding a maximum number of transfer bytes that can be written in a single send and receive operation; and a high-level layer error handling section configured to control the low-level layer to detect occurrence of an error on the basis of the determination that there is received the write data having the number of bytes exceeding the maximum number of transfer bytes and to neglect all communication until at least the high-speed communication mode is stopped or restarted by the governing communication apparatus, the low-level layer being further controlled to send a NACK response when performing acknowledge processing on a signal sent from the governing communication apparatus.

(20)

The communication apparatus as stated in paragraph (19) above, in which, in a case where a preamble received immediately following the receipt of a predetermined number of bytes of write data indicates a continuation of data reception, the high-level layer communication processing section determines that there is received the write data exceeding the maximum number of transfer bytes.

(21)

A communication method for use with a communication apparatus performing communication in a manner subordinate to and controlled by a governing communication apparatus controlling communication via a bus, the subordinate communication apparatus including a low-level layer configured to communicate via the bus with the governing communication apparatus in a high-speed communication mode in which data is transferred at a transfer rate higher than a normal transfer rate, and a high-level layer configured to be hierarchically above the low-level layer and to read and write data in accordance with an index, the communication method including:

causing the subordinate communication apparatus to determine whether or not there is received write data having a number of bytes exceeding a maximum number of transfer bytes that can be written in a single send and receive operation; and causing the subordinate communication apparatus to control the low-level layer to detect occurrence of an error on the basis of the determination that there is received the write data having the number of bytes exceeding the maximum number of transfer bytes and to neglect all communication until at least the high-speed communication mode is stopped or restarted by the governing communication apparatus, the low-level layer being further controlled to send a NACK response when performing acknowledge processing on a signal sent from the governing communication apparatus.

(22)

A program for causing a computer of a communication apparatus to perform a communication process, the communication apparatus performing communication in a manner subordinate to and controlled by a governing communication apparatus controlling communication via a bus, the subordinate communication apparatus including a low-level layer configured to communicate via the bus with the governing communication apparatus in a high-speed communication mode in which data is transferred at a transfer rate higher than a normal transfer rate, and a high-level layer configured to be hierarchically above the low-level layer and to read and write data in accordance with an index, the communication process including:

causing the computer to determine whether or not there is received write data having a number of bytes exceeding a maximum number of transfer bytes that can be written in a single send and receive operation; and causing the computer to control the low-level layer to detect occurrence of an error on the basis of the determination that there is received the write data having the number of bytes exceeding the maximum number of transfer bytes and to neglect all communication until at least the high-speed communication mode is stopped or restarted by the governing communication apparatus, the low-level layer being further controlled to send a NACK response when performing acknowledge processing on a signal sent from the governing communication apparatus.

(23)

A communication apparatus that controls communication via a bus in a governing manner, the governing communication apparatus including:

a low-level layer configured to communicate via the bus with a subordinate communication apparatus performing communication under control of the governing communication apparatus in a high-speed communication mode in which data is transferred at a transfer rate higher than a normal transfer rate; and a high-level layer configured to be hierarchically above the low-level layer and to read and write data in accordance with an index;

in which the high-level layer includes a high-level layer communication processing section configured to determine whether or not there is received read data having a number of bytes exceeding a maximum number of transfer bytes that can be read in a single send and receive operation; and the low-level layer includes an error handling section configured, at the time of detecting occurrence of an error on the basis of the determination that there is received the read data having the number of bytes exceeding the maximum number of transfer bytes, to cancel communication and at least stop or restart the high-speed communication mode before resetting the error.

(24)

The communication apparatus as stated in paragraph (23) above, in which, in a case where a preamble received immediately following the receipt of a first byte of read data immediately subsequent to the read data reaching the maximum number of transfer bytes indicates a continuation of data reception, the high-level layer communication processing section determines that there is received the read data exceeding the maximum number of transfer bytes.

(25)

A communication method for use with a communication apparatus controlling communication via a bus in a governing manner, the governing communication apparatus including a low-level layer configured to communicate via the bus with a subordinate communication apparatus performing communication under control of the governing communication apparatus in a high-speed communication mode in which data is transferred at a transfer rate higher than a normal transfer rate, and a high-level layer configured to be hierarchically above the low-level layer and to read and write data in accordance with an index, the communication method including:

causing the governing communication apparatus to determine whether or not there is received read data having a number of bytes exceeding a maximum number of transfer bytes that can be read in a single send and receive operation; and causing the governing communication apparatus, at the time of detecting occurrence of an error on the basis of the determination that there is received the read data having the number of bytes exceeding the maximum number of transfer bytes, to cancel communication and at least stop or restart the high-speed communication mode before resetting the error.

(26)

A program for causing a computer of a communication apparatus to perform a communication process, the communication apparatus controlling communication via a bus in a governing manner, the governing communication apparatus including a low-level layer configured to communicate via the bus with a subordinate communication apparatus performing communication under control of the governing communication apparatus in a high-speed communication mode in which data is transferred at a transfer rate higher than a normal transfer rate, and a high-level layer configured to be hierarchically above the low-level layer and to read and write data in accordance with an index, the communication process including:

causing the computer to determine whether or not there is received read data having a number of bytes exceeding a maximum number of transfer bytes that can be read in a single send and receive operation; and causing the computer, at the time of detecting occurrence of an error on the basis of the determination that there is received the read data having the number of bytes exceeding the maximum number of transfer bytes, to cancel communication and at least stop or restart the high-speed communication mode before resetting the error.

(27)

A communication system including:

a governing communication apparatus controlling communication via a bus; and a subordinate communication apparatus performing communication in a manner connected with and controlled by the governing communication apparatus;

in which the subordinate communication apparatus includes:

a low-level layer configured to communicate via the bus with the governing communication apparatus in a high-speed communication mode in which data is transferred at a transfer rate higher than a normal transfer rate; and a high-level layer configured to be hierarchically above the low-level layer and to read and write data in accordance with an index;

the high-level layer includes:

a high-level layer communication processing section configured to determine whether or not there is received write data having a number of bytes exceeding a maximum number of transfer bytes that can be written in a single send and receive operation; and a high-level layer error handling section configured to control the low-level layer to detect occurrence of an error on the basis of the determination that there is received the write data having the number of bytes exceeding the maximum number of transfer bytes and to neglect all communication until at least the high-speed communication mode is stopped or restarted by the governing communication apparatus, the low-level layer being further controlled to send a NACK response when performing acknowledge processing on a signal sent from the governing communication apparatus;

the governing communication apparatus includes:

a low-level layer configured to communicate via the bus with the subordinate communication apparatus performing communication under control of the governing communication apparatus in a high-speed communication mode in which data is transferred at a transfer rate higher than a normal transfer rate; and a high-level layer configured to be hierarchically above the low-level layer and to read and write data in accordance with an index;

the high-level layer includes a high-level layer communication processing section configured to determine whether or not there is received read data having a number of bytes exceeding a maximum number of transfer bytes that can be read in a single send and receive operation; and the low-level layer includes an error handling section configured, at the time of detecting occurrence of an error on the basis of the determination that there is received the read data having the number of bytes exceeding the maximum number of transfer bytes, to cancel communication and at least stop or restart the high-speed communication mode before resetting the error.

The embodiments of the present technology are not limited to those discussed above. The embodiments may be modified, altered, or improved in diverse fashion within the scope and spirit of the present technology. Also, the advantageous effects stated in this description are only examples and not limitative of the present technology that may also provide other advantages.

REFERENCE SIGNS LIST

11 I3C bus
12 I3C master
13 I3C slave
14 Data signal line
15 Clock signal line
16 CCI master
17 I3C driver
18 CCI slave
21 I3C communication system
22 Master device
23 Slave device
31 Error handling section
32 ACK verifying section
41 I3C (SDR) processing section
42 I3C (DDR) processing section
43 Error handling section
51 CCI (I3C SDR) processing section
52 CCI (I3C DDR) processing section
61 CCI (I3C SDR) processing section
62 CCI (I3C DDR) processing section
63 Error handling section
71 Acknowledge processing section
72 Write reception processing section
73 CCC reception processing section
74 Read reception processing section
75 HDR start processing section
76 Error handling section
81 DDR write processing section
82 DDR read processing section
83 DDR acknowledge processing section
84 Error handling section

The invention claimed is:

1. A master communication device comprising:
an improved inter integrated circuitry configured to
communicate with a slave communication device in one of two different communication modes via a bus, the master communication device controlling communication between the slave communication device and the master communication device, the two different communication modes including a first communication mode with a first data transfer rate and a second communication mode with a second data transfer rate that is higher than the first data transfer rate, and
detect an error; and
a camera control interface configured to
communicate with the improved inter integrated circuitry,
read and write data in accordance with an index,
receive a notification from the improved inter integrated circuitry, the notification being indicative of the error detected by the improved inter integrated circuitry, and
clear the index based on the notification,
wherein the index is an index of the slave communication device, and
wherein the camera control interface is further configured to
read and write the data in accordance with the index of the slave communication device, and
establish the index of the slave communication device.

2. The master communication device according to claim 1,
wherein the improved inter integrated circuitry is further configured to receive a NACK response from the slave communication device, and
wherein the camera control interface is further configured to
receive a second notification from the improved inter integrated circuitry, the second notification being indicative of the NACK response received by the improved inter integrated circuitry, and
clear the index based on the second notification.

3. The master communication device according to claim 2, wherein the camera control interface is further configured to prohibit the use of a current read operation in response to receiving the notification or the second notification.

4. The master communication device according to claim 2, wherein the camera control interface is further configured to determine whether there is a continuation of read data exceeding a previously notified number of sent and received bytes, detect a second error in response to determining that there is the continuation of the read data exceeding the previously notified number of the sent and received bytes, clear the index based on the second error, control the improved inter integrated circuitry to cancel communication between the master communication device and the slave communication device, stop or restart the second communication mode, and reset the second error in response to stopping or restarting the second communication mode.

5. The master communication device according to claim 4, wherein the camera control interface determines that there is the continuation of the read data exceeding the previously notified number of the sent and received bytes by determining that a preamble received immediately following a receipt of a first byte of reading the data immediately subsequent to a number of sent and received bytes indicates a continuation of data reception.

6. The master communication device according to claim 1, wherein the camera control interface is further configured to determine whether there is read data that has been received with a number of bytes exceeding a maximum number of transfer bytes that are readable in a single send and receive operation, detect a second error in response to determining that there is the read data that has been received with the number of bytes exceeding the maximum number of transfer bytes, control the improved inter integrated circuitry to cancel communication between the master communication device and the slave communication device, stop or restart the second communication mode, and reset the error in response to stopping or restarting the second communication mode.

7. The master communication device according to claim 6, wherein the camera control interface determines that there is the read data that has been received with the number of bytes exceeding the maximum number of transfer bytes by determining whether a preamble received immediately following a receipt of the read data reaching the maximum number of transfer bytes indicates a continuation of data reception.

8. The master communication device according to claim 1, wherein, to establish the index of the slave communication device, the camera control interface is further configured to communicate a length and the index in a first data word of a write message to the slave communication device.

9. The master communication device according to claim 8, wherein the length and the index are one of:
an 8-bit length and an 8-bit index, or
a 16-bit length and a 16-bit index.

10. The master communication device according to claim 1, wherein the index is configured to store an index value, the index value being a portion of a data word for a length and the index, and wherein the length is the index value that indicates a number of sent and received bytes.

11. A slave communication device comprising:

an improved inter integrated circuitry configured to communicate with a master communication device in one of two different communication modes via a bus, the master communication device controlling communication between the slave communication device and the master communication device, and the two different communication modes including a first communication mode with a first data transfer rate and a second communication mode with a second data transfer rate that is higher than the first data transfer rate; and a camera control interface configured to
communicate with the improved inter integrated circuitry,
read and write data in accordance with an index,
receive a request to access the index for a read operation from the master communication device, and
determine a status of the index based on the request from the master communication device,
control the improved inter integrated circuitry to detect an occurrence of an error,
clear the index based on the occurrence of the error,
detect a signal from the master communication device while the index is clear,
ignore data from the master communication device until at least the second communication mode is stopped or restarted by the master communication device in response to detecting the signal from the master communication device while the index is clear, and
control the improved inter integrated circuitry to communicate a NACK response to the master communication device in response to detecting the signal from the master communication device while the index is clear,
wherein the index is an index of the slave communication device and is established by a second camera control interface of the master communication device.

12. The slave communication device according to claim 11, wherein the camera control interface is further configured to determine whether there is a continuation of write data exceeding a previously notified number of sent and received bytes, detect a second error in response to determining that there is the continuation of the write data exceeding the previously notified number of the sent and received bytes, and clear the index based on the second error.

13. The slave communication device according to claim 12, wherein the camera control interface determines that there is the continuation of the write data exceeding the previously notified number of sent and received bytes by determining that a preamble received immediately following a number of sent and received bytes indicates a continuation of data reception.

14. The slave communication device according to claim 11, wherein the camera control interface is further configured to determine whether there is write data that has been received with a number of bytes exceeding a maximum number of transfer bytes that are writable in a single send and receive operation, detect a second error in response to determining that there is the write data that has been received with the number of bytes exceeding the maximum number of transfer bytes, and clear the index based on the second error.

15. The slave communication device according to claim 14, wherein the camera control interface determines that there is the write data exceeding the maximum number of transfer bytes by determining whether a preamble received immediately following a receipt of a predetermined number of bytes of the write data indicates a continuation of data reception.

16. A communication system comprising:
a slave communication device; and
a master communication device including
an improved inter integrated circuitry configured to
communicate with the slave communication device in one of two different communication modes via a bus, the master communication device controlling communication between the slave communication device and the master communication device, the two different communication modes including a first communication mode with a first data transfer rate and a second communication mode with a second data transfer rate that is higher than the first data transfer rate, and
detect an error; and
a camera control interface configured to
communicate with the improved inter integrated circuitry,
read and write data in accordance with an index,
receive a notification from the improved inter integrated circuitry, the notification being indicative of the error detected by the improved inter integrated circuitry, and
clear the index based on the notification,
wherein the index is an index of the slave communication device, and
wherein the camera control interface is further configured to establish the index of the slave communication device.

17. The communication system according to claim 16, wherein the improved inter integrated circuitry is further configured to receive a NACK response from the slave communication device, and
wherein the camera control interface is further configured to
receive a second notification from the improved inter integrated circuitry, the second notification being indicative of the NACK response received by the improved inter integrated circuitry, and
clear the index based on the second notification.

18. The communication system according to claim 17, wherein the camera control interface is further configured to prohibit the use of a current read operation in response to receiving the notification or the second notification.

19. The communication system according to claim 16, wherein the slave communication device includes
a second improved inter integrated circuitry configured to communicate with the master communication device in the one of the two different communication modes via the bus; and
a second camera control interface configured to
communicate with the second improved inter integrated circuitry, read and write second data in accordance with a second index,
receive a request to access the second index for a read operation from the master communication device,
determine a status of the second index based on the request from the master communication device,
control the second improved inter integrated circuitry to detect an occurrence of a second error,
clear the second index based on the occurrence of the second error,
detect a signal from the master communication device while the second index is clear,
ignore data from the master communication device until at least the second communication mode is stopped or restarted by the master communication device in response to detecting the signal from the master communication device while the second index is clear, and
control the second improved inter integrated circuitry to communicate a NACK response to the master communication device in response to detecting the signal from the master communication device while the second index is clear.

20. The communication system according to claim 16, wherein, to establish the index of the slave communication device, the camera control interface is further configured to communicate a length and the index in a first data word of a write message to the slave communication device.

21. A communication method comprising:
establishing, with a camera control interface of a master communication device, an index of a slave communication device;
reading and writing, with the camera control interface, data in accordance with the index of the slave communication device;
controlling, with an improved inter integrated circuitry of the master communication device, communication with the slave communication device in one of two different communication modes via a bus, the two different communication modes including a first communication mode with a first data transfer rate and a second communication mode with a second data transfer rate that is higher than the first data transfer rate;
detecting, with the improved inter integrated circuitry, an error;
receiving, with the camera control interface, a notification from the improved inter integrated circuitry, the notification being indicative of the error detected by the improved inter integrated circuitry; and
clearing, with the camera control interface, the index based on the notification.

22. The communication method according to claim 21, further comprising:
receiving, with the improved inter integrated circuitry, a NACK response from the slave communication device;
receiving, with the camera control interface, a second notification from the improved inter integrated circuitry, the second notification being indicative of the NACK response received by the improved inter integrated circuitry; and
clearing, with the camera control interface, the index based on the second notification.

23. The communication method according to claim 22, further comprising:

prohibiting, with the camera control interface, a current read operation in response to receiving the notification or the second notification.

24. A communication method comprising:

receiving, with a first camera control interface of a slave communication device, a request to access an index for a read operation from a master communication device via a bus, the master communication device controlling communication between the slave communication device and the master communication device, the communication being in one of two different communication modes, and the two different communication modes including a first communication mode with a first data transfer rate and a second communication mode with a second data transfer rate that is higher than the first data transfer rate;

controlling, with the first camera control interface, an improved inter integrated circuitry to detect an occurrence of an error;

clearing, with the first camera control interface, the index based on the occurrence of the error;

detecting, with the first camera control interface, a signal from the master communication device while the index is clear;

ignoring, with the first camera control interface, data from the master communication device until a start condition or a restart condition is received in response to detecting the signal from the master communication device while the index is clear; and controlling, with the first camera control interface, the improved inter integrated circuitry to communicate a NACK response to the master communication device in response to detecting the signal from the master communication device while the index is clear, wherein the index is an index of the slave communication device and is established by a second camera control interface of the master communication device.

* * * * *